US008610574B2

(12) United States Patent
Kestenbaum

(10) Patent No.: US 8,610,574 B2
(45) Date of Patent: Dec. 17, 2013

(54) ITEM STORAGE AND TRACKING SYSTEM

(76) Inventor: Gerald Isaac Kestenbaum, Long Island City, NY (US)

( * ) Notice: Subject to any disclaimer, the term of this patent is extended or adjusted under 35 U.S.C. 154(b) by 721 days.

(21) Appl. No.: 12/792,483

(22) Filed: Jun. 2, 2010

(65) Prior Publication Data

US 2011/0012735 A1    Jan. 20, 2011

Related U.S. Application Data

(60) Provisional application No. 61/187,046, filed on Jun. 15, 2009, provisional application No. 61/293,976, filed on Jan. 11, 2010.

(51) Int. Cl.
*G08B 13/14* (2006.01)
*G07F 11/00* (2006.01)
*G06F 17/00* (2006.01)

(52) U.S. Cl.
USPC ..... 340/572.1; 340/5.9; 340/5.6; 340/426.35; 340/301; 221/13; 221/124; 221/130; 221/195; 700/240; 700/243; 700/236; 700/244

(58) Field of Classification Search
USPC ....................................................... 340/572.1
See application file for complete search history.

(56) References Cited

U.S. PATENT DOCUMENTS

| | | | |
|---|---|---|---|
| 3,651,464 A | 3/1972 | Hedin et al. | 340/149 R |
| 3,673,467 A | 6/1972 | Eisenreich | 317/134 |
| 3,678,250 A | 7/1972 | Dethloff et al. | 235/61.11 R |
| 4,297,569 A * | 10/1981 | Flies | 235/443 |
| 4,326,125 A | 4/1982 | Flies | 235/443 |
| 4,337,393 A | 6/1982 | Hilton | 235/487 |
| 4,379,966 A | 4/1983 | Flies | 235/443 |
| 4,420,794 A | 12/1983 | Anderson | 361/419 |
| 4,436,993 A | 3/1984 | Flies | 235/382 |
| 4,522,456 A | 6/1985 | Wehrmacher | 339/17 R |
| 4,525,713 A | 6/1985 | Barletta et al. | 340/825.54 |
| 4,549,076 A | 10/1985 | Flies | 235/382 |
| 4,549,170 A | 10/1985 | Serres et al. | 340/568 |
| 4,578,573 A | 3/1986 | Flies et al. | 235/492 |
| 4,595,922 A | 6/1986 | Cobb et al. | 340/825.49 |
| 4,620,088 A | 10/1986 | Flies | 235/443 |
| 4,635,053 A | 1/1987 | Banks et al. | 340/825.31 |
| 4,636,634 A | 1/1987 | Harper et al. | 250/223 |
| 4,661,806 A | 4/1987 | Peters et al. | 340/568 |
| 4,673,915 A | 6/1987 | Cobb | 340/330 |
| 4,752,679 A | 6/1988 | Wehrmacher | 235/382 |
| 4,753,092 A | 6/1988 | Mercer | 70/389 |
| 4,783,655 A | 11/1988 | Cobb et al. | 340/825.49 |
| 4,786,229 A | 11/1988 | Henderson | 414/786 |
| 4,792,865 A | 12/1988 | Baumeister | 358/342 |
| 4,812,985 A | 3/1989 | Hambrick et al. | 700/215 |
| 4,814,742 A | 3/1989 | Morita et al. | 340/825.54 |
| 4,839,875 A | 6/1989 | Kuriyama et al. | 369/14 |
| 4,845,492 A | 7/1989 | Cobb et al. | 340/825.49 |
| 4,903,815 A | 2/1990 | Hirschfeld et al. | 194/205 |
| 4,937,437 A | 6/1990 | Ferguson | 235/382 |
| 4,989,191 A | 1/1991 | Kuo | 369/33 |
| 5,028,766 A | 7/1991 | Shah | 235/381 |

(Continued)

*Primary Examiner* — Jennifer Mehmood
*Assistant Examiner* — Fekadeselassie Girma
(74) *Attorney, Agent, or Firm* — Ostrolenk Faber LLP

(57) ABSTRACT

An item storage facility that includes a resident programmable subcontroller, at least one stand, a one circuit board having a plurality of elongated openings therein supported on the stand, and a plurality of connectors resident on the circuit board and in communication with the subcontroller.

19 Claims, 59 Drawing Sheets

(56) References Cited

U.S. PATENT DOCUMENTS

| | | | |
|---|---|---|---|
| 5,038,023 A * | 8/1991 | Saliga | 235/385 |
| 5,063,380 A | 11/1991 | Wakura | 340/825.54 |
| 5,172,829 A | 12/1992 | Dellicker, Jr. | 221/13 |
| 5,251,782 A | 10/1993 | Crosby et al. | 221/2 |
| 5,287,414 A | 2/1994 | Foster | 382/1 |
| 5,300,875 A | 4/1994 | Tuttle | 320/20 |
| 5,344,042 A | 9/1994 | Crosby et al. | 221/2 |
| 5,455,409 A | 10/1995 | Smith et al. | 235/385 |
| 5,745,366 A | 4/1998 | Higham et al. | 364/479 |
| 5,752,235 A | 5/1998 | Kehr et al. | 705/3 |
| 5,801,628 A * | 9/1998 | Maloney | 340/568.2 |
| 5,842,362 A | 12/1998 | DePonty et al. | 70/389 |
| 5,905,653 A | 5/1999 | Higham et al. | 364/479.14 |
| 6,075,441 A | 6/2000 | Maloney | 340/568.1 |
| 6,131,808 A | 10/2000 | Pires et al. | 235/375 |
| 6,195,005 B1 * | 2/2001 | Maloney | 340/568.1 |
| 6,204,764 B1 | 3/2001 | Maloney | 340/568.1 |
| 6,232,876 B1 * | 5/2001 | Maloney | 340/568.1 |
| D444,331 S | 7/2001 | Maloney | D6/510 |
| 6,262,664 B1 | 7/2001 | Maloney | 340/572.8 |
| 6,315,198 B1 | 11/2001 | Lenglart et al. | 235/382 |
| 6,317,044 B1 | 11/2001 | Maloney | 340/568.1 |
| 6,377,203 B1 | 4/2002 | Doany | 342/44 |
| D456,852 S | 5/2002 | Maloney | D20/22 |
| 6,392,543 B2 | 5/2002 | Maloney | 340/568.1 |
| 6,424,260 B2 | 7/2002 | Maloney | 340/568.1 |
| 6,427,913 B1 | 8/2002 | Maloney | 235/383 |
| 6,431,438 B1 | 8/2002 | Pires et al. | 235/375 |
| 6,501,379 B2 | 12/2002 | Maloney | 340/568.1 |
| 6,505,754 B1 | 1/2003 | Kenny et al. | 221/13 |
| 6,592,028 B2 | 7/2003 | Pires et al. | 235/375 |
| 6,593,845 B1 | 7/2003 | Friedman et al. | 340/10.33 |
| 6,609,657 B2 | 8/2003 | Pires | 235/382 |
| 6,618,022 B2 | 9/2003 | Harvey | 343/876 |
| 6,650,225 B2 * | 11/2003 | Bastian et al. | 340/5.92 |
| 6,693,538 B2 | 2/2004 | Maloney | 340/568.1 |
| 6,707,380 B2 | 3/2004 | Maloney | 340/568.1 |
| 6,707,381 B1 | 3/2004 | Maloney | 340/568.1 |
| 6,727,817 B2 | 4/2004 | Maloney | 340/572.8 |
| 6,731,211 B1 * | 5/2004 | King | 340/568.1 |
| 6,737,961 B2 * | 5/2004 | Flick | 340/426.35 |
| 6,812,838 B1 | 11/2004 | Maloney | 340/568.1 |
| 6,824,738 B1 * | 11/2004 | Neeper et al. | 422/72 |
| 6,827,256 B2 | 12/2004 | Stobbe | 235/375 |
| 6,837,429 B2 | 1/2005 | Pires et al. | 235/385 |
| 6,847,892 B2 | 1/2005 | Zhou et al. | 701/213 |
| 6,863,220 B2 | 3/2005 | Selker | 235/492 |
| 6,867,695 B2 | 3/2005 | Prado et al. | 340/568.1 |
| 6,879,809 B1 | 4/2005 | Vega et al. | 455/41.1 |
| 6,880,754 B1 | 4/2005 | Lie-Nielsen et al. | 235/385 |
| 6,882,282 B1 | 4/2005 | Lie-Nielsen et al. | 340/686.1 |
| 6,891,473 B2 | 5/2005 | Maloney | 340/568.1 |
| 6,900,741 B1 | 5/2005 | Warnelov | 340/933 |
| 6,913,477 B2 | 7/2005 | Dayan et al. | 439/188 |
| 6,944,424 B2 | 9/2005 | Heinrich et al. | 455/41.1 |
| 6,958,698 B2 | 10/2005 | Maloney | 340/572.8 |
| 6,963,270 B1 | 11/2005 | Gallagher, III et al. | 340/10.2 |
| 6,967,563 B2 | 11/2005 | Bormaster | 340/10.31 |
| 6,981,639 B1 | 1/2006 | Pires | 235/382 |
| 7,002,473 B2 | 2/2006 | Glick et al. | 340/572.1 |
| 7,005,984 B2 | 2/2006 | Maloney | 340/568.1 |
| 7,009,496 B2 | 3/2006 | Arneson et al. | 340/10.2 |
| 7,012,504 B2 | 3/2006 | Tuttle | 340/10.1 |
| 7,021,095 B2 | 4/2006 | Jensen | 70/389 |
| 7,042,334 B2 | 5/2006 | Mosgrove et al. | 340/5.73 |
| 7,046,145 B2 | 5/2006 | Maloney | 340/568.1 |
| 7,049,961 B2 | 5/2006 | Maloney | 340/568.1 |
| D522,235 S | 6/2006 | Kell et al. | D3/211 |
| 7,061,367 B2 | 6/2006 | Mosgrove et al. | 340/5.21 |
| 7,068,168 B2 | 6/2006 | Girshovich et al. | 340/568.3 |
| 7,079,009 B2 | 7/2006 | Gallagher, III et al. | 340/10.2 |
| 7,106,174 B1 | 9/2006 | Powell | 340/10.2 |
| 7,109,864 B2 | 9/2006 | Maloney | 340/568.1 |
| 7,116,228 B1 | 10/2006 | Singleton | 340/572.1 |
| 7,119,692 B2 | 10/2006 | Lieffort et al. | 340/572.4 |
| 7,123,127 B2 * | 10/2006 | Mosgrove et al. | 340/5.21 |
| 7,129,817 B2 | 10/2006 | Yamagishi | 340/5.53 |
| 7,129,840 B2 | 10/2006 | Hull et al. | 340/568.1 |
| 7,135,973 B2 | 11/2006 | Kittel et al. | 340/568.2 |
| 7,135,974 B2 | 11/2006 | Hernandez et al. | 340/572.1 |
| 7,152,802 B2 | 12/2006 | Kell et al. | 235/492 |
| 7,156,312 B2 | 1/2007 | Becker et al. | 235/492 |
| 7,202,785 B2 | 4/2007 | Maloney | 340/568.1 |
| 7,250,865 B2 | 7/2007 | Maloney | 340/572.1 |
| 7,317,393 B2 | 1/2008 | Maloney | 340/568.1 |
| 7,336,174 B1 | 2/2008 | Maloney | 340/572.1 |
| 7,342,494 B2 | 3/2008 | Maloney | 340/568.1 |
| 7,501,960 B2 * | 3/2009 | Price et al. | 340/691.6 |
| 7,987,020 B1 * | 7/2011 | Swinea, Jr. | 700/243 |
| 2002/0113706 A1 * | 8/2002 | Prado et al. | 340/571 |
| 2005/0179547 A1 * | 8/2005 | Maloney | 340/568.1 |
| 2008/0117053 A1 * | 5/2008 | Maloney | 340/572.4 |

* cited by examiner

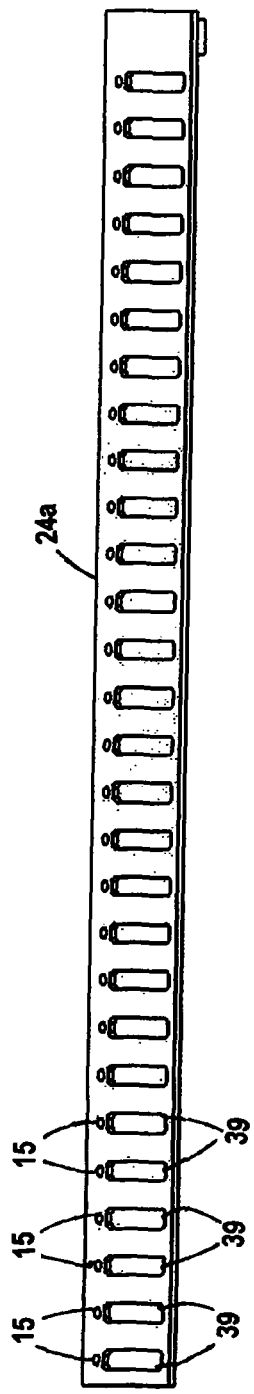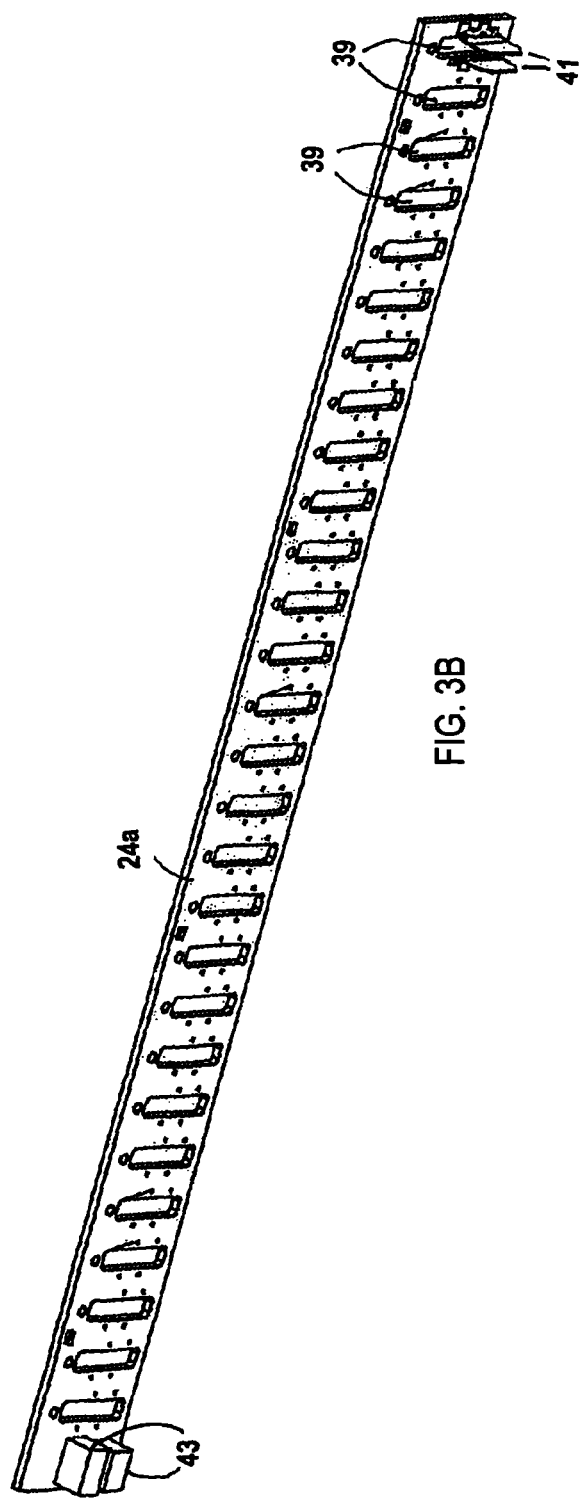
FIG. 3A
FIG. 3B

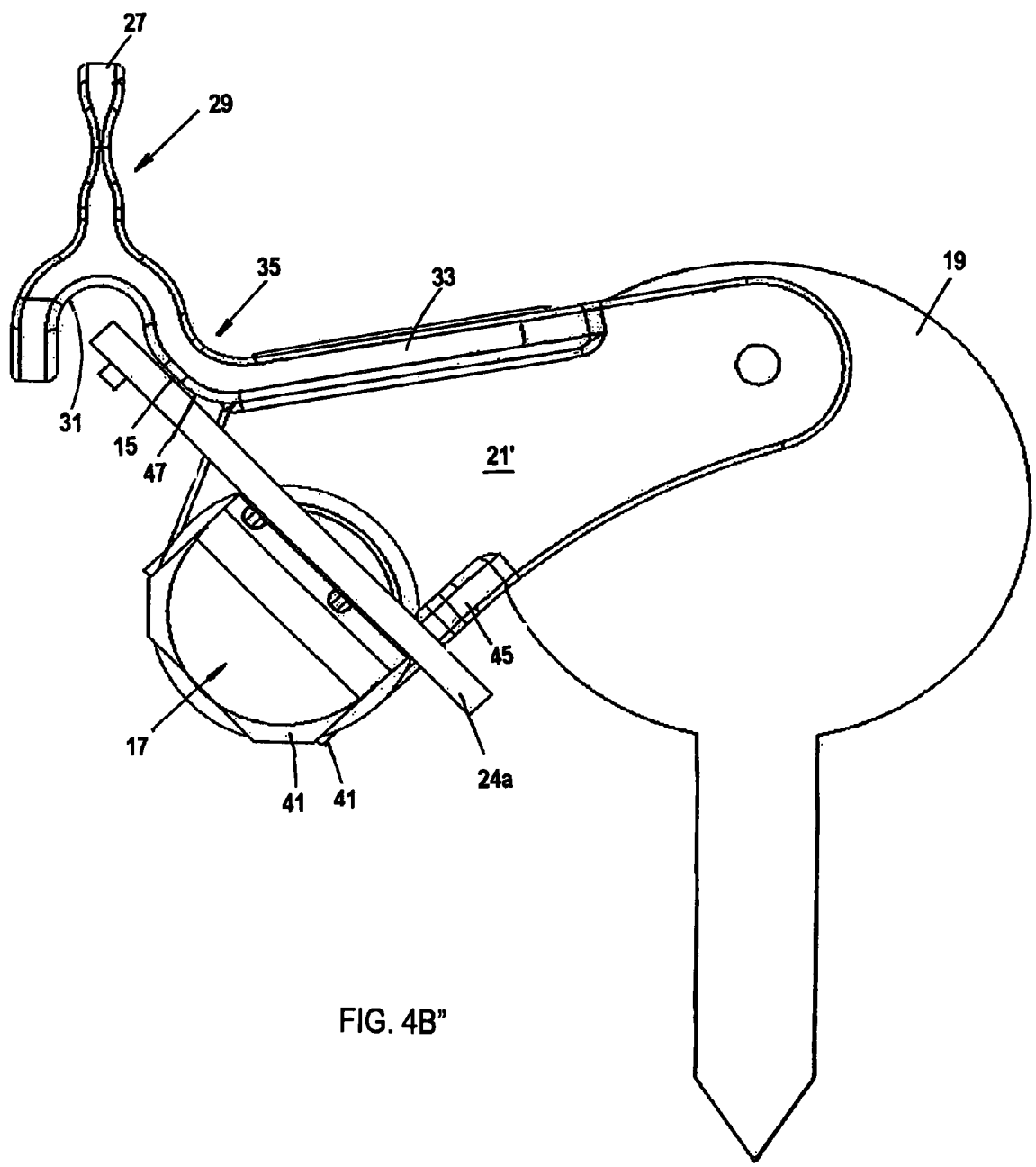
FIG. 4B"

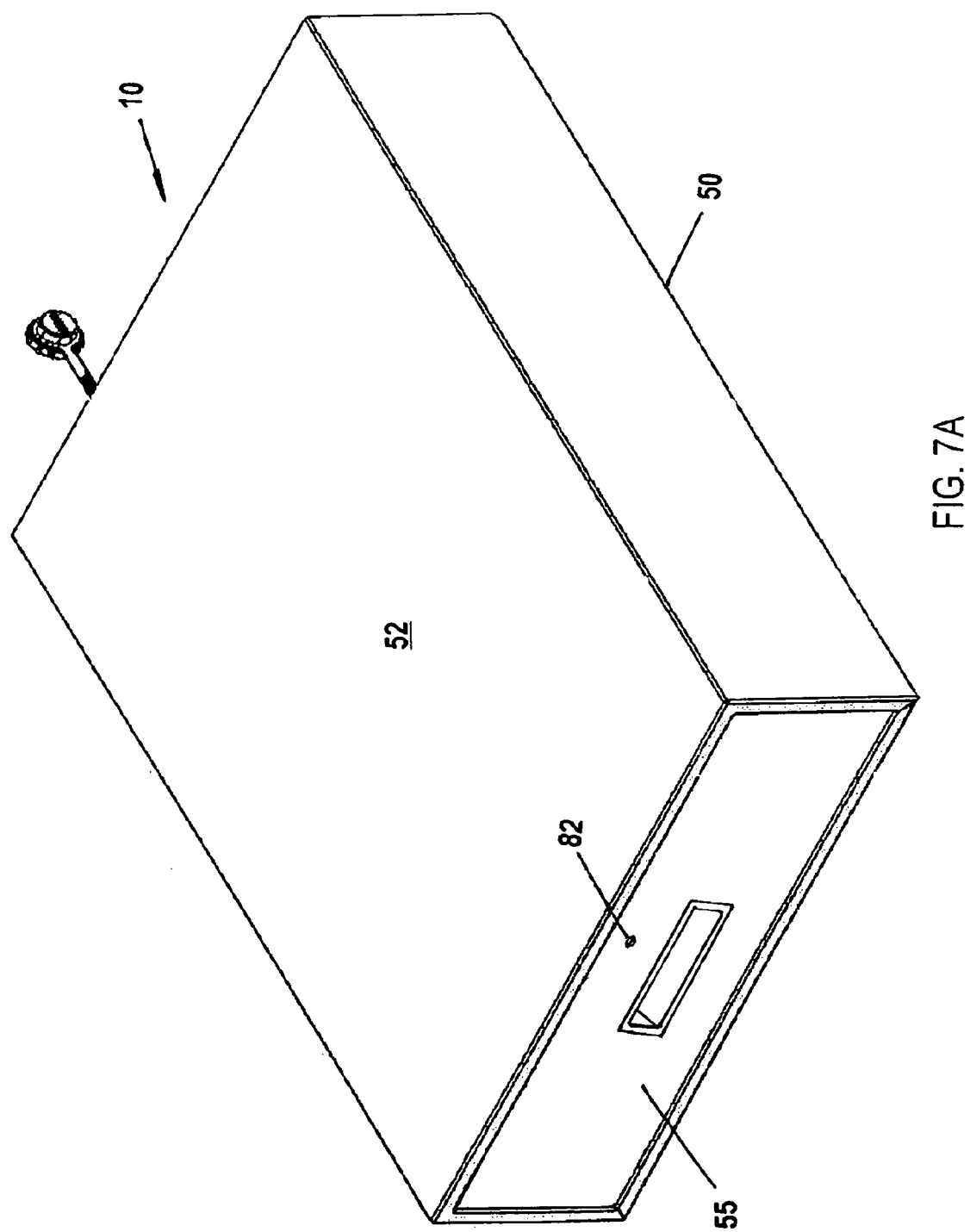

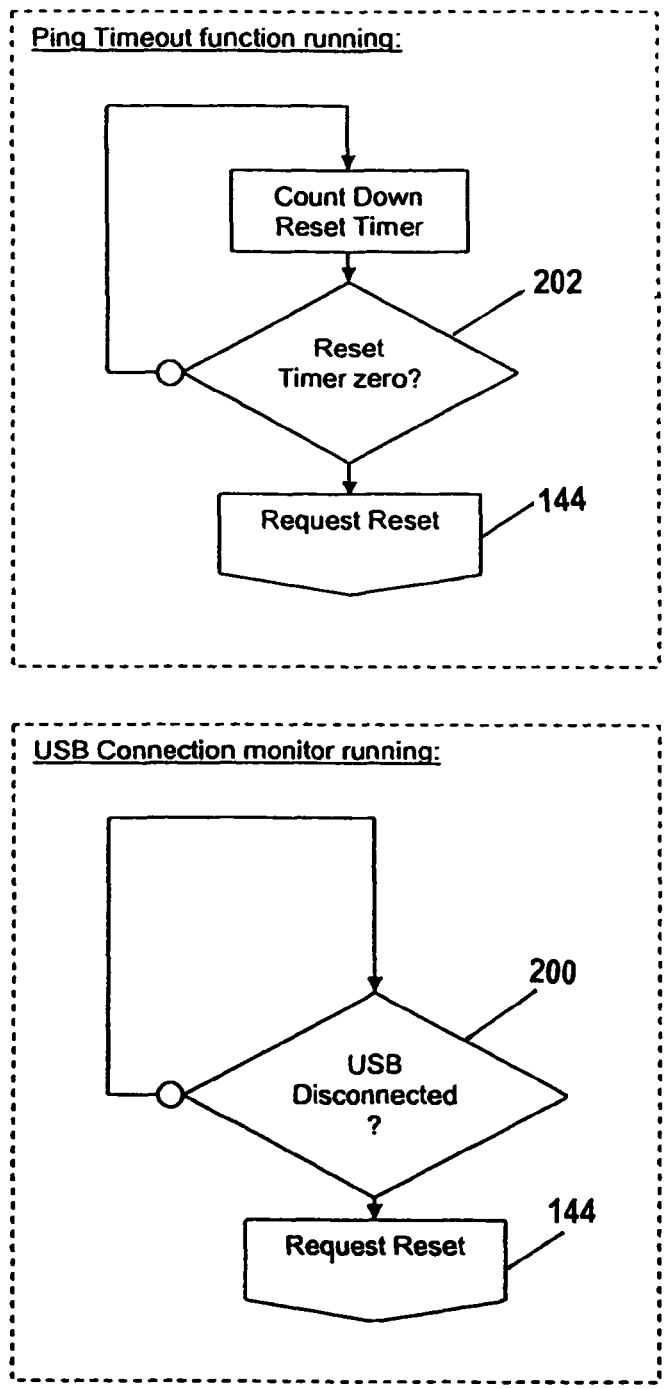
FIG. 14B [continued]

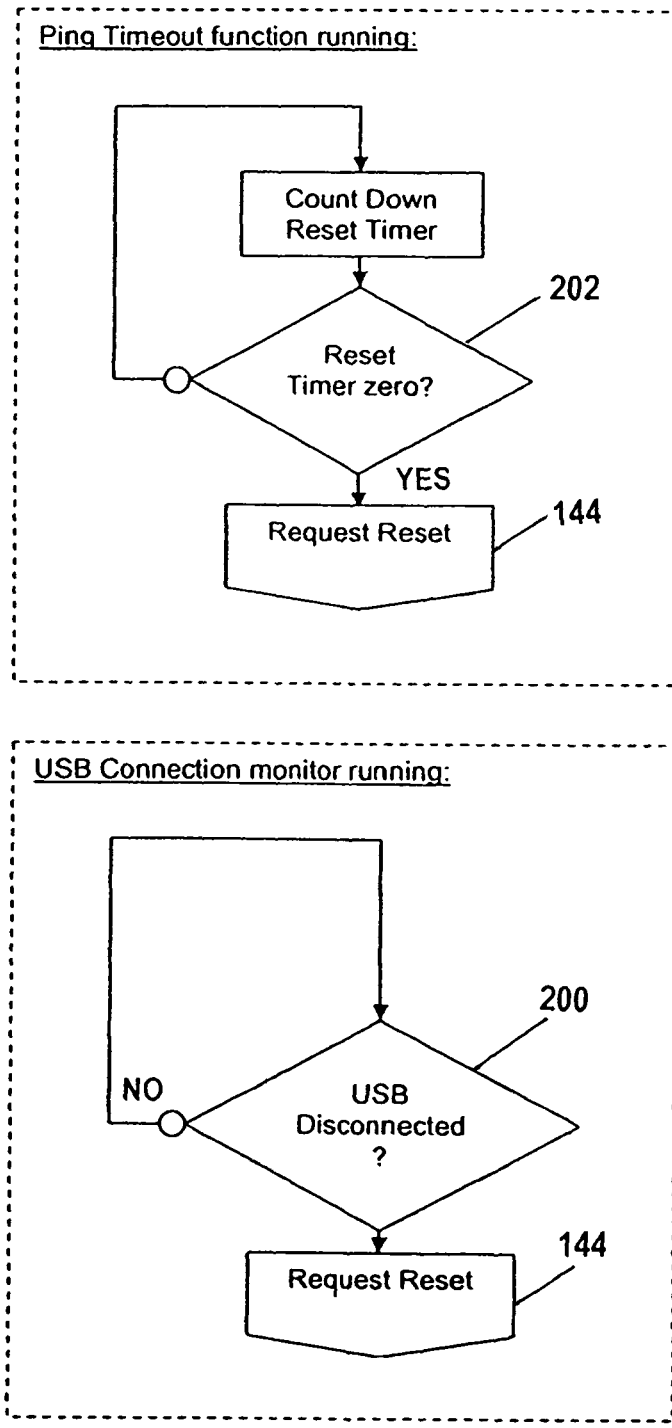
FIG. 14C [continued]

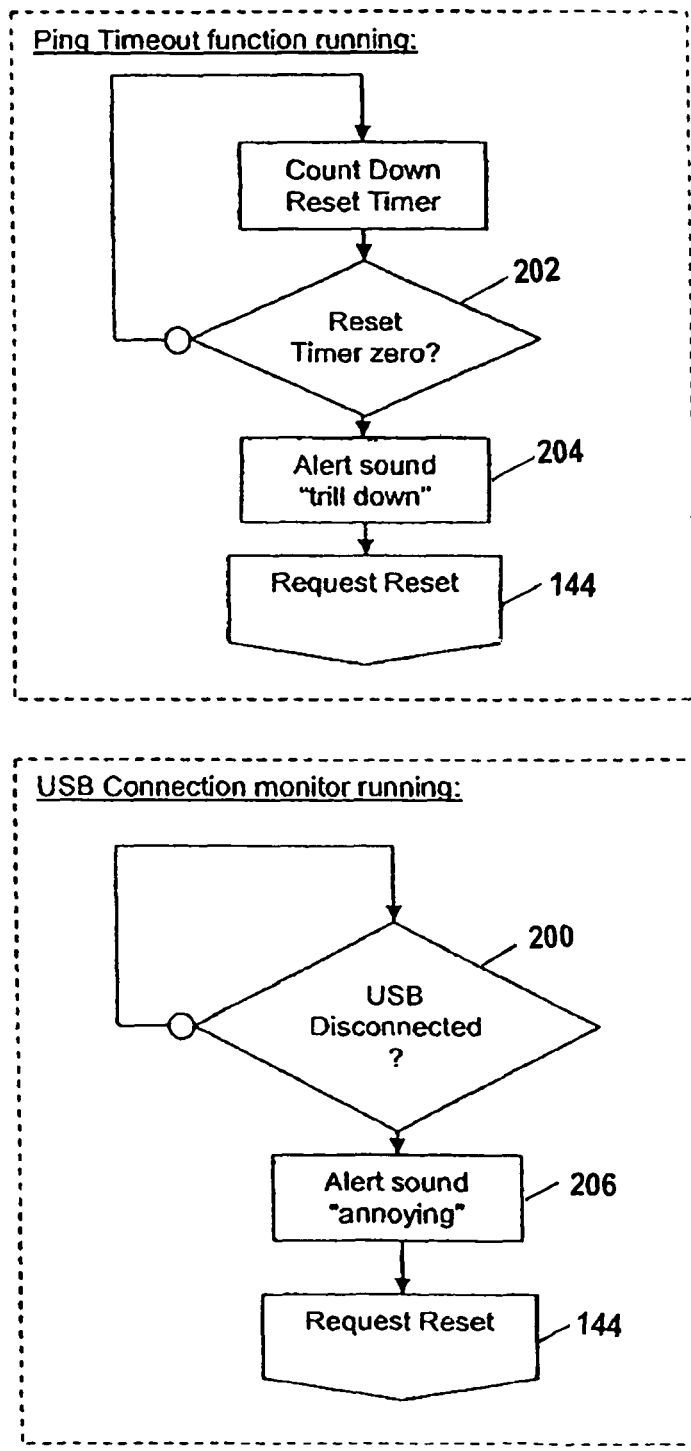
FIG. 15B [continued]

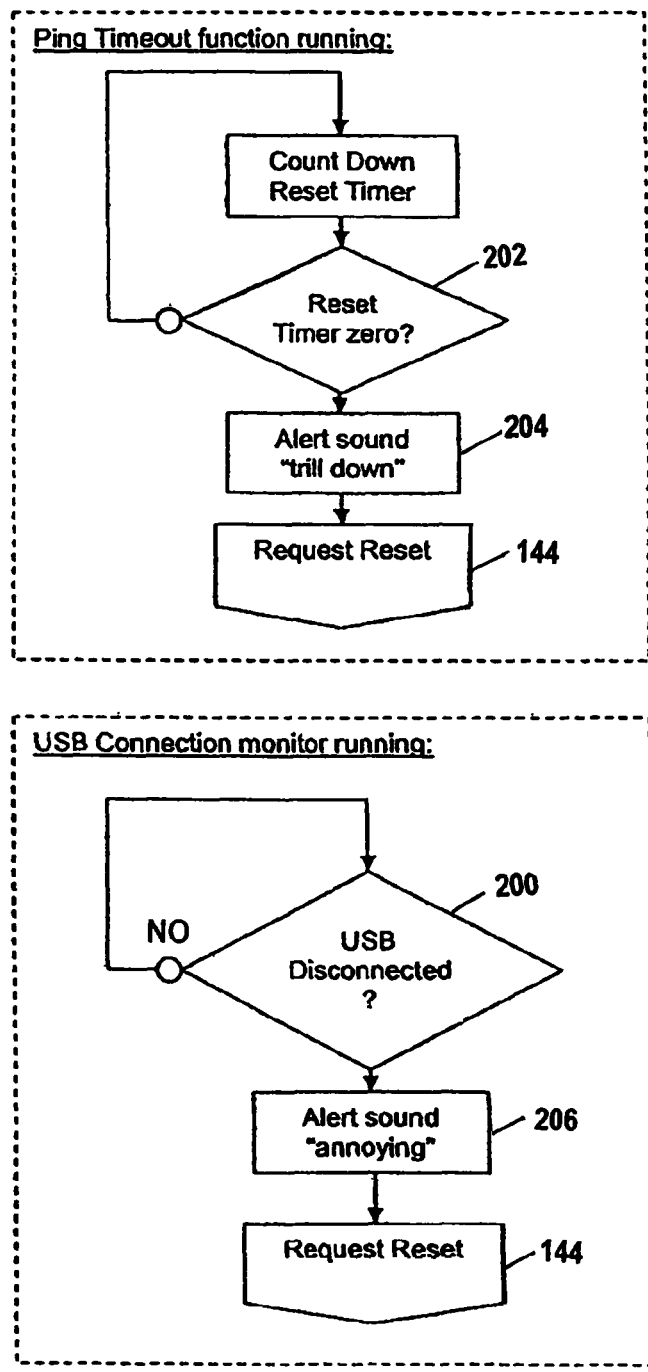
FIG. 15C [continued]

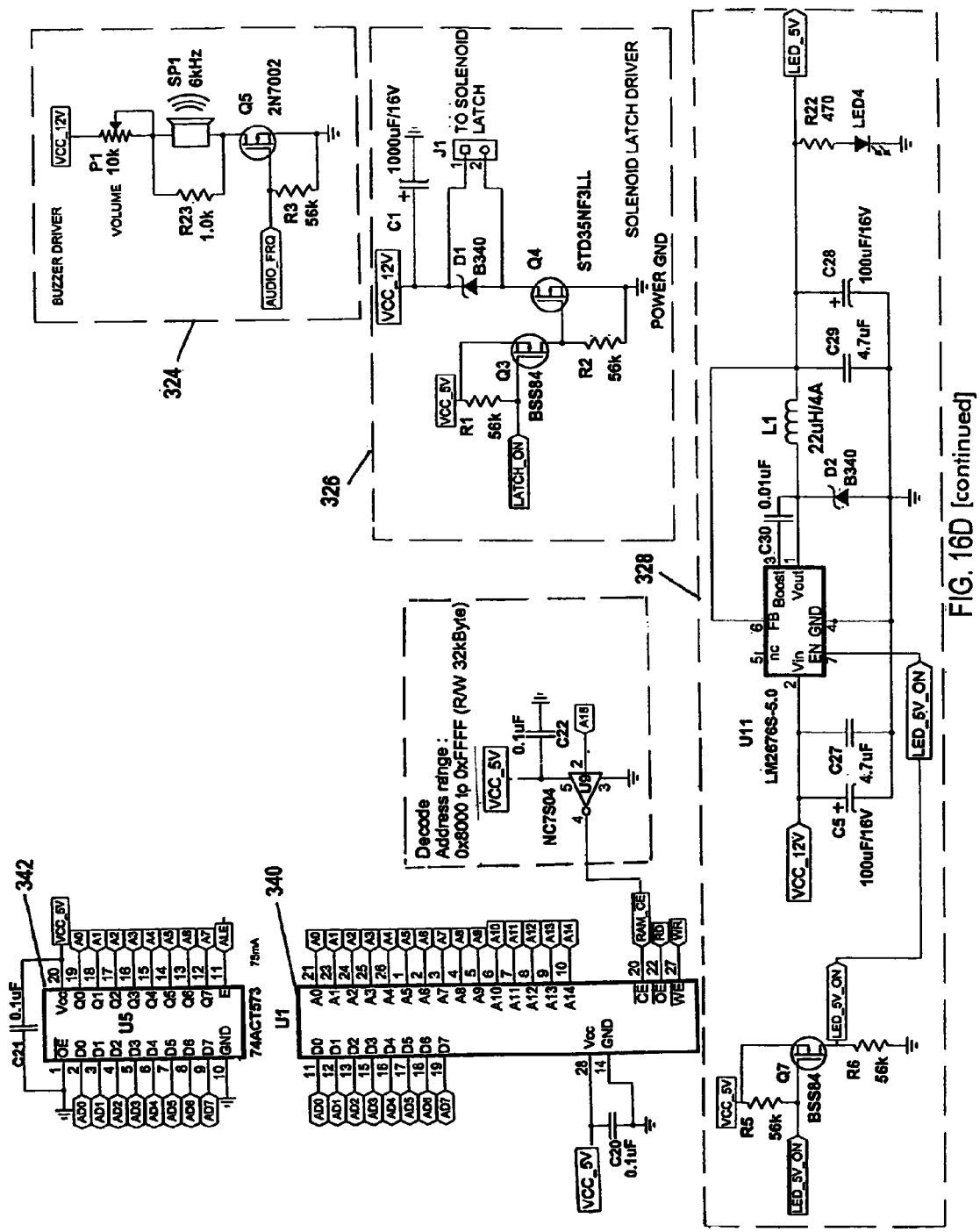
FIG. 16D [continued]

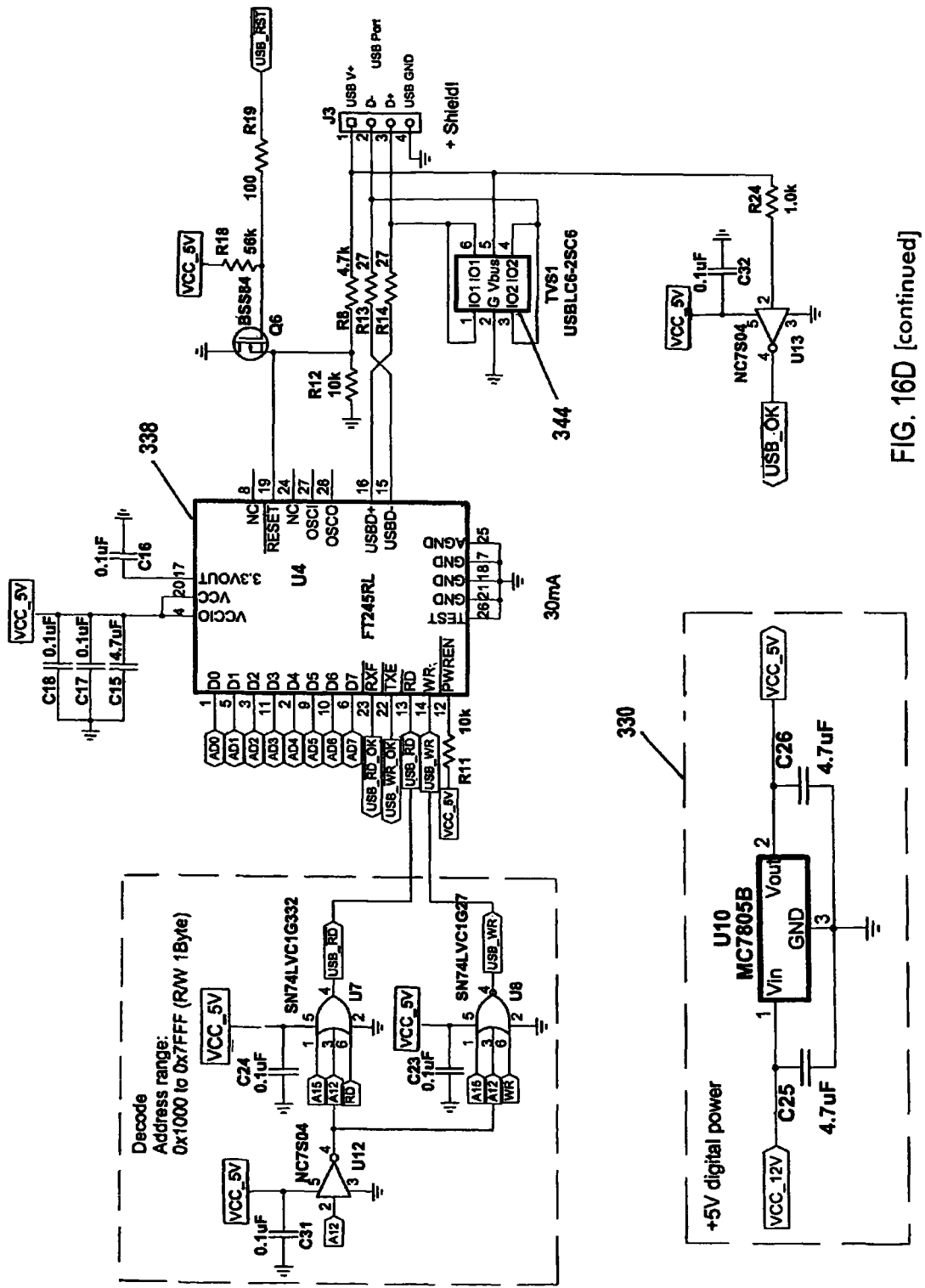
FIG. 16D [continued]

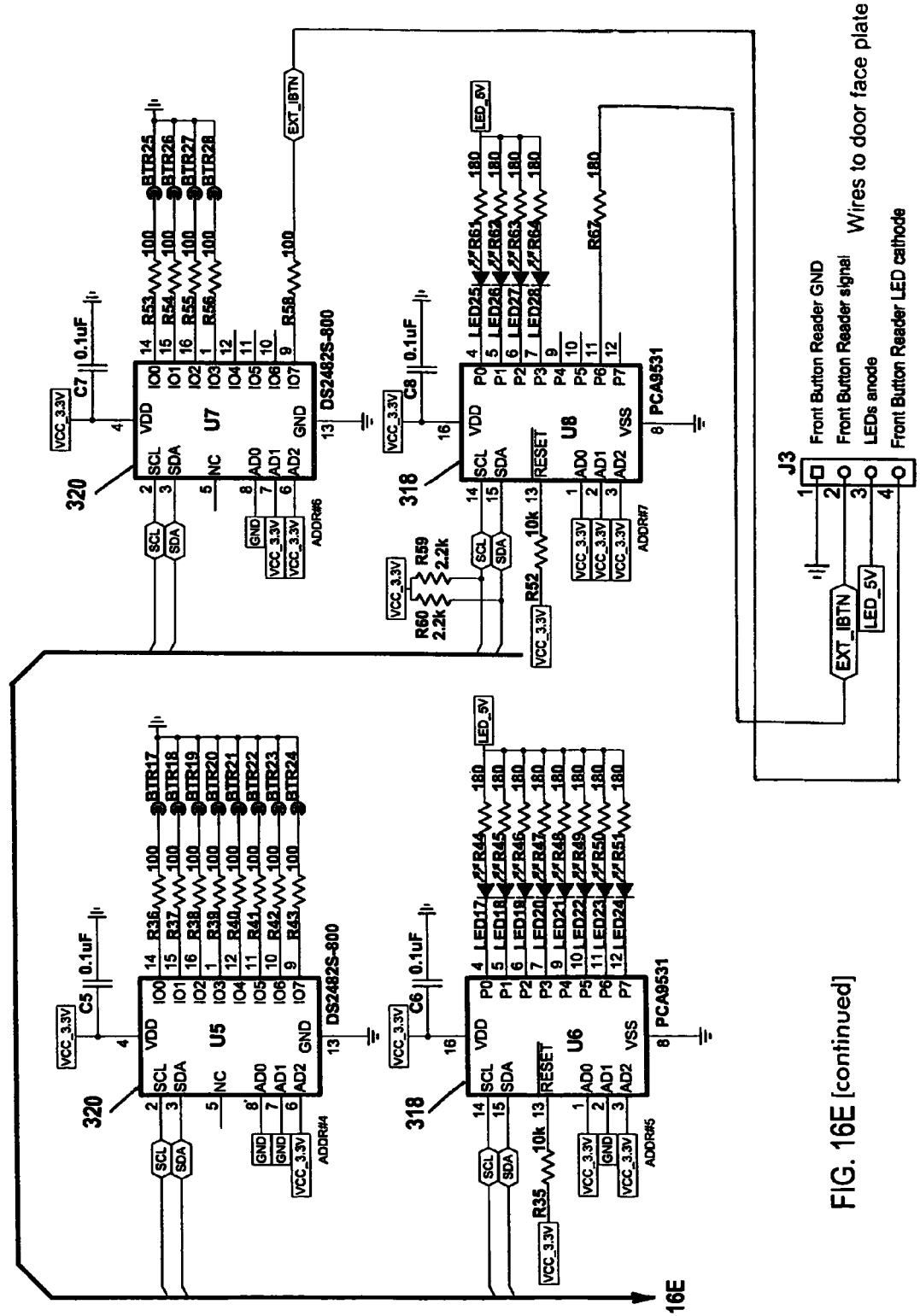
FIG. 16E [continued]

ITEM STORAGE AND TRACKING SYSTEM

CROSS REFERENCE TO RELATED APPLICATIONS

This application is based on and claims benefit of U.S. Provisional Application Ser. No. 61/187,046, filed Jun. 15, 2009, entitled ITEM STORAGE AND TRACKING SYSTEM and U.S. Provisional Application Ser. No. 61/293,976, filed Jan. 11, 2010, entitled ITEM STORAGE AND TRACKING SYSTEM. A claim of priority is hereby made to the above applications and the contents of the above applications are specifically incorporated herein by reference.

BACKGROUND OF THE INVENTION

The present invention relates to a system for the tracking, the securing, and the identification of objects such as keys.

The tracking of keys that open doors of apartments or cars, remains a challenge.

In one known solution, a large number of keys are secured in a locked cabinet, and a computer system interfaces with the cabinet to keep records as to what is kept in the cabinet, who accesses the cabinet, which keys have been withdrawn, and which keys have been returned.

In another known system, a "presence function," as referred to herein, enables a user to determine whether a key is present or absent, and a related database function can then determine removal and insertion activity by changes in the "presence" data. In addition, a "location" function may be provided, wherein a user can determine where a particular key is located within a cabinet, for example, to facilitate the identification of the location of a specific key.

Common users of these known key management systems include automotive dealerships, which hold keys to many cars on their lots, or multi-dwelling residential buildings, in which the front desk staff have emergency keys for accessing each of the apartments. These systems typically involve (1) an outer cabinet that is locked and unlocked based on a user authentication code or process, (2) multiple preconfigured wired slots, clips or recessed wells, either in the base of a pull-out drawer or on a wall-mounted panel, (3) an assembly whereby each key to be tracked is attached to a special tag containing an "iButton" (as known in the art) or other computer-readable device that has a unique serial number, and/or (4) a mechanism whereby insertion or removal of an iButton/Keytag assembly from/to any of the wired slots is noted by the computer. In this system, upon insertion of iButton/Keytag assembly related information is provided to the computer through the connection provided in the slot. That is, the computer is operatively connected to I/O terminals in each slot which connect to corresponding I/O terminals on a tag in order to send and receive information from the tag.

In addition, some systems provide the wired slots arranged in a grid and the insertion surface is marked with letter and number coordinates (e.g. rows a-z, columns 1-15) and a computer keeps track of the row/column coordinates of the slot in which the key is found. In this way, a computer can direct the user to pick a certain key for a certain apartment by going to location "B7" for example.

In other known systems, the slots are not located in a row/column labeled grid, and the user is instead notified of the location of the key by an LED light that is illuminated at a location of a slot containing the key. In one known system, both methods are used, and the location of a key is identified by a computer providing a row/column coordinate as well as a lighted LED. Providing a way to identify an otherwise unmarked key's location is desirable because the key-tag assembly does not have to be marked with identifying information. Marking keys with identifying information reduces security, such as when keys are removed from a cabinet and circulating. Further, providing a row/column coordinate and/or illuminating a key precludes a need to mark slots in a cabinet with specific information, such as apartment numbers. This prevents a need for staff to return keys to correct slots, thereby removing an extra burden on staff and avoiding confusion when tags are returned to the wrong slot. Furthermore, in the event of a malfunction (e.g. a short) the whole panel must be replaced, which is expensive, and, with a single panel it is difficult to vary the spacing to accommodate objects of different size.

The drawback to using a grid-type arrangement is that the number of slots for receiving tags is fixed. For example, a system can be devised to have 200 slots to accept 200 tags. However, the number of slots cannot be expanded without devising a new panel. Thus, should there be a need to have 230 slots, a new panel having 230 slots must be provided with a new grid numbering. Alternatively, two 200 slot panels must be used to accommodate the extra 30 slots. In short, the use of a single panel containing a plurality of slots with column and row numbering is inflexible.

In another known system, a wireless design is provided, in which a key-tag assembly does not require physical contact with and insertion into a clip within a slot that reads the tag. This design typically utilizes radio frequency identification ("RFID") tags and antennas instead of iButtons and clips in slots. Each slot for a key may contain a separate antenna (attached to a common RFID reader) and each keytag assembly that is inserted into the "slot" contains a passive RFID tag. Further in this known system, the connection between the keytag assembly RFID tag and the tag "reader" is wireless. The RFID reader activates the different antennas sequentially and reads the RFID tag in each chamber. Similar to the iButton System, the currently known RFID system also requires the specific wiring of each slot.

Yet another known system separates the "presence" and "location" functions, but also uses RFID tags. In this design, the "presence" of a tag in the drawer is detected by a single RFID reader that reads tags throughout a drawer when the drawer is closed. The drawer also has a slot into which each keytag assembly (containing an RFID tag) is inserted and the slot provides simply an on/off indication of a key present or absent (there is "no reader" in the slot that can identify which key is in that slot). In this system, "presence" of all keys is determined when the drawer is closed and when it is re-closed after it had been opened.

It is, however, problematic to get accurate RFID readings of keys present/keys removed in an open field with a drawer open without getting false positives or false negatives of keys removed but nearby. Determining whether a key has been removed or has been added, or determining the location of each specific key is accomplished via a series of logical algorithms. The logical algorithms require the database to keep a running inventory of which keys are in which slots, and which keys have been removed, added or moved to which location by combining data as to which keys have changed in their presence status, and which slots have changed in their occupied/unoccupied status, with provisions being made for keys and locations that are "ambiguous". Thus, for example, when a few keys are removed and a few keys are returned at the same time the algorithm will have a difficult time to determine which key was returned and which key was taken. The use of this complicated algorithm is necessary because the individual slots are not wired to read the unique IDs of the inserted assemblies, and thus can not determine and report on the location of a specific key assembly directly.

In addition, none of the known systems that utilize multiple RFID tags can be read both when a cabinet is open and when closed, and none enable RFID tags to be read using only a single reader and antenna without having to prewire each slot with its own antenna. The reason for this lies in the limitations of precision for RFID tags and readers. It is problematic to have a precise reading field whereby none of the tags that are in the box are "missed", and whereby none of the tags that may be located immediately outside of the box or within a few inches are picked up by the readers and marked present. Since known systems provide for a very short-range antenna in each slot, wiring up each slot in a box becomes necessary.

Further, passive tags, typically, require a better "coupling" with the field generated by the reader, and are more prone to false negatives (undetected tags which are present). Active tags, which are self-powered, produce stronger signals independent of the reader's generated field, and are more prone to false positives (reading a tag that has been removed) since their signals can typically travel as far as five feet. Regardless, a known problem with any RFID reader/tag system for tracking purposes is that it requires careful placement and alignment of readers, tags and antennas in order to end up as close to the middle of the false positive-false negative continuum, and even then one is not immune to a certain amount of both error types when working within small distances and around metallic objects.

SUMMARY OF THE INVENTION

It is an object of the present invention to provide a system and a method for the storage, the tracking and on-demand identification of trackable objects such as keys.

Another object of the present invention is to provide an item storage system that is easy to operate by an end user, size-customizable, and functionally programmable.

Thus, an item storage system for storage of items according to one embodiment of the present invention includes at least one item storage for secure storage of items, the storage having a resident programmable subcontroller, at least one stand residing in the interior of the storage and including two spaced walls, and a circuit board supported by the walls of the stand inside the storage, the circuit board including a plurality of spaced elongated openings extending from a front surface thereof to a back surface thereof and a plurality of connectors each arranged on the back surface of the circuit board adjacent a respective side of an opening opposite another connector, the connectors being in communication with the programmable subcontroller.

According to an aspect of the present invention a storage facility that does not include a programmable subcontroller may be operatively connected to the subcontroller of the first storage facility whereby the storage capacity of the system may be increased.

A visual indicator such as an LED may be associated with each one of the openings in the circuit board to provide information to the user visually. For example, the visual indicators may be single color or multi-color LEDs. A system according to the present invention can receive a plurality of links, each link including a coupling for mechanical coupling to one of the items and an electronic storage device uniquely identifying the link. A controller, for example, a PC, can be operatively connected to the subcontroller and programmed to operate a visual indicator associated with each opening in order to identify a link received in the opening in response to a user request for the item that is mechanically coupled to the link received in the opening. An electronic reader may be provided outside the storage for reading the electronic storage devices of the links.

The controller may be programmed to operate a plurality of visual indicators in response to a user request for identification of location of a plurality of items in the storage. The controller may be also programmed to operate each visual indicator continuously, intermittently, or when the visual indicators are multi-color LEDs, the controller may be programmed to operate the LED to emit a different color to indicate a different condition, or to operate a plurality of visual indicators in a sequence to indicate a position of a link inside the storage.

According to one aspect of the present invention one of the walls of the stand is shorter than the other one of the walls whereby the circuit board is oriented in a downwardly direction.

According to another aspect of the present invention another stand that supports another circuit board may be provide inside the storage, the another stand may be spaced from the at least one stand to provide a space for receipt of the items.

According to yet another aspect of the present invention the storage includes a visual indicator on the exterior thereof to indicate a status of the storage. The visual indicator residing on the exterior surface of the storage may be a multi-color LED, each color being indicative of a respective status of the storage.

According to a further aspect of the present invention a light sensor that measures the intensity of ambient light and the intensity of the light emitted by the visual indicators is adjusted according to the measurement of the intensity of the ambient light by the light sensor.

According to another aspect of the present invention a basket may be provide that includes an interior accessible through an opening in a side wall thereof, and an electronic storage device identifying the basket, wherein the opening in the side wall of the basket is rendered inaccessible by one of the walls of the stand when the electronic storage device of the basket is received in a respective opening of the circuit board.

The specific features and advantages of the present invention will become apparent from the following description of the invention which refers to the accompanying drawings.

BRIEF DESCRIPTION OF THE DRAWINGS

FIG. 3A shows a top plan view of a circuit board used as support for electronic storages, visual indicators for identification of electronic storages, and electrical components for communication with electronic storages and visual indicators used in a system according to the present invention.

FIG. 3B shows a bottom view of the circuit board shown by FIG. 3A.

FIG. 4B" shows another side plan view of the arrangement shown by FIG. 4A.

FIG. 7A shows a perspective view of a preferred storage facility used for housing and securing trackable objects for a system according to the present invention.

DETAILED DESCRIPTION OF EMBODIMENTS OF THE INVENTION

Figure 1A:
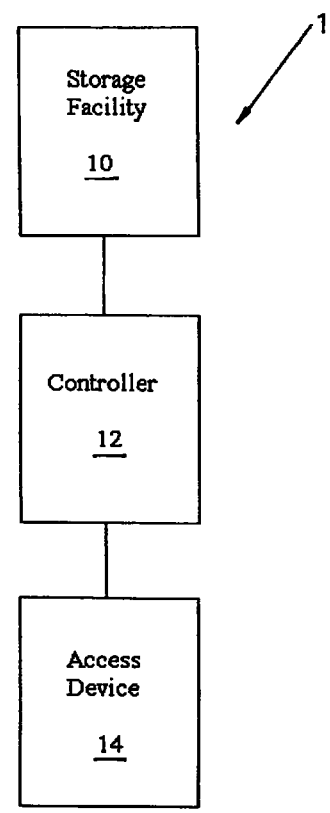
FIG. 1A illustrates a high level topology of a system according to the present invention.

Referring to FIG. 1A, an item storage and tracking system 1 according to the present invention includes a storage facility 10 for the physical storage and housing of items that are to be securely stored and tracked. Storage facility 10 includes an electronic tracking and identification facility for the electronic tracking and identification of items stored therein, which communicates with a controller 12. Controller 12 is preferably a general purpose computer (e.g. a personal computer or PC) which is programmed to receive data from and send data and/or instructions to the electronic tracking and identification facility in storage facility 10. System 1 would further include an access device 14 such as a keyboard or the like, which can be used to provide data and/or instructions to controller 12.

Figure 1B:
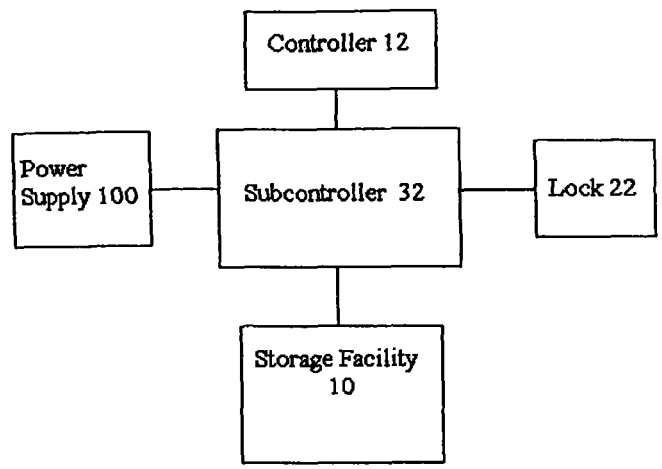
FIG. 1B illustrates a more detailed high level topology of a system according to the present invention.

Referring now to FIG. 1B, the communication between controller 12 and storage facility 10 is preferably enabled by a subcontroller 32 which electronically communicates with controller 12 and the tracking and identification facility disposed inside storage facility 10. Either controller 12 or subcontroller 32 may communicate with an electronic lock 22 used to lock storage facility 10 in order to prevent unauthorized access to the items disposed inside storage facility 10. Furthermore, subcontroller 32, lock 22 and the tracking and identification facility inside storage facility 10 receive power from a power supply 100 for the operation thereof. In the preferred embodiment, power supply 100, subcontroller 32 and lock 22 are physically coupled to and supported by storage facility 10. While in communication with the tracking and identification facility inside storage facility 10, controller 12 need not be supported by storage facility 10.

Figure 1C:
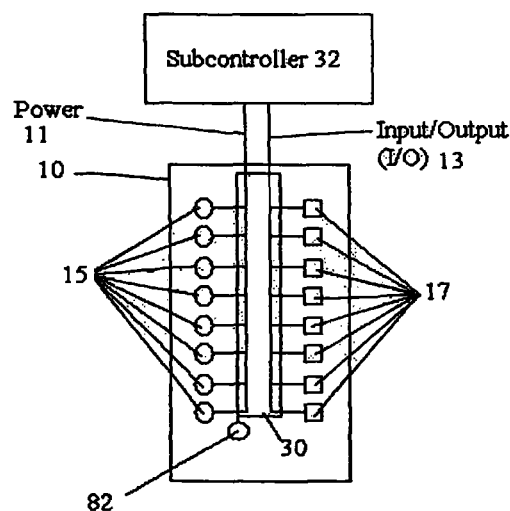
FIG. 1C illustrates a high level topology of a portion of a system according to the present invention.

As schematically illustrated by FIG. 1C, subcontoller 32 provides power to the tracking and identification facility inside storage facility 10 via a power line 11, and sends and receives signals from the tracking and identification facility inside storage facility 10 via an input/output (I/O) line 13. According to one aspect of the present invention, subcontroller 32 is preferably a programmable processor. The tracking and identification facility inside storage facility 10 includes visual indicators 15, which may be light emitting diodes (LEDs) or the like, and electronic memory devices 17, for example, i-buttons. Each electronic memory device 17 serves as electronic storage for information relating to a corresponding object that is mechanically coupled to the electronic storage 17, whereby the object can be tracked and identified by controller 12 as further described below. Each visual indicator 15 serves to locate an electronic storage 17 upon a demand from controller 12, whereby the location of an item that is mechanically coupled to the electronic storage 17 can be identified, as further explained below. Note that a common circuit board 24a or the like may serve as a base for support and electrical communication with, and power delivery to visual indicators 15 and electronic storages 17. Further note that although one circuit board 24a is schematically illustrated, the tracking and identification facility of a system according to the present invention may include a plurality of circuit boards 24a each receiving power from line 11 and each in communication with subcontroller 32 via I/O line 13.

Figure 2A:
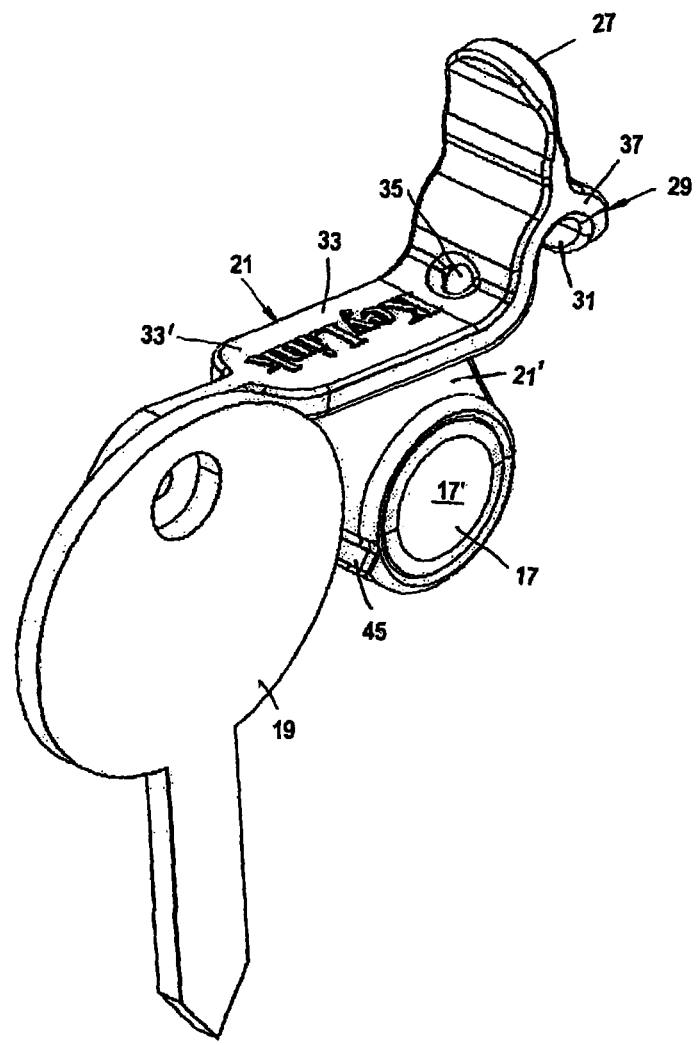
FIG. 2A illustrates an electronic storage and a trackable object (e.g. key) mechanically coupled to the electronic storage using a link according to the present invention.
Figure 2B:
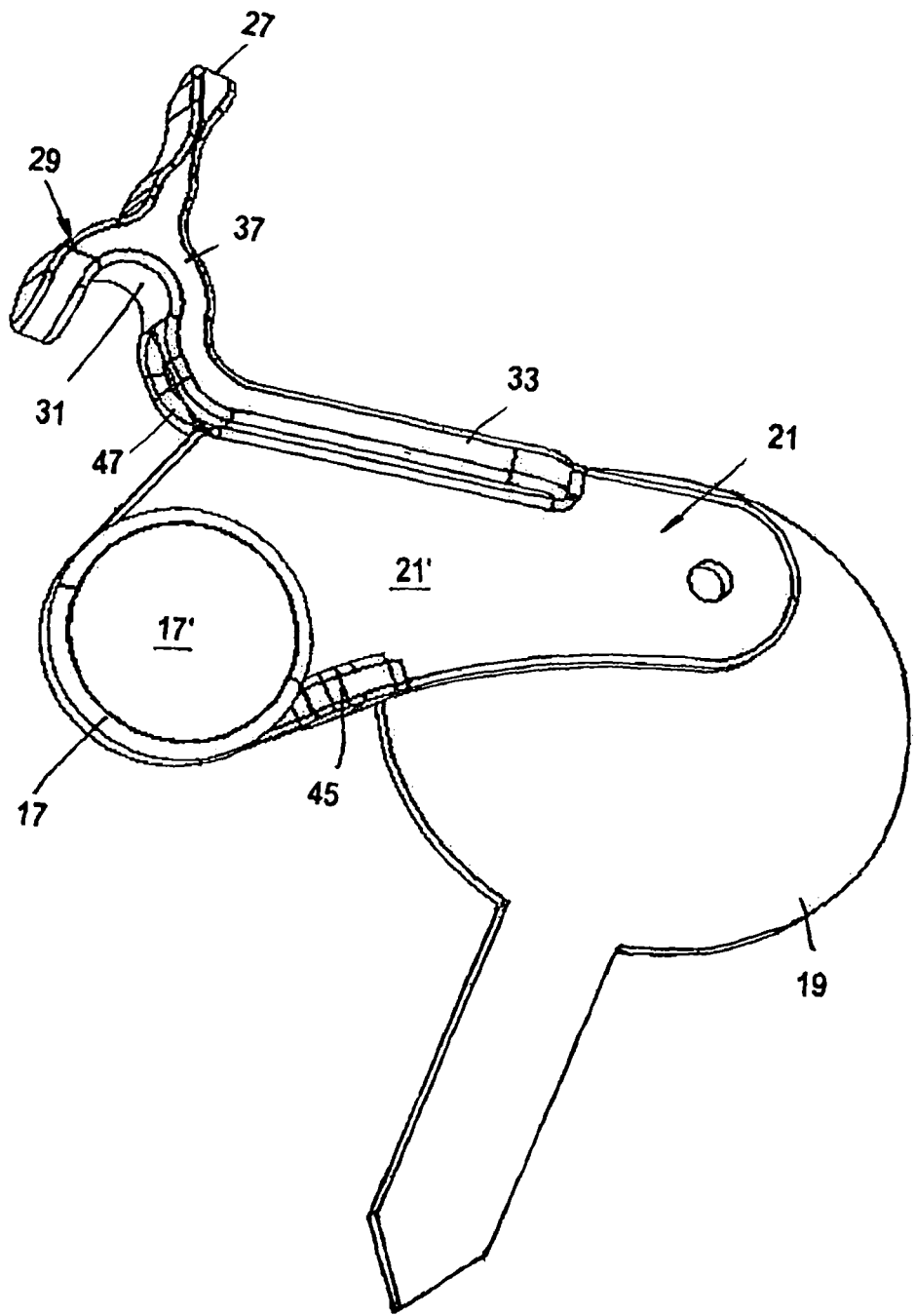
FIG. 2B illustrates another view of the assembly shown by FIG. 2A.
Figure 2C:
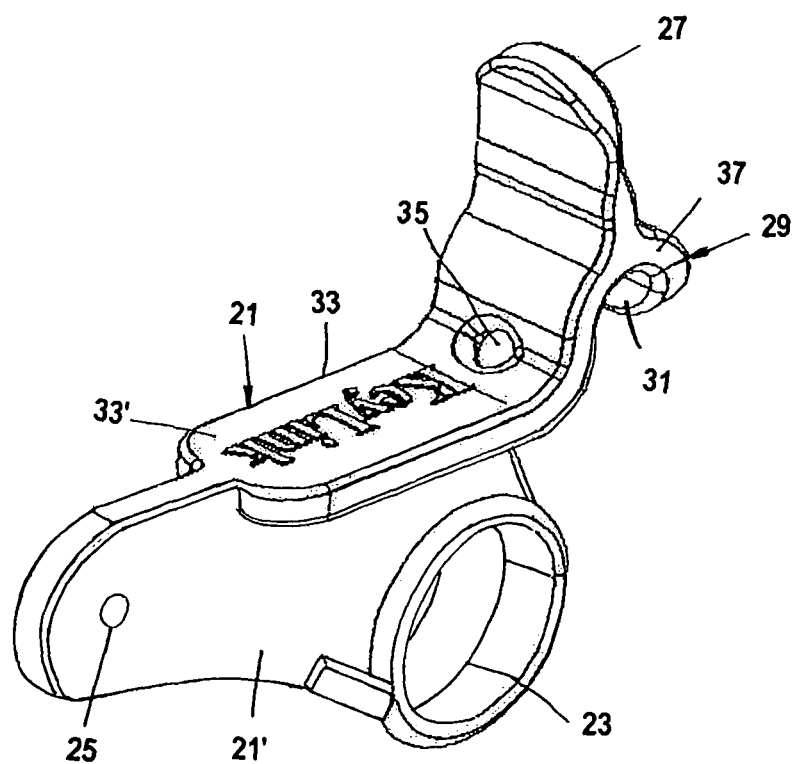
FIG. 2C shows the link used to mechanically couple a trackable object to an electronic storage according to the present invention.
Figure 4A:
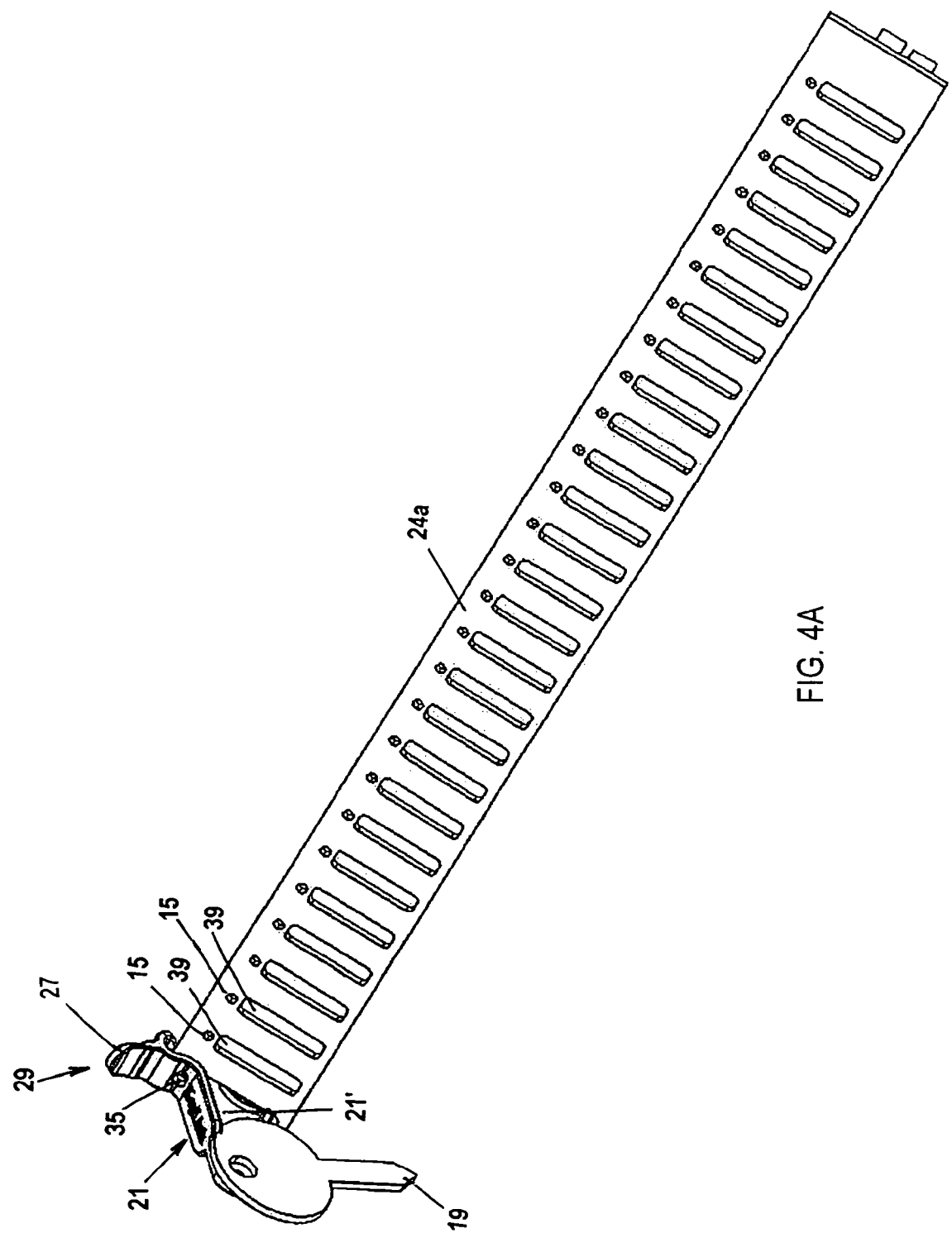
FIG. 4A illustrates an electronic storage that is coupled to a trackable object received by a circuit board.
Figure 4B:
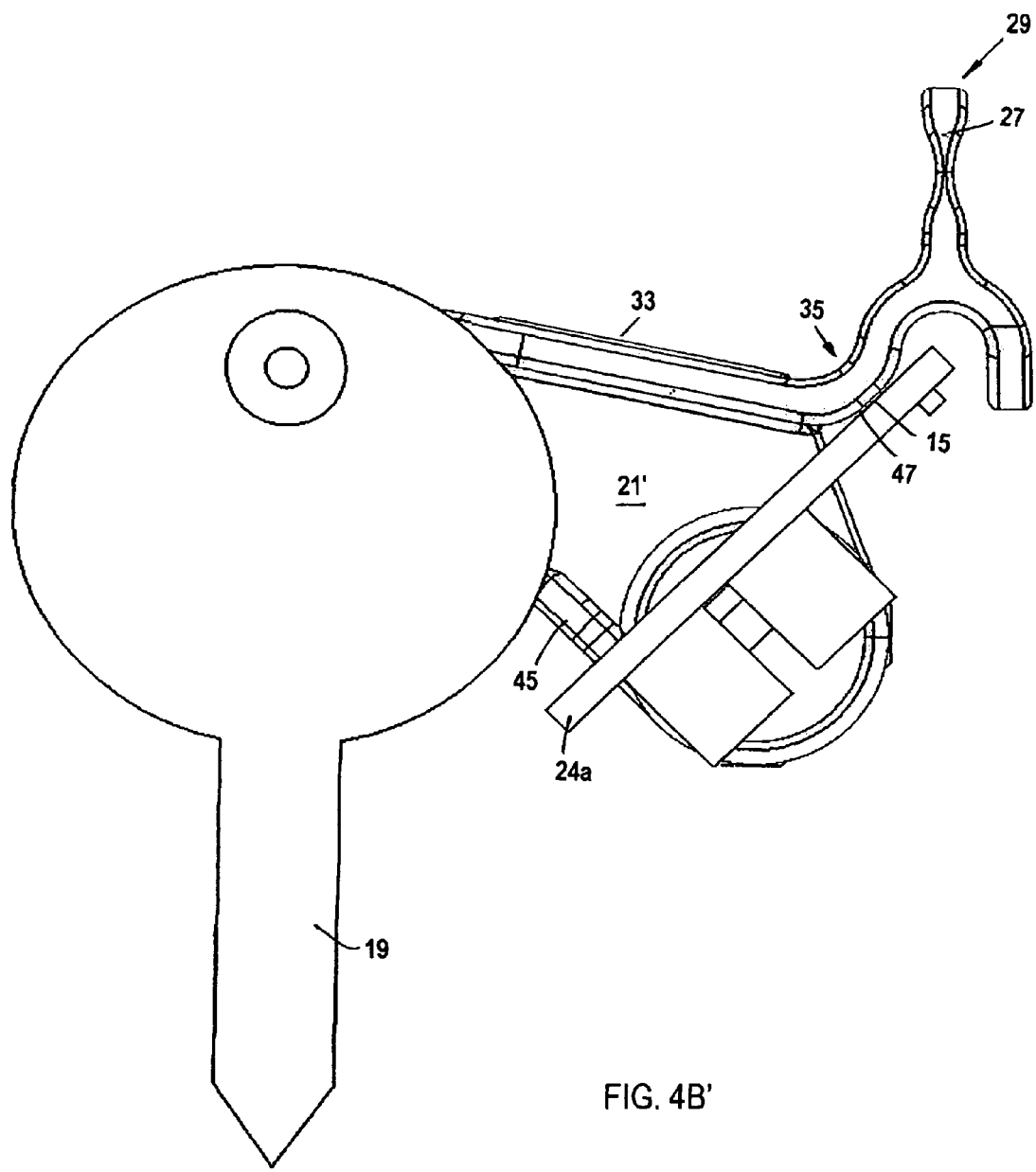
FIG. 4B' shows a side plan view of the arrangement shown by FIG. 4A.
Figure 4C:
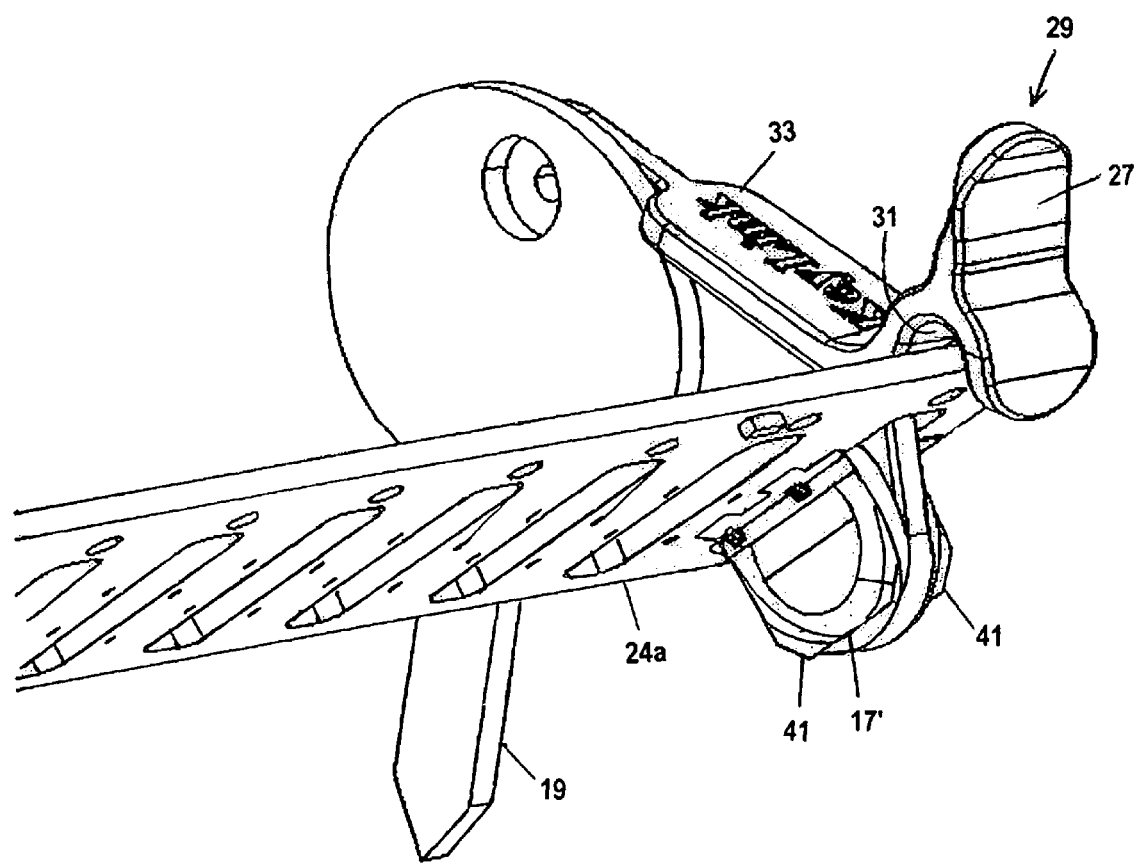
FIG. 4C shows a perspective bottom view of the arrangement shown by FIG. 4A.
Figure 4D:
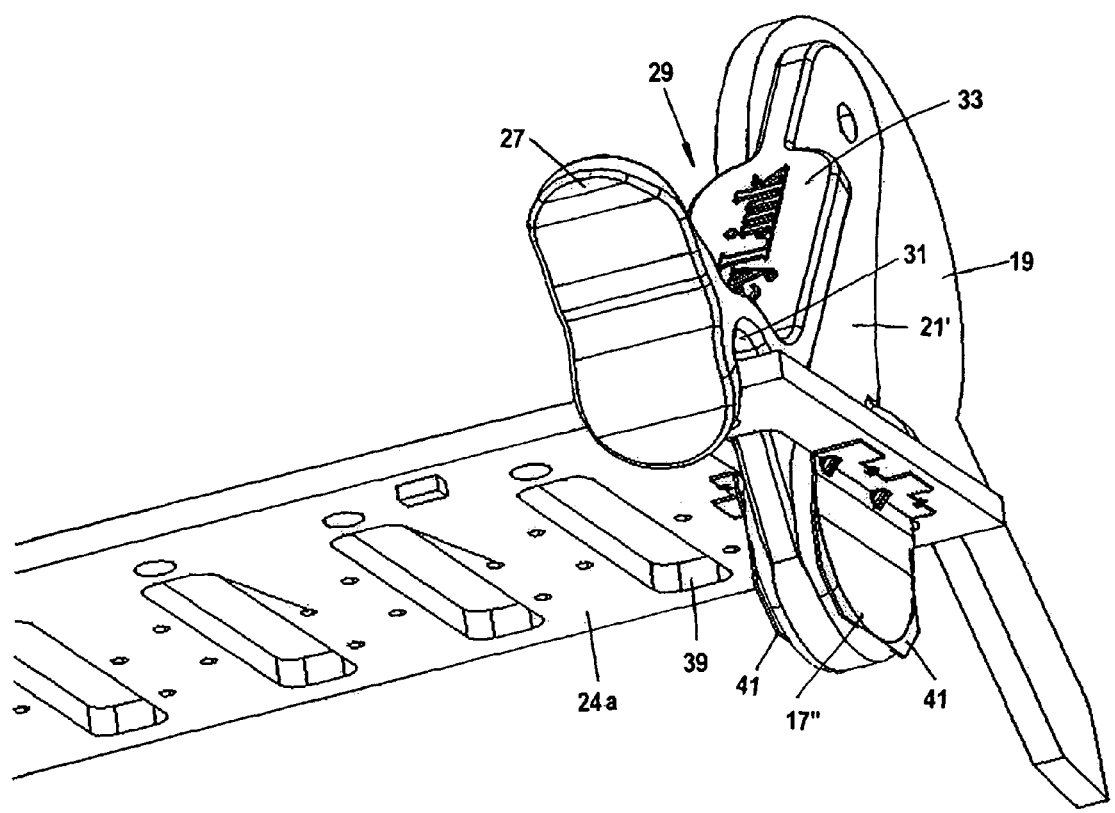
FIG. 4D shows another perspective bottom view of the arrangement shown by FIG. 4A.

Referring to FIGS. 2A, 2B, and 2C, each electronic storage 17 is preferably an i-button or the like device having generally flat input/output terminals 17', 17" on opposing surfaces thereof. In order to associate electronic storage 17 with a trackable object 19, such as a key, electronic storage 17 and trackable object 19 are mechanically coupled to a common link 21. Link 21 is preferably a plastic molded body having a blade portion 21' that includes an opening 23 at one end thereof for receiving an electronic storage 17 therein, and preferably another opening 25 at another end thereof which can be used for coupling link 21 to trackable object 19 using an appropriate fastener such as a bolt, a rivet arrangement, a spiral key ring, a snap on a loop or the like. Note that electronic storage 17 may be mechanically coupled to the interior surface of opening 23 using an appropriate adhesive or the like; however, terminals 17', 17" are left exposed and readied for electrical connection through surface to surface contact. Link 21 further includes a grip 27 which is preferably configured to be grabbed between the thumb and the index finger of a person. Disposed directly below grip 27 is a saddle portion 29 having an interior concave surface 31 resembling the interior surface of a tube. Saddle portion 29 includes a tail portion 33 that extends along an edge of blade portion 21' that is disposed between opening 23 and opening 25. Tail portion 33 preferably includes a flat surface 33' (see FIG. 2A) on which an indicia (e.g. a logo, a trademark or any other information) can be printed. In addition, link 21 includes a light orifice 35 located between the curved portion 37 and the tail portion 33 of saddle 29. Link 21 and electronic storage 17 form an electronic tag, which can be used to identify and track trackable object 19. Specifically, information for the identification of trackable object 19 can be loaded onto electronic storage 17, and read by controller 12 to identify and locate trackable object 19. For example, trackable object 19 may be a car key or a key to a room or an apartment. Electronic storage 17 may be loaded with information relating to the car (e.g. make and model of the car), if object 19 is a car key, the room (e.g. a particular classroom), if the object is a room key, or the apartment (e.g. the number of the apartment), if the object 19 is an apartment key. Alternatively, electronic storage 17 of an electronic tag to which an object 19 is attached may be preloaded with a unique serial number that is then associated with the attached object 19 by a user using controller 12. Thus, controller 12 can track/identify the attached object 19 by tracking the location of the electronic storage 17.

Referring now to FIGS. 3A and 3B, in a system according to the present invention, a circuit board 24a is used to (a) provide support for connectors that make direct electronic contact with terminals 17', 17" of an electronic storage 17, and (b) provide support for visual indicators 15 e.g. LED's. Specifically, circuit board 24a includes a plurality of spaced, rectangularly shaped, openings 39 therein which are arranged in a row along the length of circuit board 24a. A visual indicator 15 is disposed above an end of each rectangularly shaped opening 39 on a front surface of circuit board 24a. Referring specifically to FIG. 3B, a pair of connectors 41 is coupled to the bottom surface of circuit board 24a opposite the front surface thereof. Each connector 41 is preferably a flat metallic web that is disposed at a respective long edge of a respective rectangularly shaped opening 39. It should be noted that although only one pair of connectors 41 is shown, in a system according to the present invention, each opening 39 would be associated with a respective pair of connectors 41 as described. In addition, note that circuit board 24a further includes input/output couplers 43 which supply power as well as input/output signals to connectors 31, and visual indicators 15 via appropriate conductive traces on the bottom surface of circuit board 24a. One advantage of mounting connectors to the back surface of circuit board 24a is that the connectors self-align to the openings. Thus, there is no need for aligning one plane that includes the openings to another plane on which the connectors are located. Furthermore, the circuit board 24a can function to protect the connectors from shorting or damage by objects that may fall through the openings, which is a drawback of systems that include one plane for the connectors and another plane with openings for the alignment and direction of the tags toward the connectors.

Referring now to FIGS. 4A-4D, each rectangular opening 39 is wide enough to receive an electronic storage 17 that is mounted onto a respective link 21. The space between the opposing surfaces of connectors 41 is less wide than the space between terminals 17', 17" of electronic storage 17, whereby, upon insertion between connectors 41, connectors 41 make firm surface contact with terminals 17', 17". Thus, connectors 41 can also serve as a clamp to frictionally retain an electronic storage 17 in place. As illustrated, an electronic storage 17 may be inserted into an opening 39 and clamped between connectors 41, whereby connectors 41 make electrical contact with terminals 17', 17" of electronic storage 17. As a result, couplers 43 can be used to send and receive electronic signals to electronic storage 17 so that information can be obtained from electronic storage 17. Furthermore, according to another aspect of the present invention, light orifice 35 may be aligned with a visual indicator 15 so that light emitted from visual indicator 15 can be seen through opening 35. Note that, optionally, a light diffuser or the like may be installed inside orifice 35 to disperse the light. To assist in the proper alignment of orifice 35 to a visual indicator 15, link 21 may include stops 45 on opposite surfaces of blade 21', which abut the front surface of circuit board 24a. Thus, in the preferred embodiment, as illustrated, saddle 29 includes one surface 47 surrounding light orifice 35 that is located between surface 31 and tail portion 33. Surface 47 abuts the front surface of circuit board 24a above one end of an opening 39, and stops 45 also abut the front surface of circuit board 24a below an opposing end of the opening 39 to ensure the proper alignment of connectors 41 with terminals 17', 17" of electronic storage 17 and the proper alignment of light orifice 35 with a respective visual indicator 15.

Figure 5A:
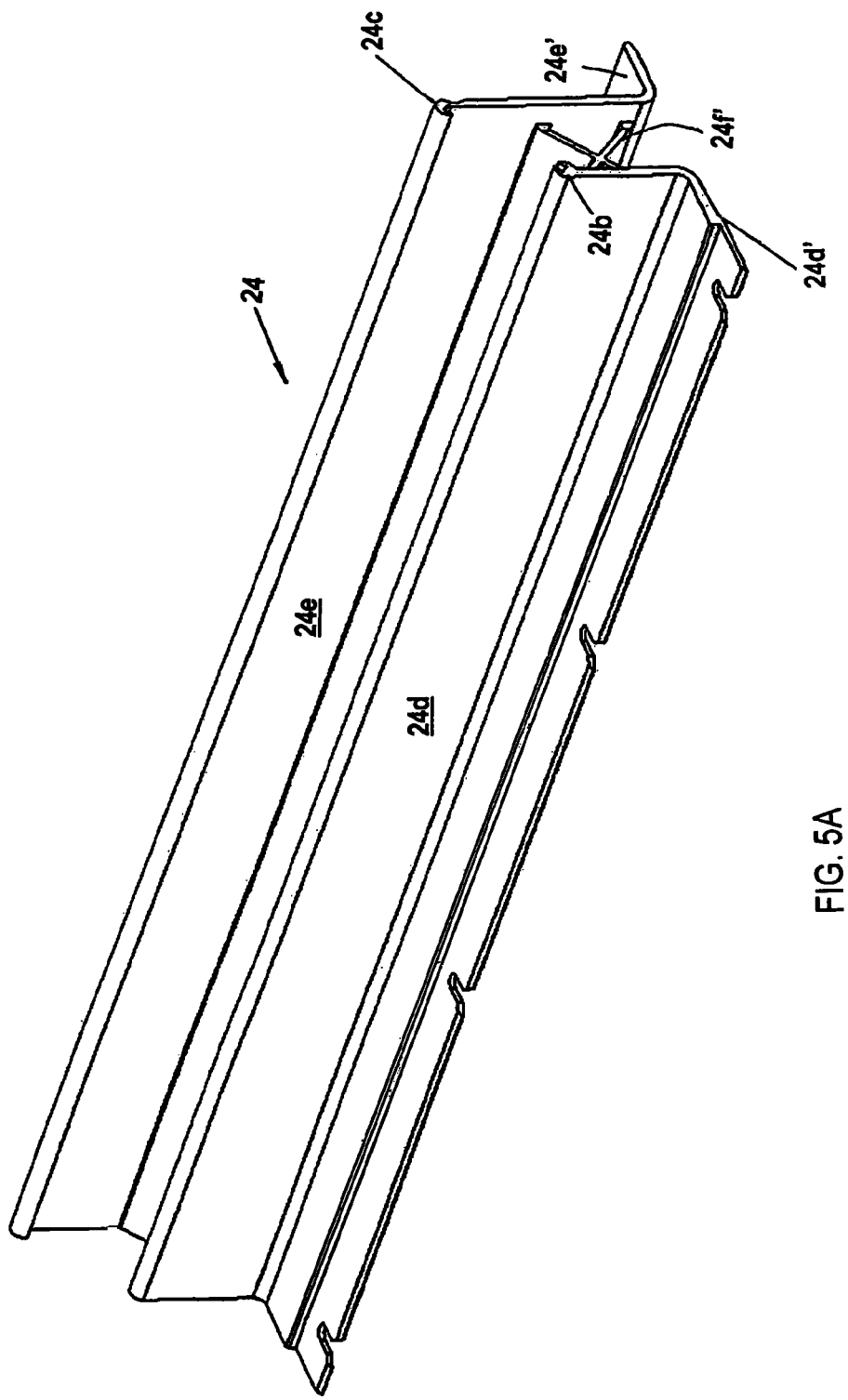
FIG. 5A shows a perspective view of a stand for the support of a circuit board as shown by FIG. 3A.
Figure 5B:
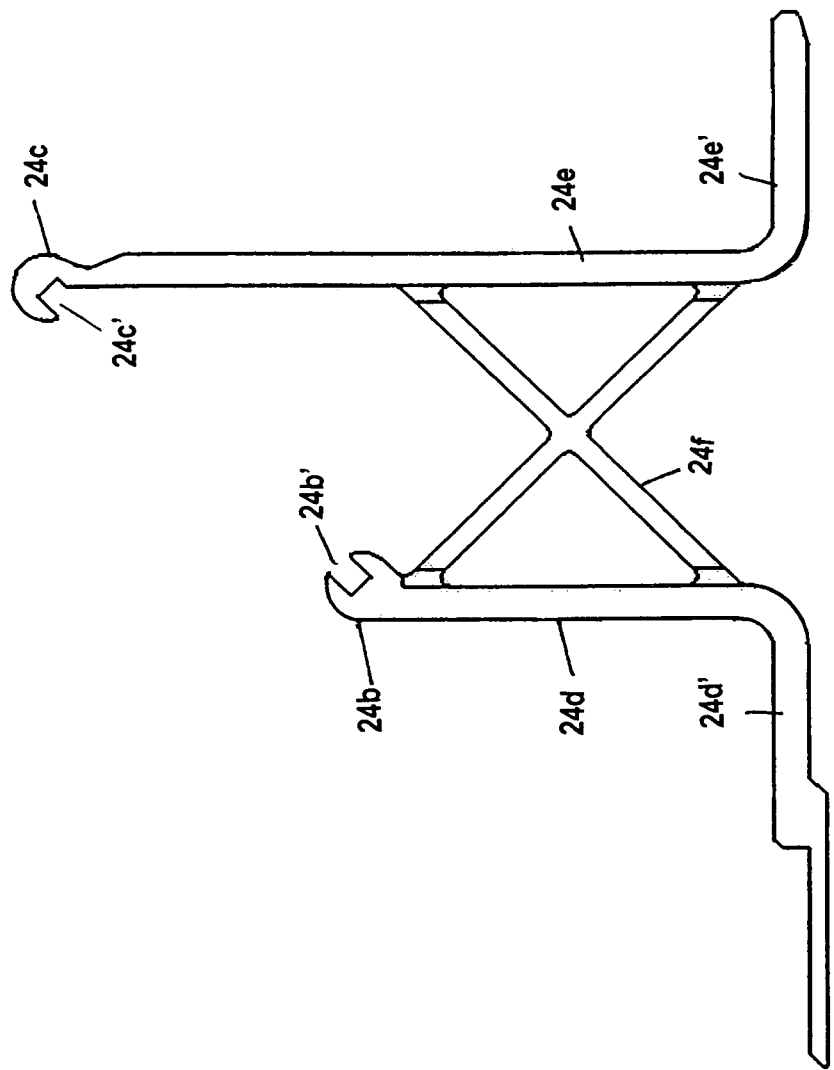
FIG. 5B shows a side plan view of the stand shown by FIG. 5A.

Referring now to FIGS. 5A and 5B, circuit board 24a is preferably secured to a stand 24. Stand 24 is preferably a single piece, unitary body that includes a front wall 24d, a preferably parallel back wall 24e, and a spacer 24f having preferably a cross-shaped cross-section spacing and mechanically coupling front wall 24d to back wall 24e. Preferably spacer 24f extends continuously along the length of front wall 24d and back wall 24e. It should be noted that a single spacer 24f may be replaced with a plurality of spacers without deviating from the scope and the spirit of the present invention. As it will become apparent to a skilled person, a stand 24 according to the present invention allows for a modular configuration, which renders a system according to the present invention flexible.

Figure 5C:
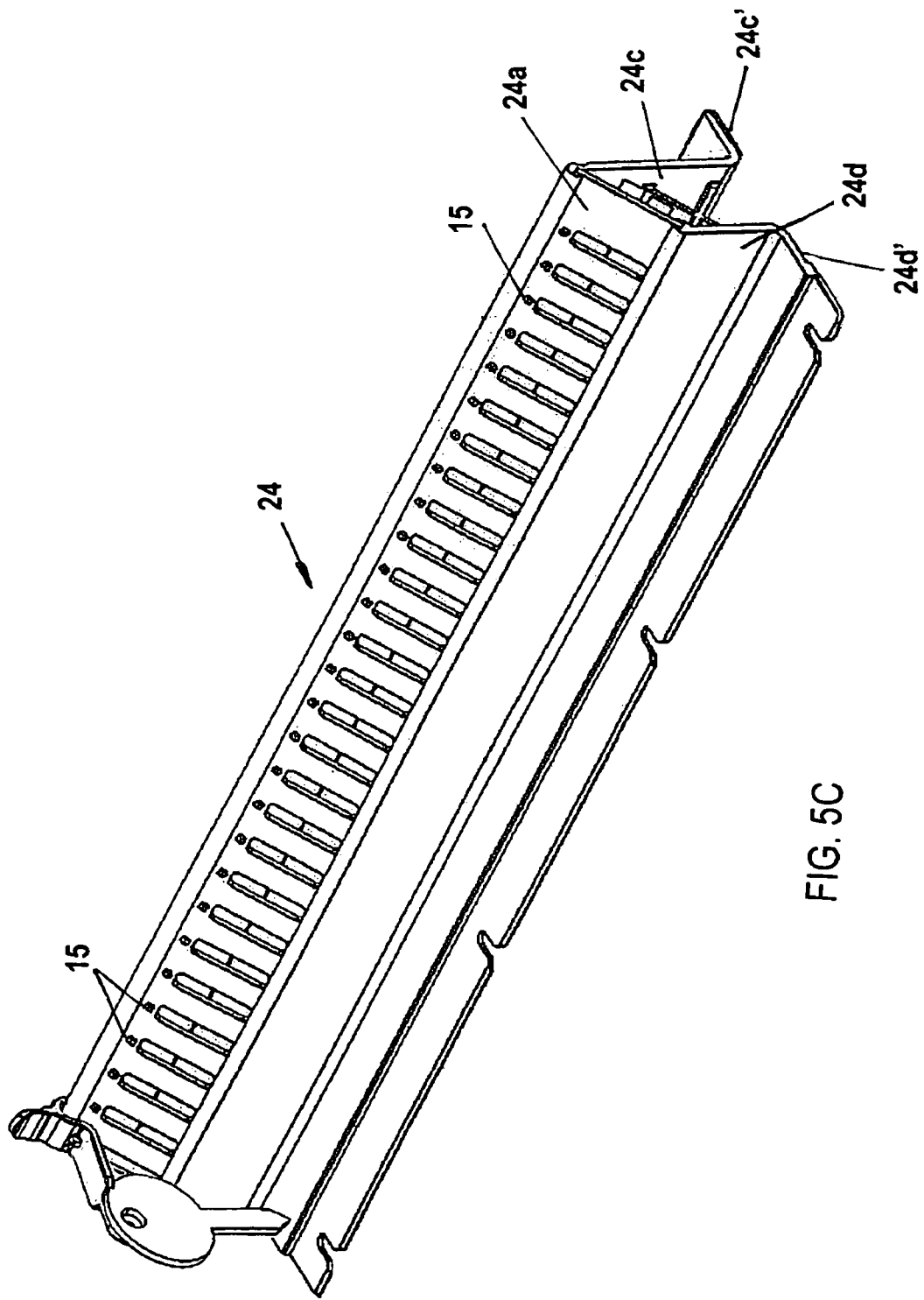
FIG. 5C shows a perspective view a stand as shown by FIG. 5A supporting an arrangement as shown by FIG. 4A.
Figure 5D:
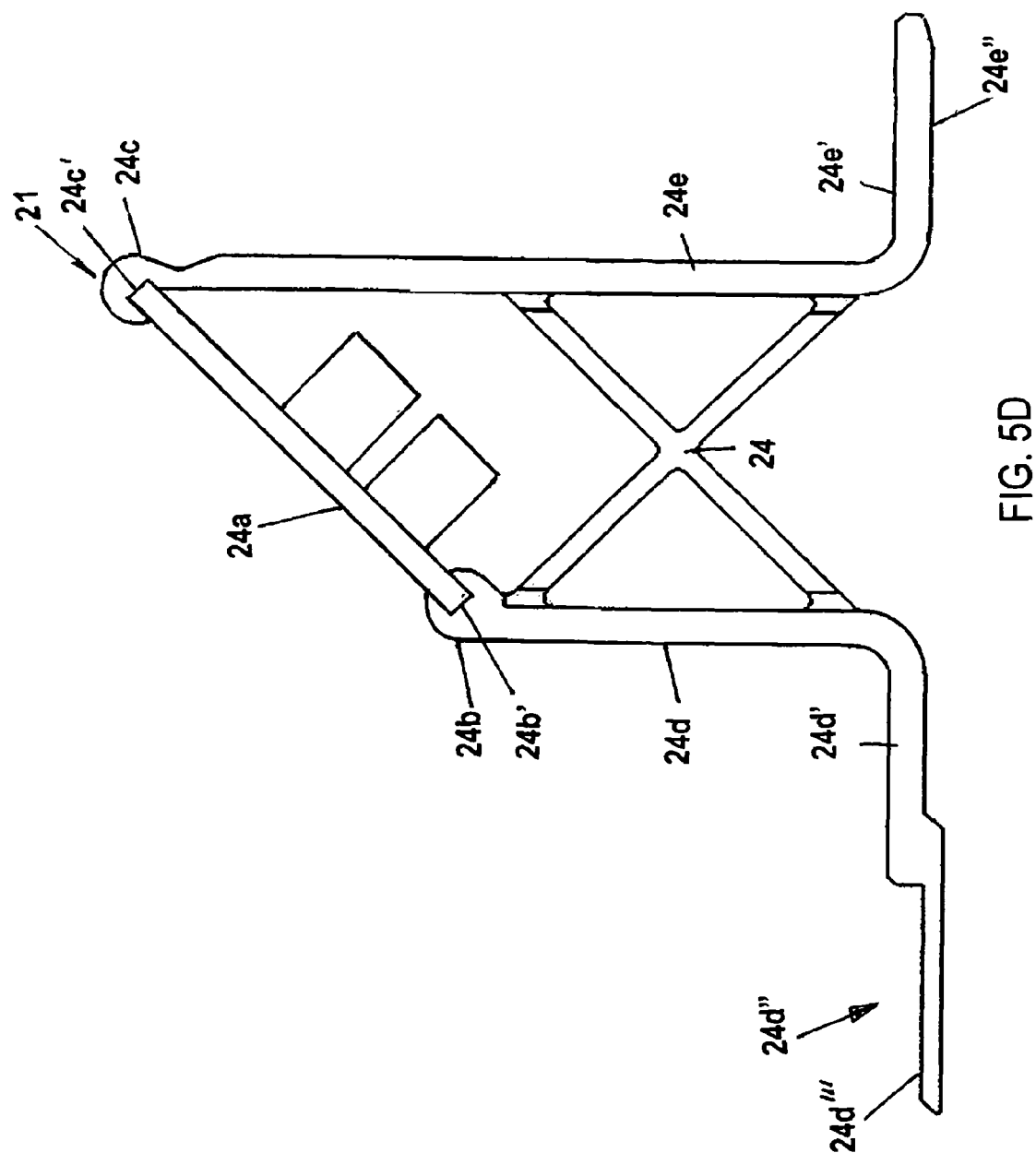
FIG. 5D shows a side plan view of the arrangement shown by FIG. 5C.

Each wall 24d, 24e includes a respective base 24d', 24e' that serve as feet for stand 24. Furthermore, each wall 24d, 24e includes a respective rail portion 24b, 24c that extends continuously along a top edge thereof. Each rail portion 24b, 24c includes a continuously extending channel 24b', 24c'. Channels 24b', 24c' are opposite one another and are sized and shaped to receive corresponding edges of a circuit board 24a therein, whereby circuit board 24a can be supported by stand 24 as illustrated by FIGS. 5C and 5D. Note that an adhesive or the like may be used to further enhance the mechanical integration of stand 24 and circuit board 24a.

According to one aspect of the present invention, back wall 24e is taller than front wall 24d. Thus, circuit board 24a is tilted and sloped downwardly such that visual indicators 15 are positioned at a higher level relative to rail 24b of front wall 24d. As a result, when stand 24 resides on a flat surface, visual indicators 15 are more readily visible by an observer having a vantage point above and in front of the flat surface. Also, the tilted circuit board allows for the storage of a larger number of objects thereby improving packing density and also allows for the storage of objects of varying size and shape. It should be noted that the height difference between front wall 24d and back wall 24e of a stand can be adjusted so that a circuit board 24a that is integrated with the stand 24 can be tilted at different angles. This feature of the design allows for the configuration of the optimum viewing angle in relation to the compartment or the compartment's mounting. For example, if a cabinet is used to house the circuit boards 24a that includes an open top, the angle of circuit boards 24a can be adjusted accordingly since the circuit board is being viewed from the top. If a wall-mounted drawer is used to house circuit boards 24a, the angle of circuit boards 24a can be adjusted by adjusting the difference in height between front wall 24d and back wall 24e supporting the circuit boards 24a. Thus, advantageously, stands 24a according to the present invention allow for reconfiguration to achieve optimum visual access to the stored objects and the location thereof regardless of the type of storage used or the orientation of the storage.

According to another aspect of the present invention, each stand 24 is configured to mate with another stand 24. As a result, a system according to the present invention is modular, which means that (a) it can be expanded to accept more electronic storage devices 17 and thus more objects for tracking by adding more rows (b) it can be updated and/or repaired more readily and more cost effectively (c) it can be custom-fitted to cabinets of different size (d) it can be arranged to accept items of different size and shape inside the same cabinet.

Figure 5E:
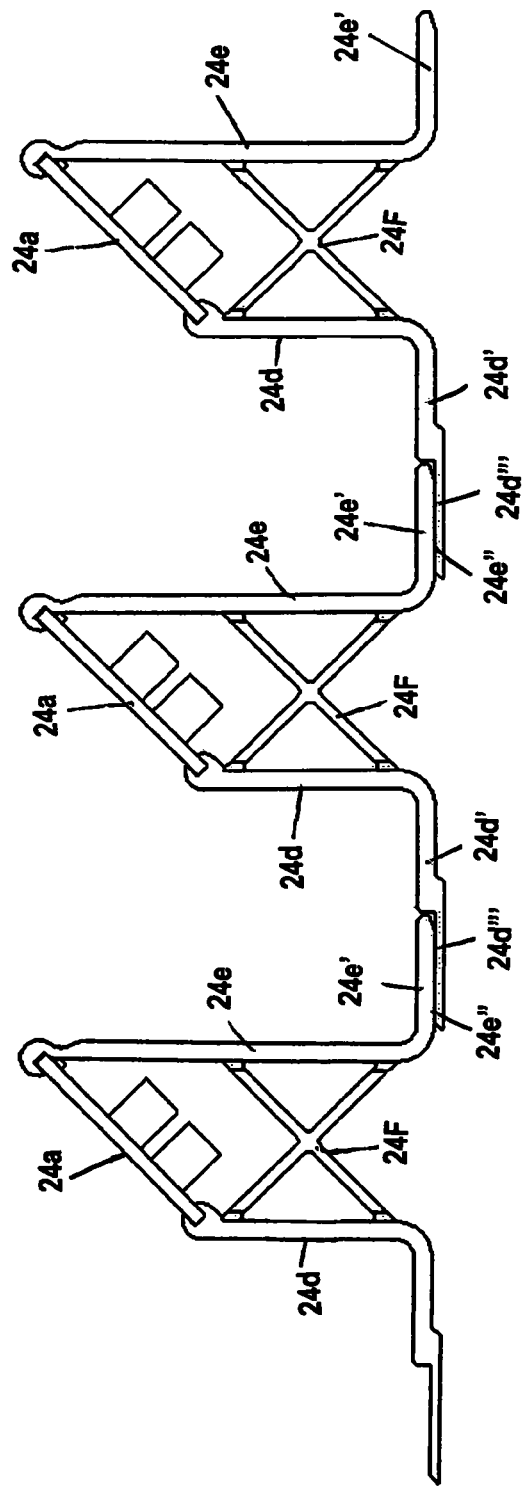
FIG. 5E shows a side plan view of a plurality of stands mated to one another to form a modular panel according to one aspect of the present invention.
Figure 5F:
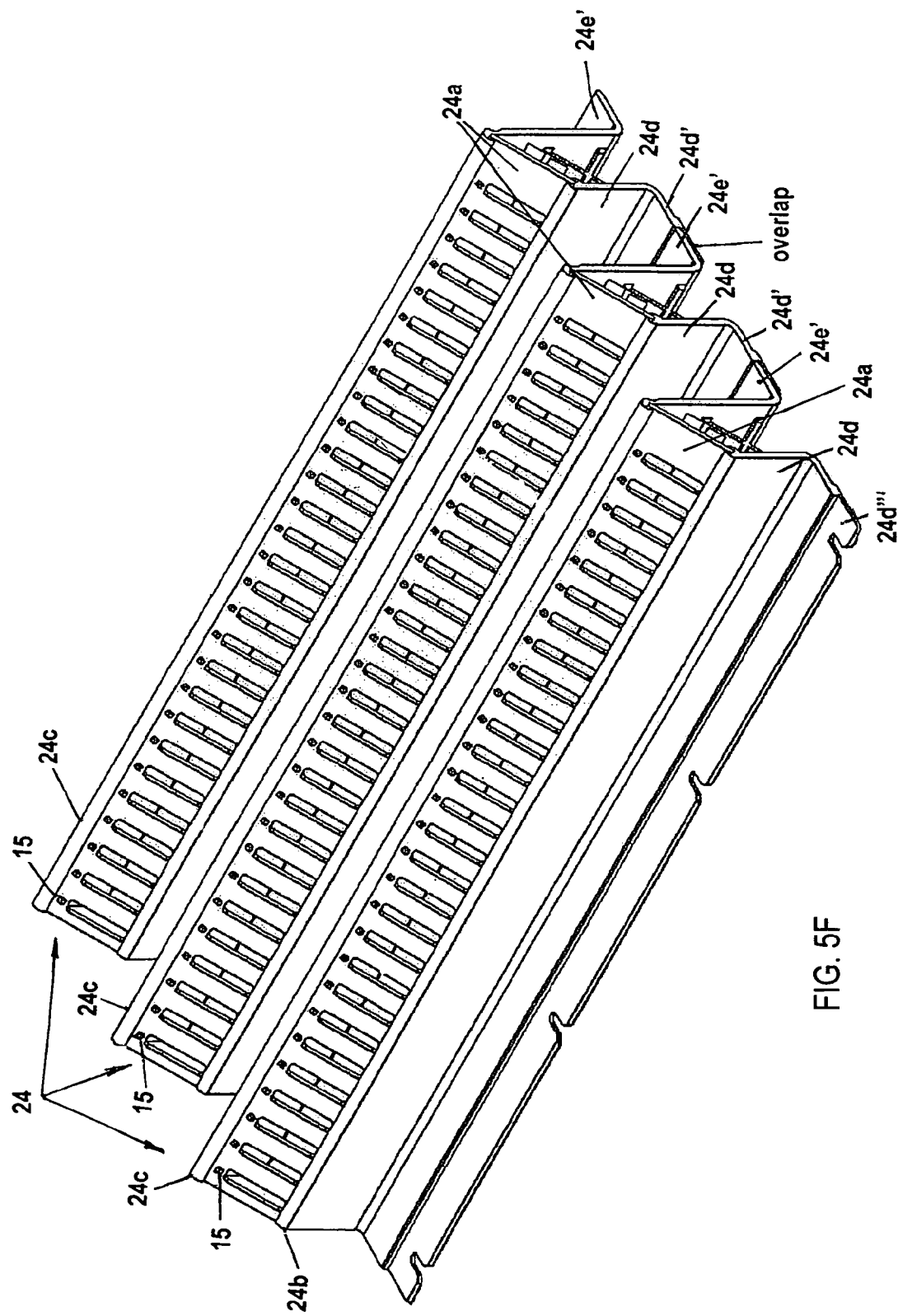
FIG. 5F shows a perspective view of the arrangement shown by FIG. 5E.

In order to render one stand 24 matable with another stand, in the preferred embodiment, base 24d' of front wall 24 is provided with a recess 24d". The bottom surface 24d''' of recess 24d" is configured to receive thereon at least a portion of bottom surface 24e" of base 24e'. That is, bottom surface 24e" of base 24e' is configured to overlap bottom surface 24d''' of base 24d' as illustrated by FIGS. 5E and 5F. Thus, as is made clear, any number of stands 24, each supporting a respective circuit board 24a, can be mated to one another in a modular configuration, whereby the number of openings 39 for receiving electronic storage devices 17 can be expanded as desired. Furthermore, should any update or repair be required, a stand 24 and/or a circuit board 24a can be simply removed and replaced with another unit without a need for the replacement or the reconfiguration of the entire system.

Figure 6A:
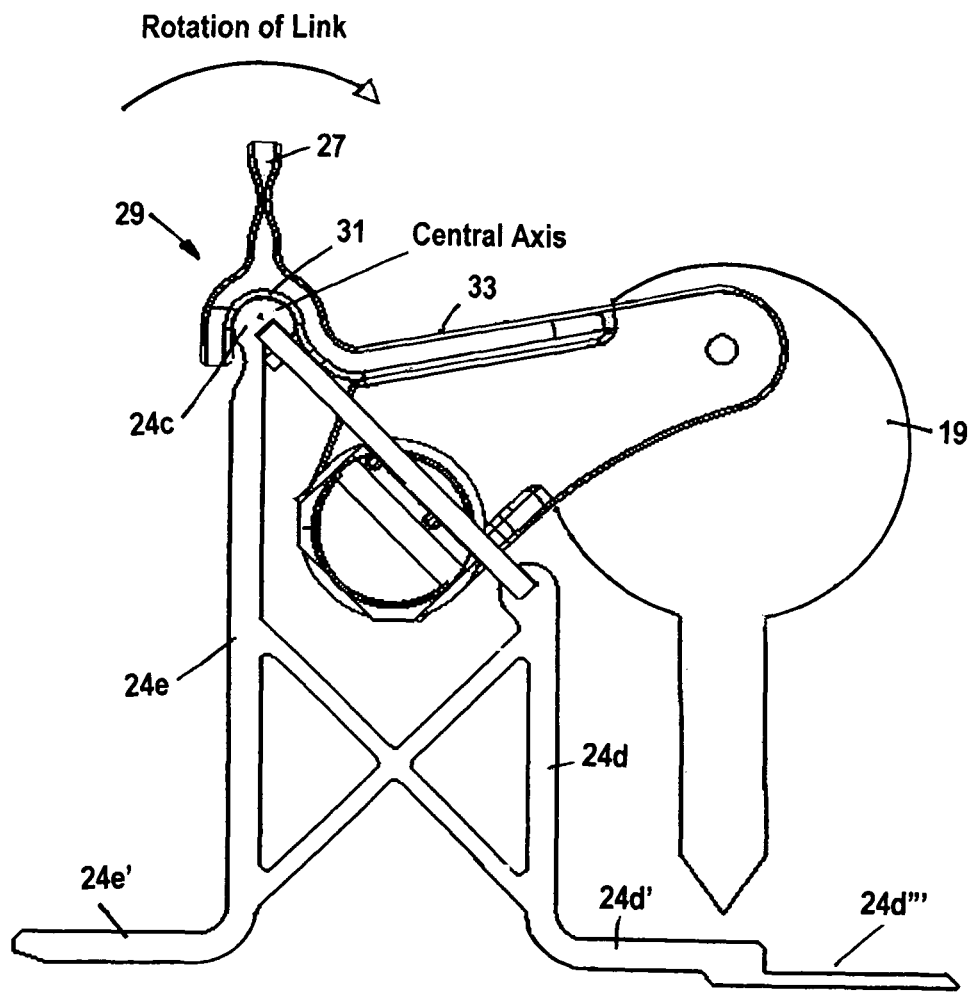
FIG. 6A shows a side plan view of a link that has coupled an electronic storage received by a circuit board to a trackable object mounted on a stand.

Referring now to FIG. 6A, according to another aspect of the present invention, the exterior surface of rail 24c is curved and is received in the interior region of the curved portion of saddle 29 in contact with concave surface 31 thereof. As a result, link 21 is further secured to stand 24. Note that respective curved surfaces of rail 24c and concave surface 31 allow saddle portion 29 to rotate about the central axis of rail 24c whereby the user can place an electronic storage 17 inside a respective opening 39 by hooking the curved portion of saddle 29 to rail 24c and then rotating link 21 about the central axis of rail 24c until electronic storage 17 is received properly inside an opening 39 and clamped between connectors 41 associated with the opening when the user is standing in front of the storage facility 10. Alternatively, depending on the position of storage facility 10 relative to the user, an electronic storage 17 can be vertically inserted into a respective opening in a circuit board 24a.

It should be noted that an object (e.g. a key) that is attached to a link 21 resides in the space between a front wall 24d of one stand and the back wall 24e of another stand 24. Advantageously, due to the configuration of stands 24, the width of the space between the stands can be narrowed allowing elongated objects such as keys to be oriented vertically, while reducing the overall footprint of the stands 24 residing in a compartment and improving the packing density of the stored objects (namely the number of objects per area). On the other hand, the spacing between stands 24 can be widened and elongated objects such as keys can be laid down horizontally in the space between stands 24. In this alternative configuration, the height of the stands 24 may be reduced in that the space between stands 24 need not be as deep. Consequently, the overall height of the storage facility 10 can be reduced and the storage facility may be received in smaller spaces, for example, under a desk.

Figure 6B:
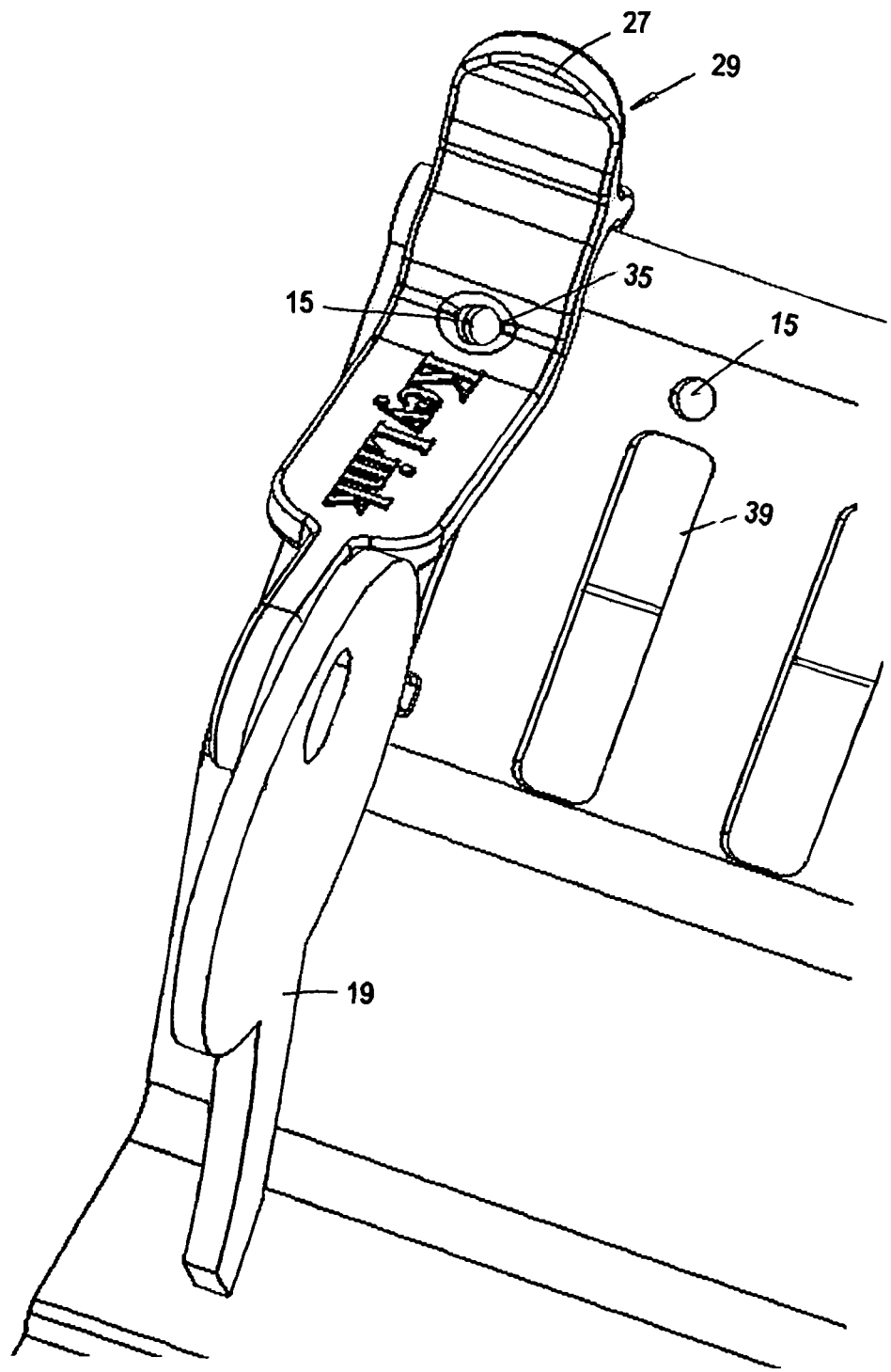
FIG. 6B shows a top perspective view of the arrangement shown by FIG. 6A.

Referring now to FIG. 6B, according to another aspect of the invention, light orifice 35 aligns with a respective visual indicator 15 once a link 21 is in place, whereby, by, for example, activating visual indicator 15 the location of an item can be identified as further described below.

Referring now to FIG. 7A, a storage facility 10 according to the preferred embodiment of the present invention is a cabinet 50 having an outer shell 52 serving as an enclosure and preferably a compartment 55 enclosable inside outer shell 52. Cabinet 50 may be configured to sit atop a flat surface, it may be wall mounted with a compartment that slides in and out from a side thereof, it may be vertically mounted on any other surface withe compartment 55 being slidable in and out of a side thereof (e.g. bottom side), or it may be in a shell having a door that can be opened or closed to allow access to the items stored therein.

Figure 7B:
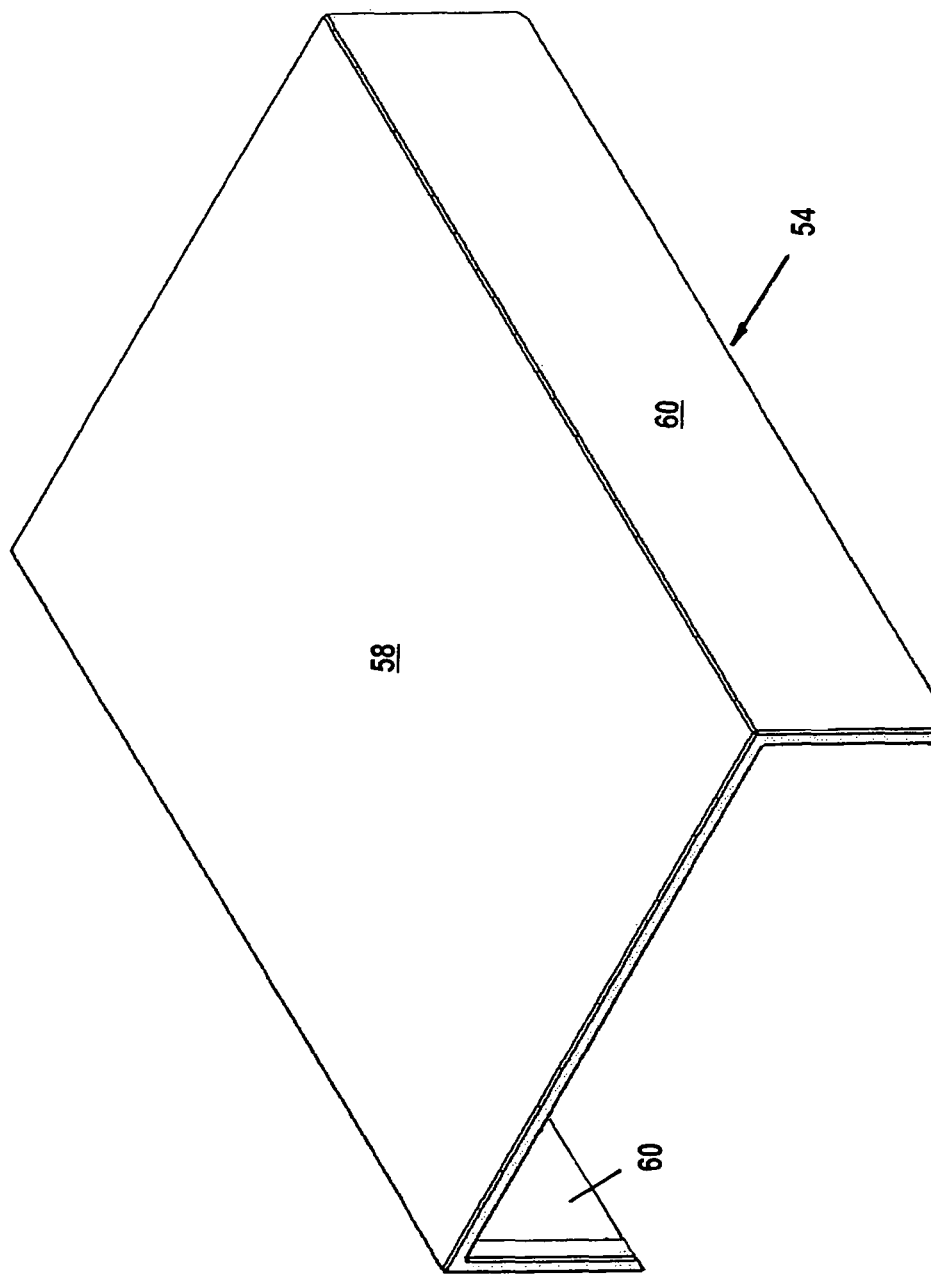
FIG. 7B shows a perspective view of the top portion of the outer shell of the preferred storage facility.
Figure 7C:
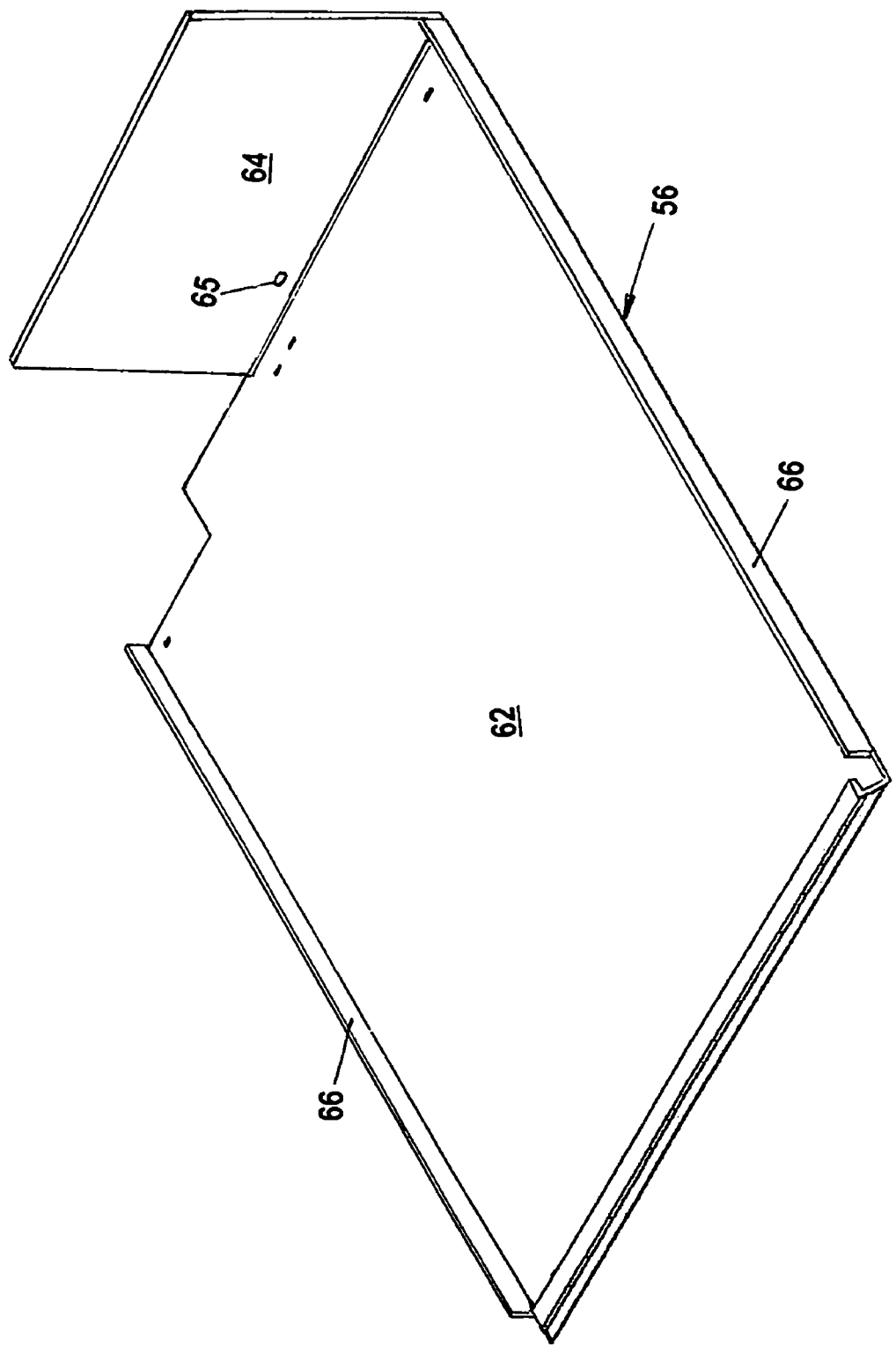
FIG. 7C shows a perspective view of the bottom portion of the outer shell of the preferred storage facility.
Figure 7D:
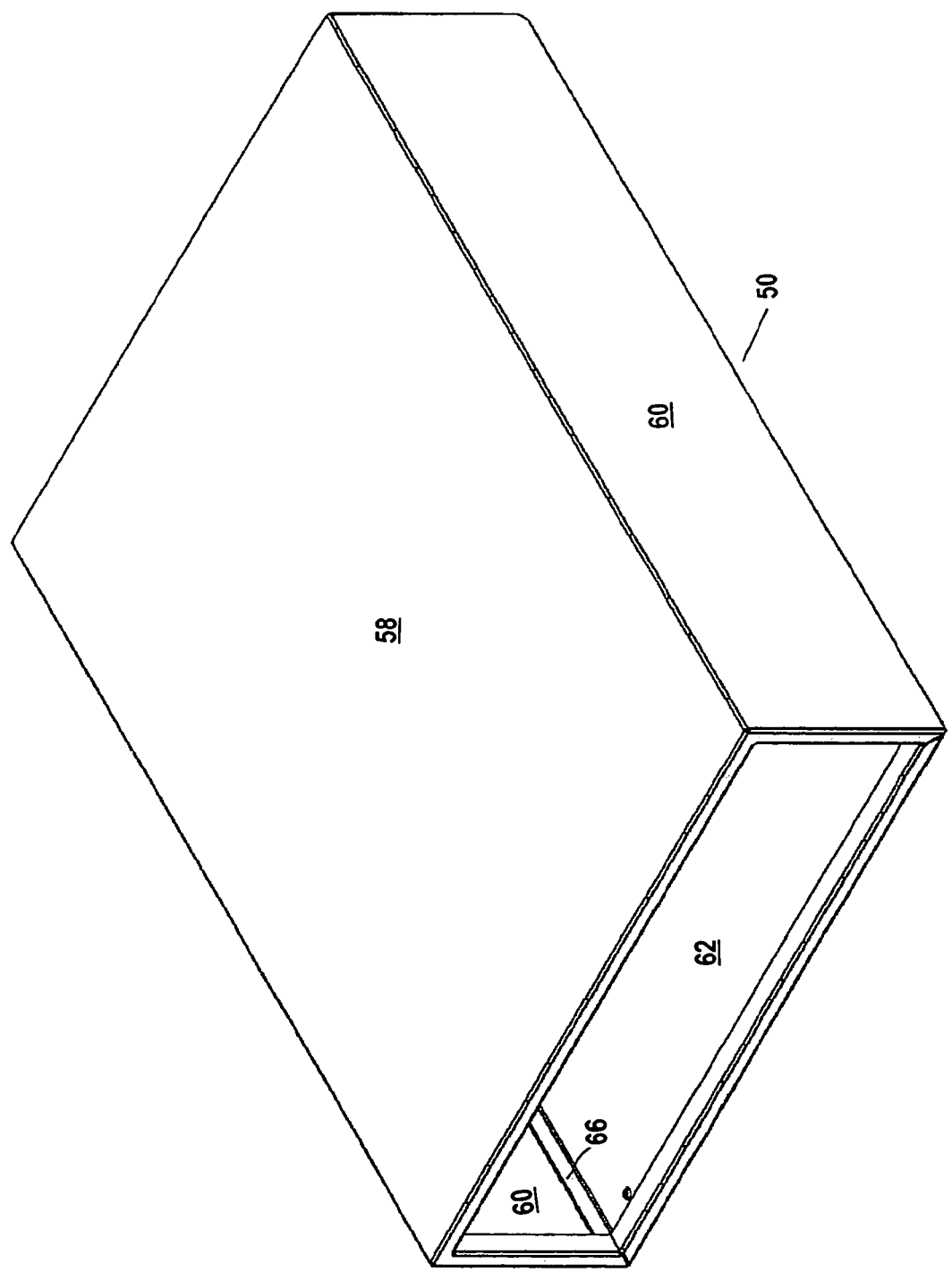
FIG. 7D shows a perspective view of the outer shell of the preferred storage facility.
Figure 7E:
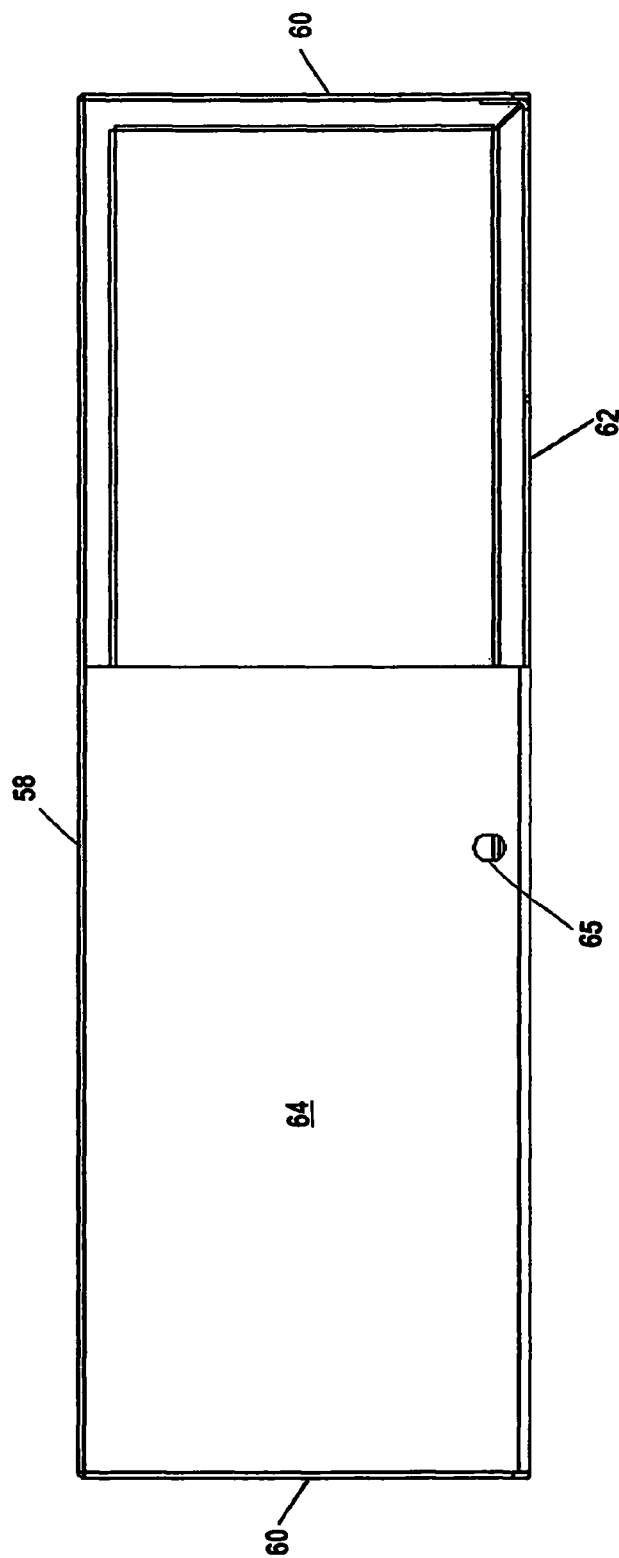
FIG. 7E shows a plan view of the back of the outer shell of the preferred storage facility.

Referring to FIGS. 7B and 7C, outer shell 52 preferably includes a top portion 54 (FIG. 7B) and a bottom portion 56 (FIG. 7C). Top portion 54 includes a flat, rectangular web portion 58 having first and second sidewalls 60 extending vertically from opposite edges of web portion 58. Preferably, each sidewall 60 is coextensive with a respective edge of web portion 58. Bottom portion 56 includes a base 62 and a back wall 64 extending vertically from an edge thereof. Base 62 further includes oppositely disposed flange portions 66 each extending vertically away from a respective edge of base 62. To form outer shell 50, top portion 54 and bottom portion 56 are coupled to one another such that the bottom of walls 60 skirt over flange portions 66 resulting in outer shell 50. Note that bottom portion 56 may be coupled to top portion 68 by welding flange portions 66 and walls 60. Further note that wall 64 partially encloses one side of (back side of) outer shell 50, and includes hole 65 in which a manual lock release is received as described below.

Figure 8:
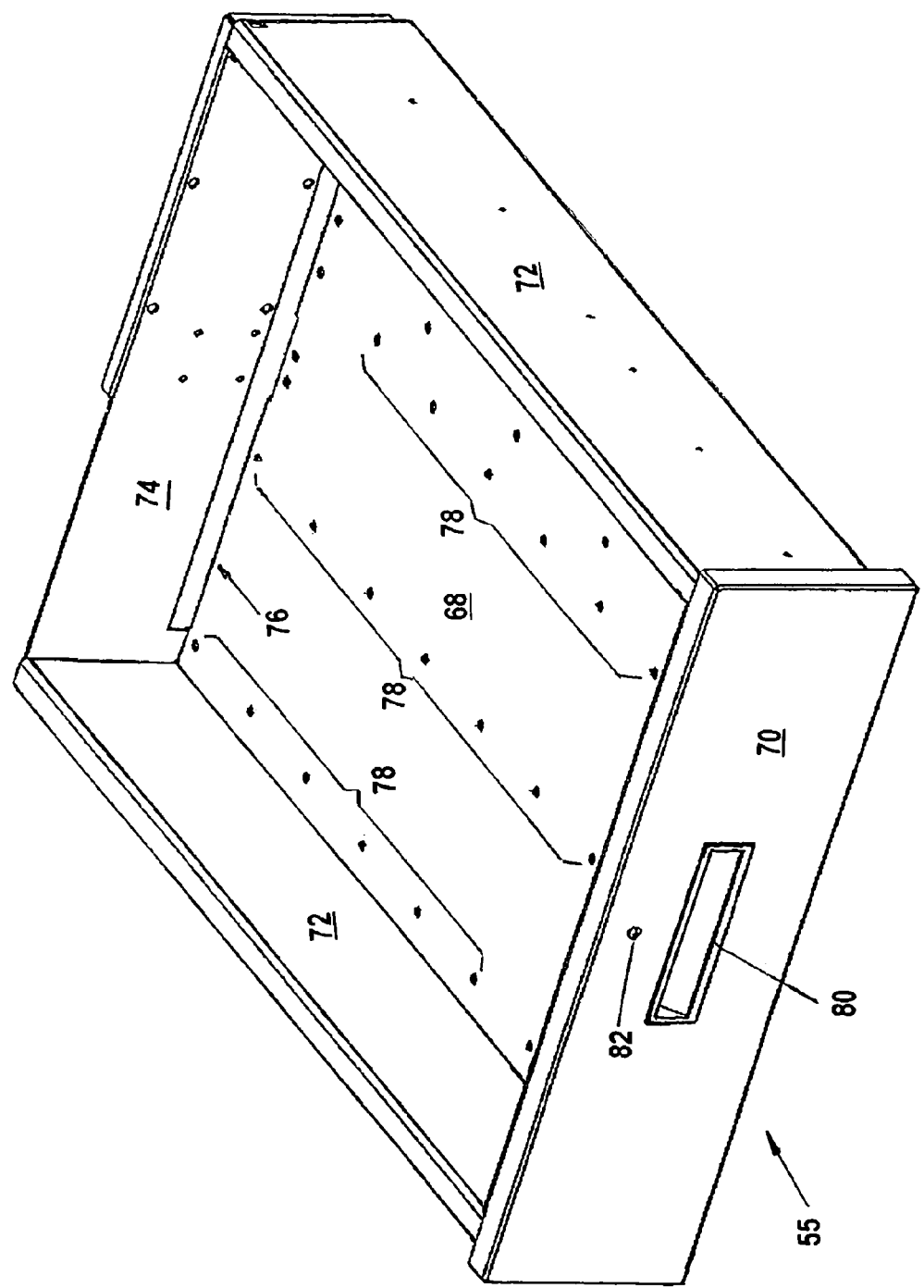
FIG. 8 shows a perspective view of the compartment portion (a drawer) of the preferred storage facility.

Referring now to FIG. 8, compartment 55 is preferably a drawer having an interior space defined by a bottom panel 68, front wall 70, two oppositely disposed sidewalls 72, and a back wall 74, each wall being coupled to bottom panel 68 by suitable fasteners, such as screws or by welding or the like. Note that a portion of back wall 74 is cut away to provide an opening 76 for access to the interior space of compartment 55. Further note that bottom panel 68 includes a plurality of rows of spaced holes 78. Moreover, front wall 70 may include a handle 80 and a visual indicator 82 such as an LED or the like mounted to the exterior surface of front wall 70. The function of visual indicator 82 is further discussed below. Note that front wall 70 can be removable so that it may be replaced with another wall having a finish that matches a surrounding decor or the user's branding, or another cover may be fitted to front wall 70 to match the surrounding decor.

Figure 9:
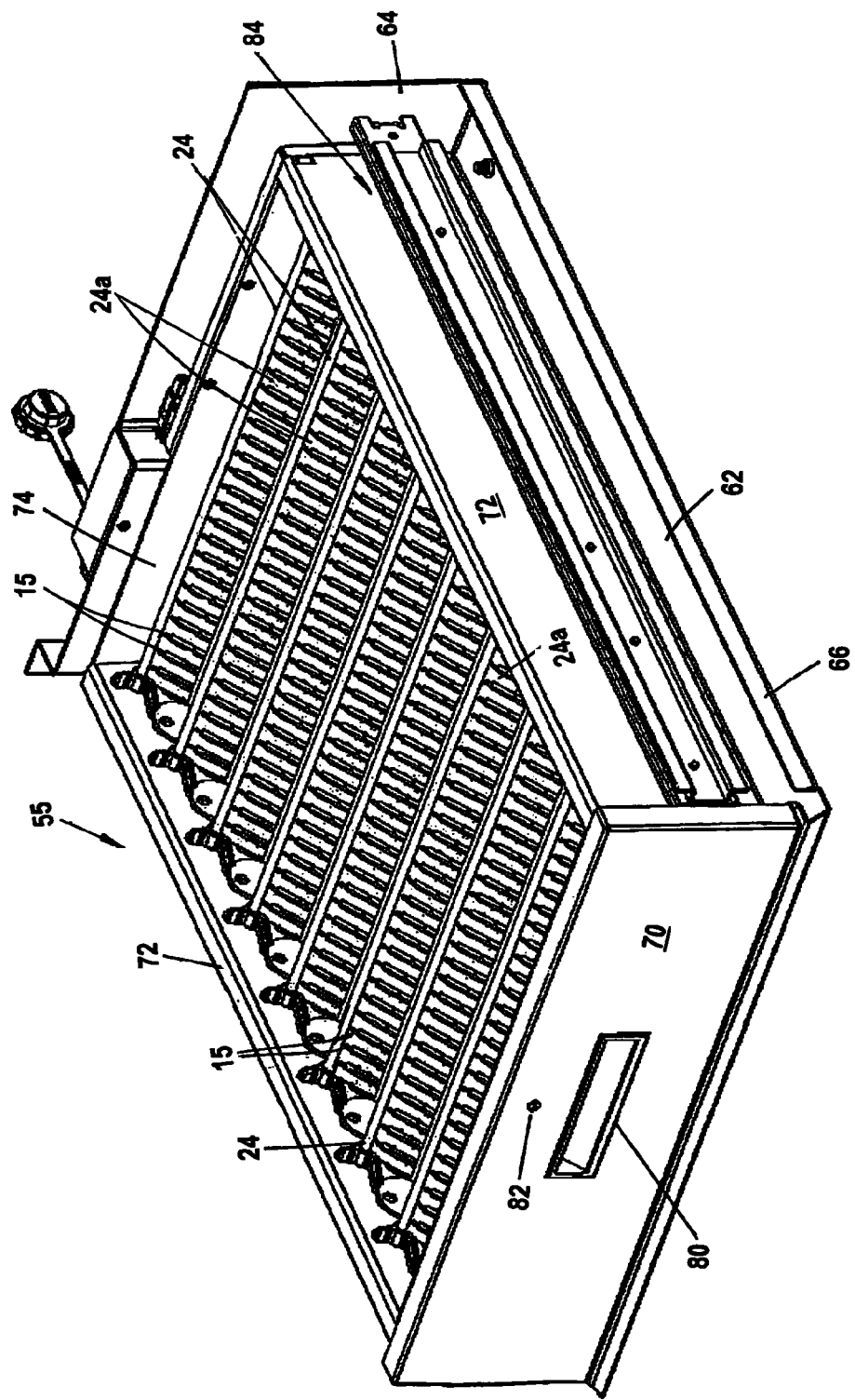
FIG. 9 shows a plurality of arrangements as shown by FIG. 5C modularly mated as illustrated by FIGS. 5E and 5F and disposed in the interior of the compartment shown by FIG. 8.

Referring now to FIG. 9, in which top portion 54 of outer shell 50 is removed from view, a slide assembly 84 is disposed between the outer surface of each wall 72 and the inner surface of a respective sidewall 60 of top portion 54 to allow compartment/drawer 55 to be slidably inserted into and retracted from the interior of outer shell 50. Slide assembly 84 can be any suitable assembly known in the art that allows compartment/drawer 55 to be slidably inserted into or retracted from the interior of outer shell 50.

In the preferred embodiment, a plurality of circuit boards 24a, each assembled on a respective stand 24, are disposed in the interior of compartment 55.

Figure 10:
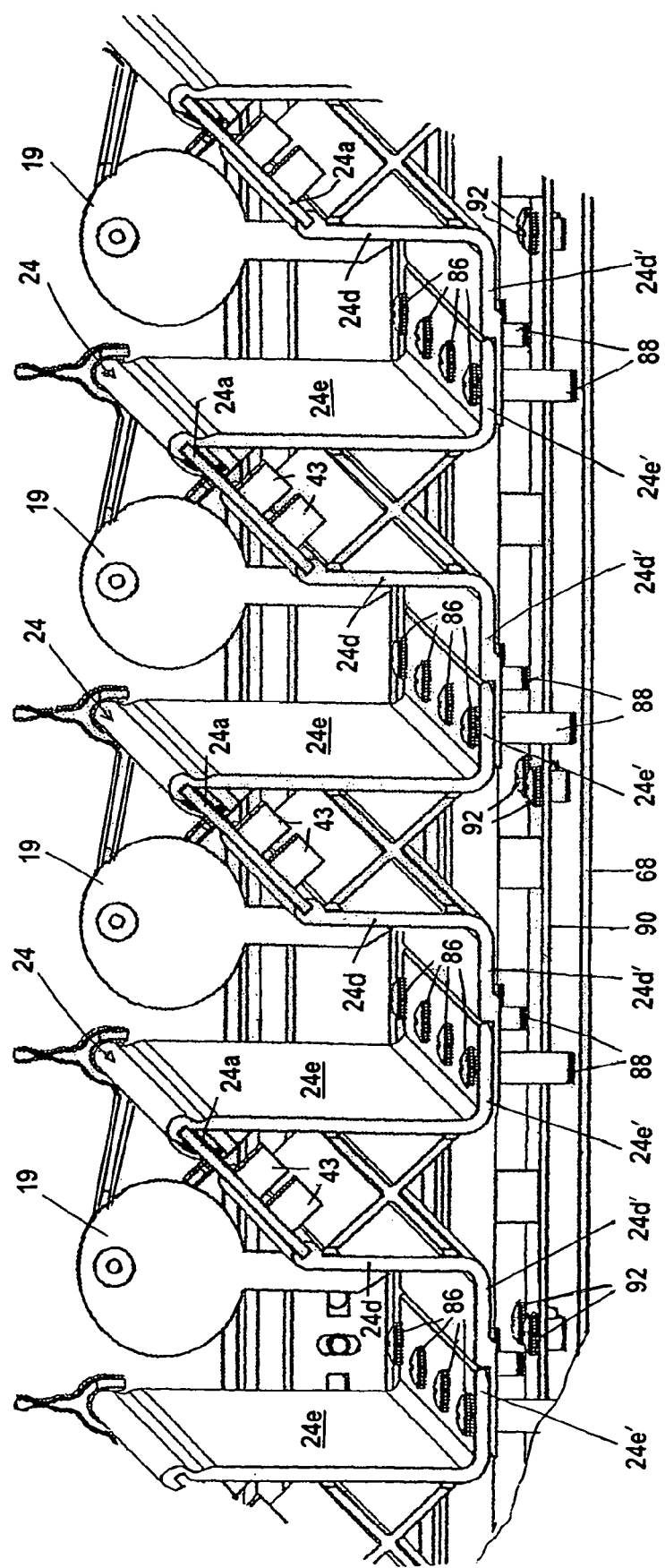
FIG. 10 shows the mechanical integration of the arrangement shown by FIG. 9.

Referring to FIG. 10, each stand 24 is coupled to bottom panel 68 using screws 86. Specifically, base 24e' of one stand is mated with a base 24d' of another stand 24 as described earlier, and a plurality of screws extend through overlapping bases 24d', 24e' and are received in respective holes 78 of bottom panel 68 to couple stands 24 to bottom panel 68. Preferably, a plurality of spacers 88 are disposed directly below the overlapping portions of bases 24e', 24d', between bases 24e', 24d' and bottom panel 68. Note that in the preferred embodiment, each spacer 88 is tubular and each screw 86 is received inside a respective spacer and extends from one end of the spacer to the other end thereof. Due to the presence of spacers 88, the bottom surface of bases 24d', 24e' are spaced from bottom panel 68. A circuit board 90 for the distribution of power and input/output signals to circuit boards 24a may be fastened to bottom panel 68 by screws 92 or the like and extend under all stands 24 in the spaces provided between stands 24 and bottom panel 68. Circuit board 90 may be then connected to connectors 43 of each circuit board 24a using any appropriate means. Alternatively, a harness may be used to provide electrical connection between subcontroller 32 and circuit boards 24a. The harness may be located below circuit boards 24a instead of circuit board 90, or the harness may be located inside a space provided in one of the walls 72. In addition, visual indicator 82 may receive power and control signals from subcontroller 32 through either circuit board 90 or a harness. Note that subcontroller 32 may be connected to controller 12 via a flexible cable that lies over the bottom portion of outer shell and slides thereon when compartment 55 is inserted into and retracted from outer shell 50.

Figure 11:
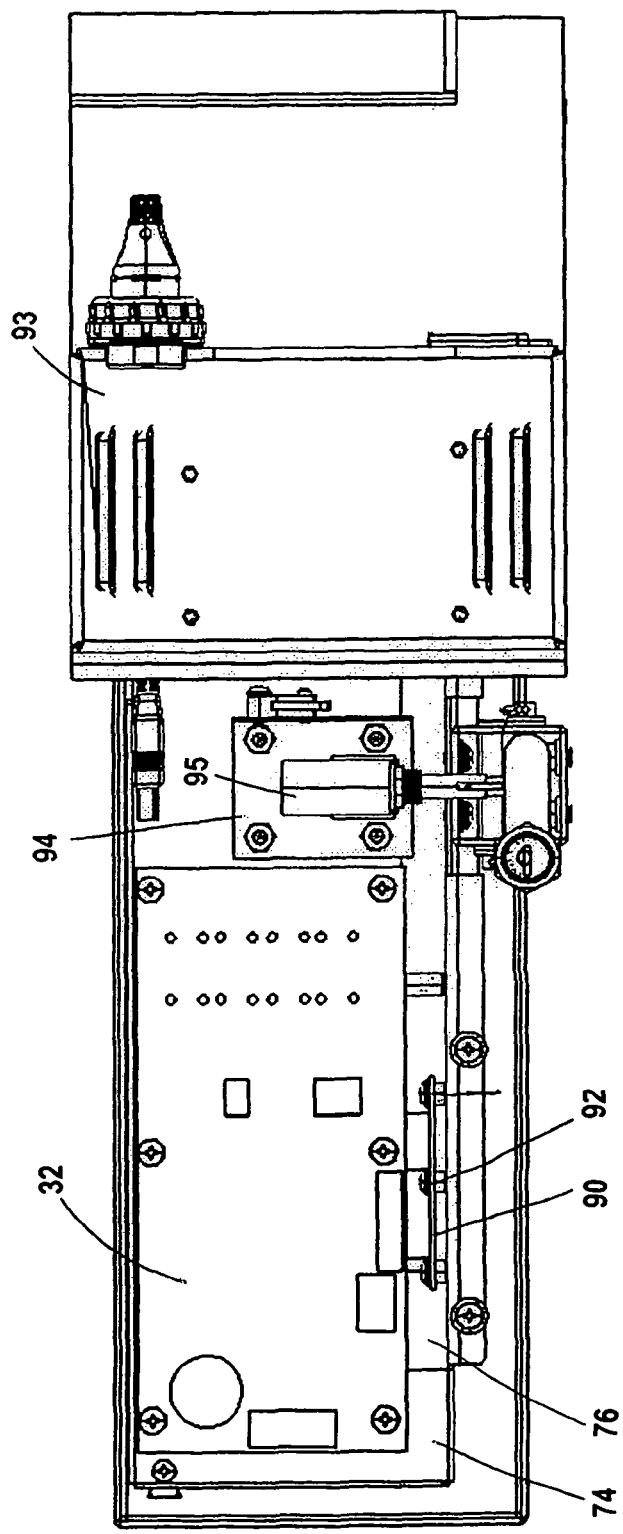
FIG. 11 illustrates a plan view of the back of the compartment of the preferred storage facility having a subcontroller, a lock, and power supply mounted thereon.
Figure 12A:
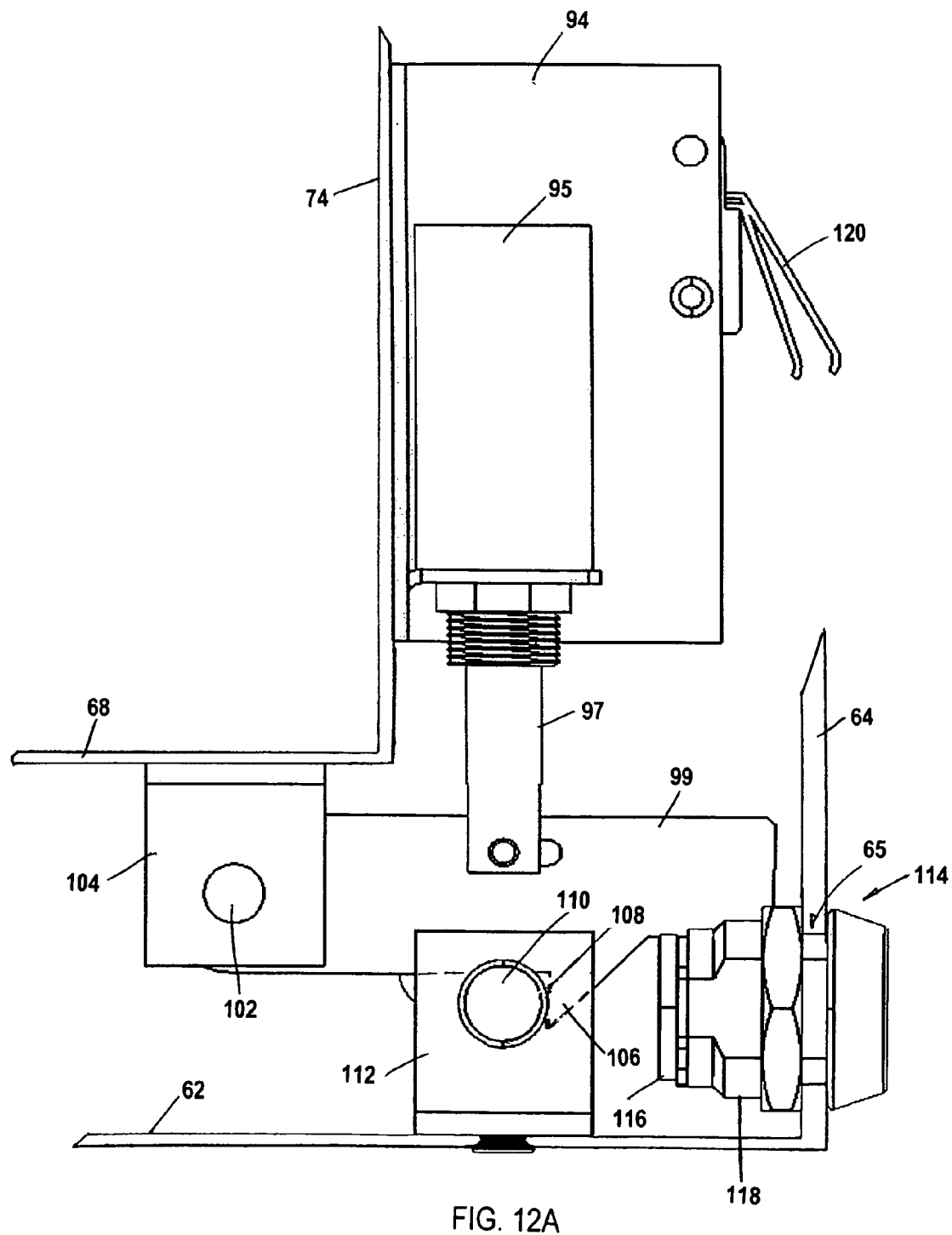
FIG. 12A illustrates a side plan view of a lock assembly as used in a system according to the present invention.
Figure 12B:
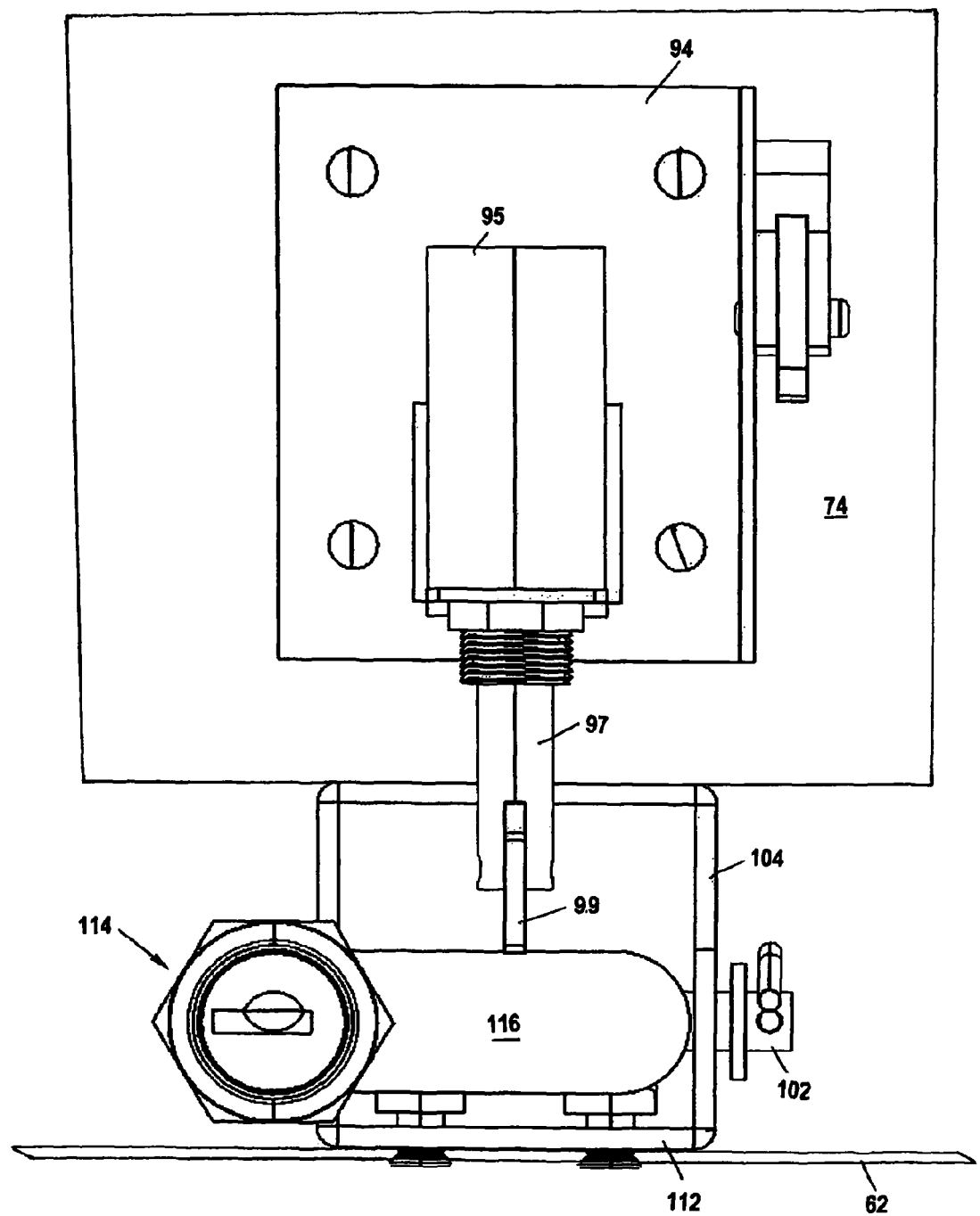
FIG. 12B shows another plan view of the lock assembly of FIG. 12A.
Figure 12C:
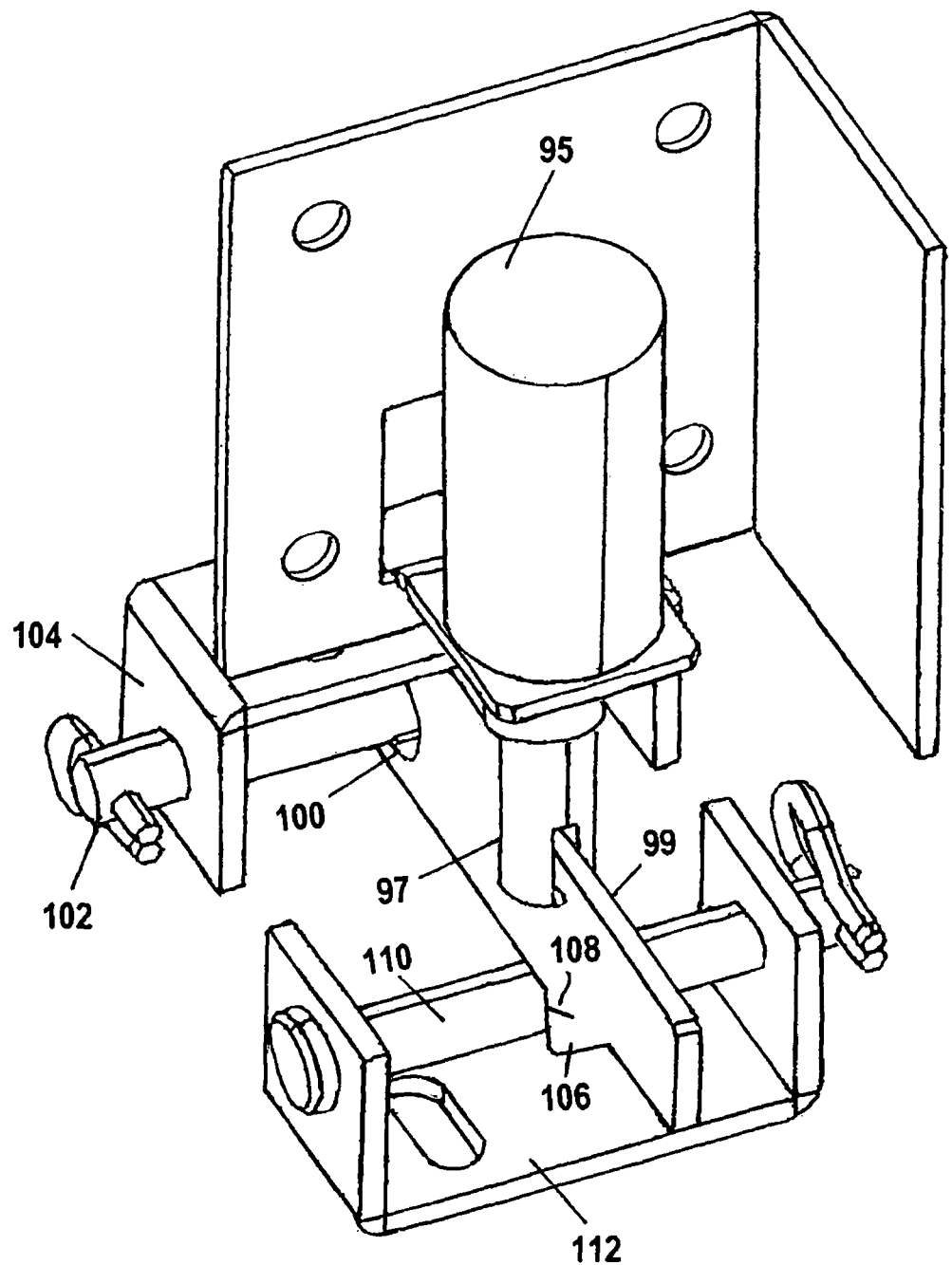
FIG. 12C shows a perspective view of the lock assembly of FIG. 12A.

Referring now to FIG. 11, subcontroller 32 is mounted to the exterior surface of back wall 74 of compartment 55 above opening 76, and connected to circuit board 90 electrically through opening 76 whereby input/output signals and power may be delivered to circuit boards 24a. Furthermore, a power module 93 and an electronically movable latch are mounted to the exterior surface of back wall 74. Power module 93 provides power to subcontroller 32 as well as a solenoid 95. Referring to FIGS. 12a-12c, solenoid 95, which is controlled by controller 12, is mounted to wall 74 by a bracket 94 and includes a reciprocating arm 97 which is coupled to, at an end thereof, to a latch arm 99. Latch arm 99 includes an opening 100 at one end thereof. A pivot pin 102 is received in opening 100 and mounted to the bottom surface of bottom panel 68 by a bracket 104 using screws or the like. Thus, latch arm 99 is pivotally mounted to compartment 55 and is rendered rotatable about the central axis of pivot pin 102 when solenoid 95 is activated to move arm 97 thereof. Latch arm 99 includes a tooth 106 disposed between the free end and opening 100 of latch arm 99. Tooth 106 includes a catch surface 108 which abuts a catch pin 110 that is mounted to bottom portion 62 of outer shell 50 by a bracket 112, whereby the retraction of compartment 55 is prevented thus locking compartment 55 inside outer shell 50. A lock assembly in a system according to the present invention includes a manual release 114 which can be used to manually lift the free end of latch arm 99 until it clears catch pin 110 to allow compartment 55 to be retracted. Manual release 114 includes release arm 116 disposed below latch arm 99. Release arm 116 is coupled to, at one end thereof, to a rotatable lock 118. The rotation of rotatable lock 118 results in the lifting of latch arm 97 so that latch arm 97 can be manually released. Note that rotatable lock 118 extends through opening 65 in wall 64 of bottom portion 62 of outer shell 50. Thus, a key or the like may be used to operate rotatable lock 114 in order to manually release latch arm 99.

A lock mechanism as used in a system according to the present invention further includes a position sensor 120. Position sensor 120 is also mounted to the exterior surface of wall 74. When position sensor 120 makes contact with the interior surface of wall 64, the system recognizes that compartment 55 has been fully received inside outer shell 50 and operates solenoid 95 in order to prevent latch arm 99 from being released.

Once controller 12 recognizes that compartment 55 has been fully received inside outer shell 50, it conducts a polling of all electronic storage devices inside compartment 55 and associates each electronic storage device 17 with a respective opening 39 in a respective circuit board 24a. Alternatively, polling is conducted before compartment 55 is closed. That is, after an electronic storage 17 is detected. In a system according to the present invention openings 39 are serially numbered. For example, if each circuit board 24a includes twenty openings 39 therein, and there are ten circuit boards 24a inside compartment 55, the system assigns a unique number to each opening 39 in the range of 1-200 because there are 200 openings. Thus, each electronic storage 17 is associated with a respective, unique number by polling. Thereafter, controller 12 builds a table in which each electronic storage 17 is associated with a respective, unique number. Controller 12, then uses a second table, in which each electronic storage 17 is associated with identifying characteristics of a trackable object 19 to locate a trackable object 19 inside compartment 55. Specifically, when a user sends a request for identification of a trackable object 19 to controller 12 via, for example, access device 14, controller 12 looks up the electronic storage device 17 that is associated with the requested trackable object 19 in the second table, and then uses the first table to find the number associated with the electronic storage device 17. Then, if compartment 55 is locked, controller 12 unlocks compartment 55 to allow access to the interior thereof, and operates visual indicator 15 that is above the opening corresponding to the number that controller 12 has looked up in the first table. Thus, the position of the electronic storage 17 inside compartment 55 that is mechanically coupled to the requested trackable object 19 can be visually identified, whereby the requested trackable object 19 can be tracked and identified. Note the visual indicator 15 that corresponds to the requested trackable object can be operated continuously, operated intermittently (i.e. caused to blink), can be operated to emanate one color while other visual indicators are operated to have a different color (e.g. when visual indicators 15 are multi-color LEDs or the like), or visual indicators 15 on one side or both side of the visual indicator 15 corresponding to the requested trackable object can be operated sequentially to point to the location of the requested trackable object (much like the lights on a runway).

Thus, for example, when the trackable objects 19 stored inside a compartment 55 are keys for apartments in a building, each electronic storage 17 is loaded with information identifying a respective apartment and is mechanically coupled to a key to the respective apartment. For example, each electronic storage 17 is preloaded with a unique identification code, which is then associated with the key by a user using the controller so that controller 12 can identify the key by referencing the identification code of the electronic storage 17 to which the key is mechanically secured. When a request for a key to a particular apartment is received by controller 12, after unlocking compartment 55, controller 12 looks up the opening 39 which has received the electronic storage 17 associated with the requested key and operates the visual indicator 15 associated with the opening in order to identify the position of the requested key inside compartment 55. Note that once compartment 55 is open multiple requests may be made for different keys. When compartment 55 is closed (i.e. received inside outer shell 50) controller 12 performs polling as explained above to build the tables used for the identification of the position of the keys.

It should be noted that it is not necessary to request a trackable item in order to have controller 12 unlock compartment 55. Rather, a user may request the unlocking of compartment 55 by providing an appropriate input/instruction to controller 12 using access device 14 in order to place an electronic storage 17 inside an opening 39 (e.g. when a key is returned). Upon closing of compartment 55, a polling is conducted to build the tables necessary for the identification of the position of a requested electronic storage 17. It should be noted that in a system according to the present invention it is not necessary to return an electronic storage 17 to a particular opening 39. Rather, an electronic storage 17 can be received inside any open opening 39. Alternatively, an algorithm can be provided so that controller 12 can direct a user to place an electronic storage inside a particular opening or a particular row (e.g. top row or bottom row). In addition, in a system according to the present invention a request for a plurality of keys can be made before storage facility 10 is opened. Controller 12 can be programmed to operate individual visual indicators in a particular sequence when requests for multiple items are made. For example, when a request is made for three different keys for three different apartments, the LED associated with the first requested key is operated to blink once, the LED associated with the second requested key is operated to blink twice and the LED associated with the third requested key can be operated to blink three times.

While herein only one storage facility 10 is shown in communication with a controller 12, it should be noted that a system according to the present invention can be expanded to include a plurality of storage facilities 10 in communication with a single controller 12, or a single storage facility 10 can be in communication with more than one controller 12, or a plurality of storage facilities 10 can be in communication with a plurality of controllers 12.

In a system according to the present invention, controller 12 also operates visual indicator 82 in order to inform the user of the status of the compartment 55. For example, controller 12 may operate visual indicator 82 in order to inform the user that compartment 55 is properly received in outer shell 50, properly locked, and in communication with controller 12. Controller 12 may discontinue operating visual indicator 82 as an indication of status, for example, when compartment 55 is not locked or controller 12 is not communicating with storage facility 10. Alternatively, visual indicator 82 may be a multi-color LED or the like in which case controller 12 may operate visual indicator 82 to display a different color for a given state. For example, the color red may mean locked, and the color green may mean unlocked. Furthermore, when a plurality of storage facilities 10 are used, a different color may indicate which storage facility 10 is being accessed by controller 12, and which storage facilities are not in communication with controller 12. In the preferred embodiment, users enter identification information, via the access device 14, for example, which is compared to identification information of authorized users by the controller 12. If the user is authorized, he or she is allowed to access the items in the cabinet 10. Note that different users can be given access to different compartments (e.g. when keys for different floors of an apartment building are stored in different compartments the users access can be denied to some of the compartments and allowed to other compartments). The controller 12 also preferably maintains records, or a log, of which users have accessed the cabinet 10. In addition, the controller 12 keeps a log of the specific items stored in the cabinet and their location therein, as well. In addition, the controller 12 maintains records of specific users that have accessed the cabinet 10. Based on this information, reports indicating which items were removed while a user had access to the cabinet 10 can also be generated. Such reports are useful in tracking usage of the items and preventing loss or theft thereof. To this end, the controller 12 preferably includes a processor, for example a CPU of the PC, which is operable to both allow authorized users to access the cabinet 10 and to monitor and track the location of each item stored therein. It should be further noted that a system can be equipped with other indicators such as buzzers and speakers to apprize the users of different conditions, for example, when a compartment is not properly closed or locked, or when an electronic storage device is properly or improperly received in a respective position and the like conditions.

Figure 13A:
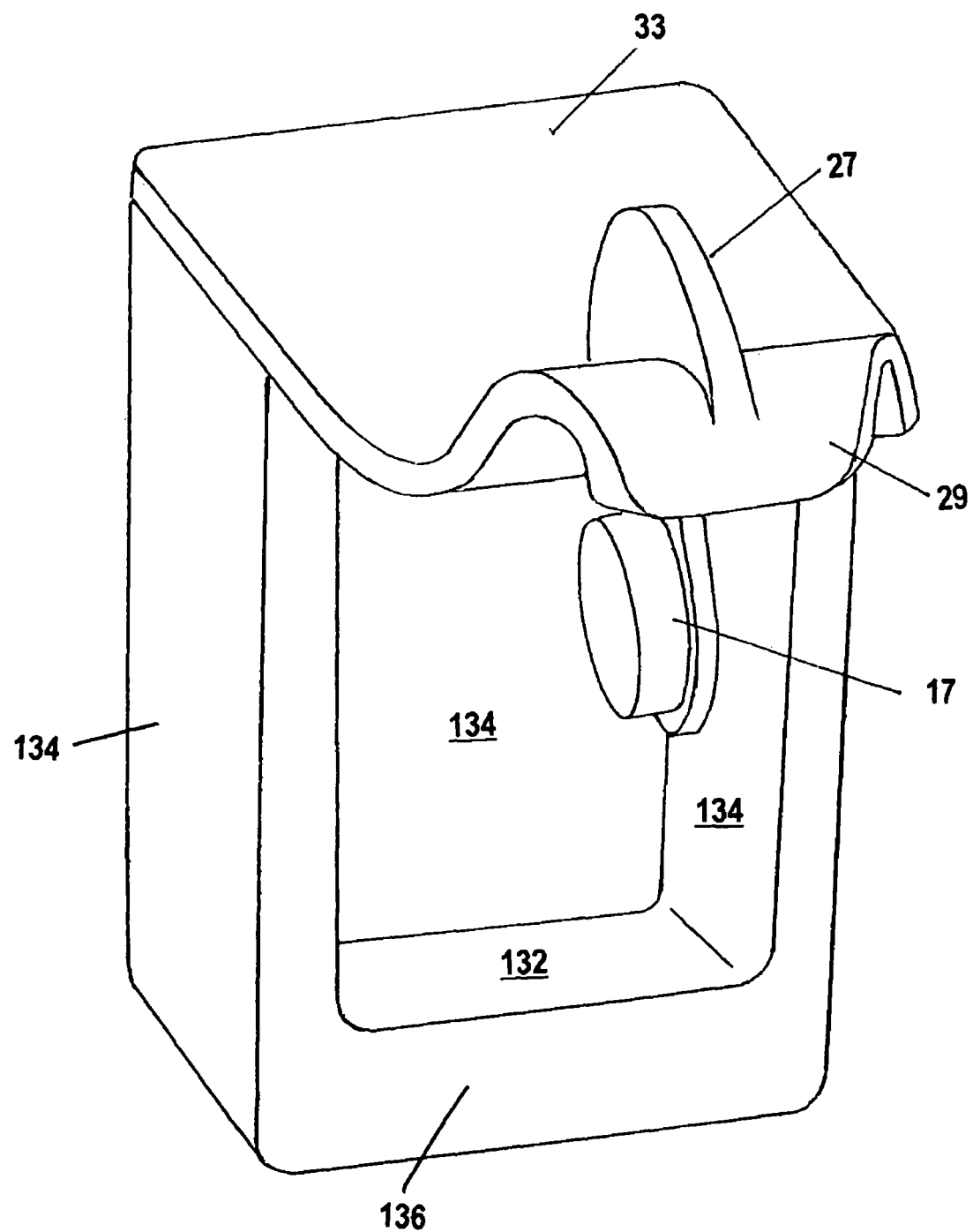
FIG. 13A shows a perspective view of a storage basket integrated with a link/tag according to the present invention.
Figure 13B:
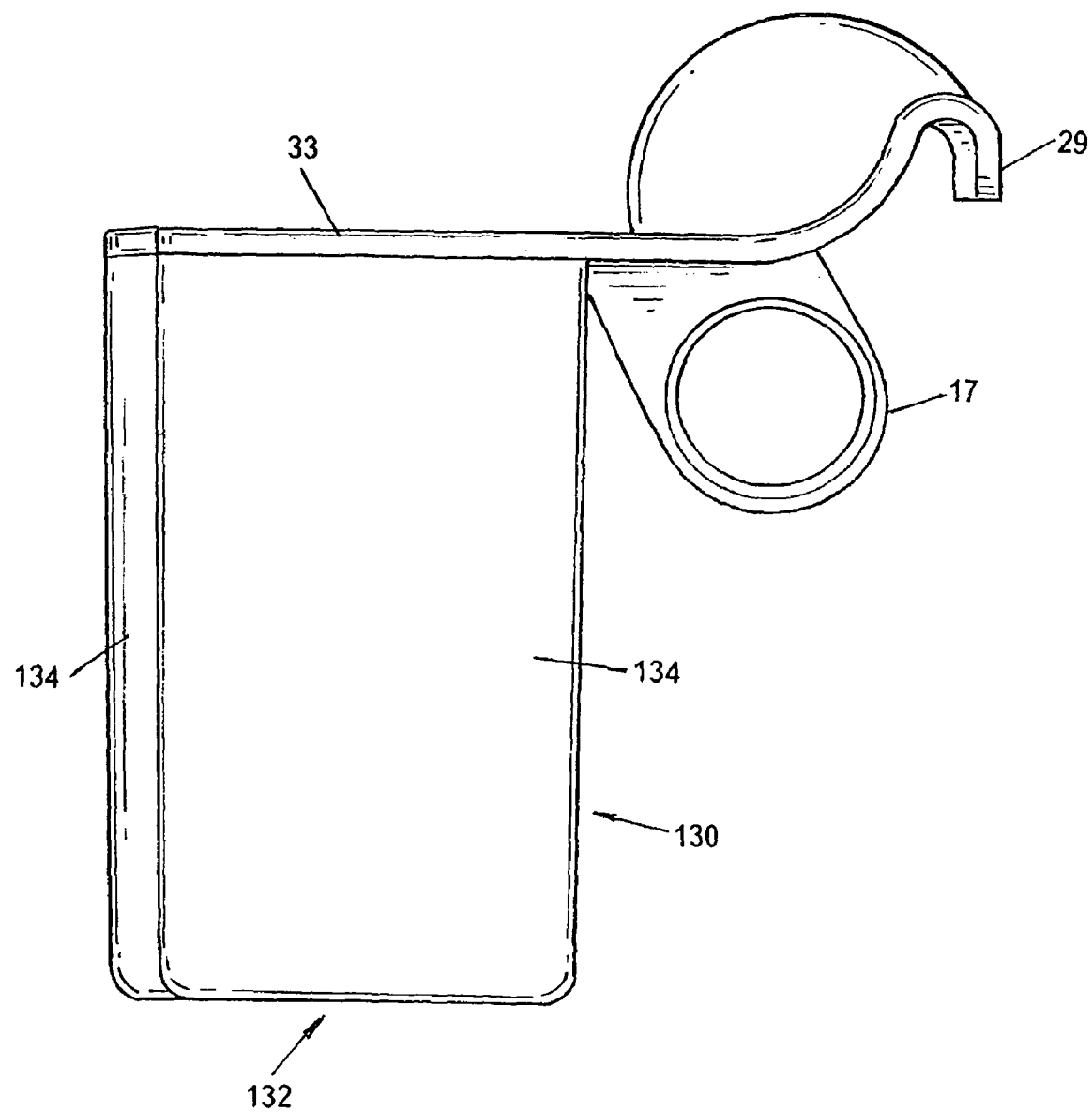
FIG. 13B shows a side plan view of the arrangement shown by FIG. 13B.
Figure 13C:
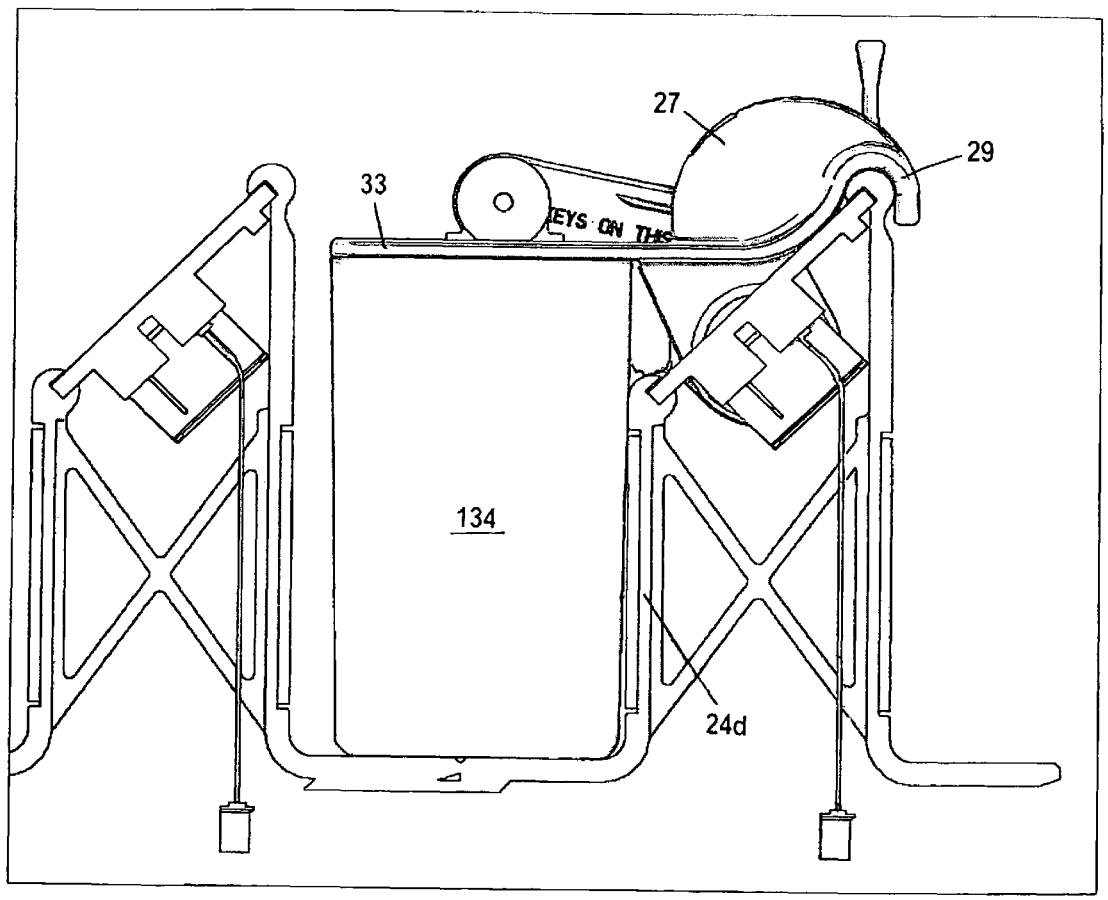
FIG. 13C shows a side plan view of the arrangement shown by FIG. 13A received by the storage and tracking system of the present invention.
Figure 13D:
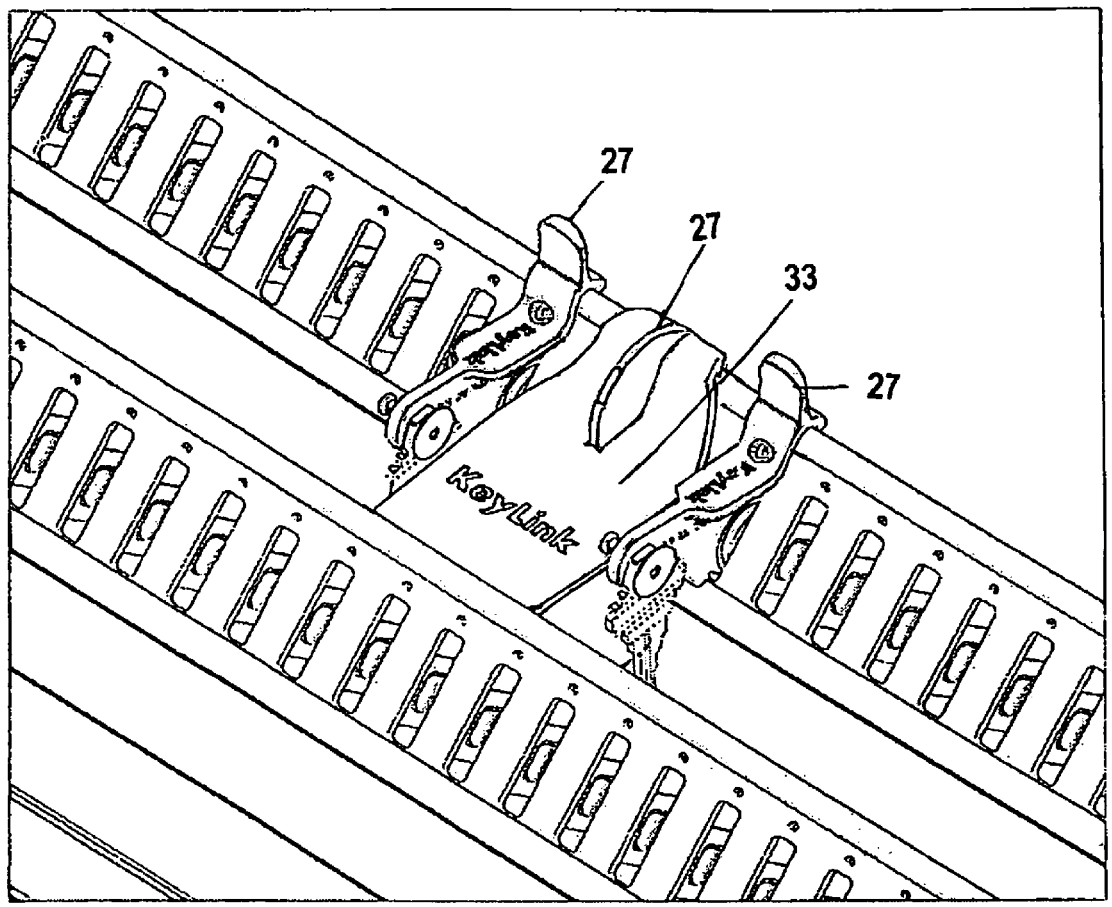
FIG. 13D shows a top perspective view of the arrangement of FIG. 13C alongside two other tags/links inside a storage and tracking facility according to the present invention.

Referring now to FIGS. 13A, 13B, a system according to the present invention can include a trackable temporary storage facility. Such a facility may include a storage basket 130 and a link 21 having a wider tail portion 33 than the links connected to individual objects. Storage basket 130 includes a bottom 132, three sidewalls 134 of preferably equal height each extending upwardly from a respective edge of bottom 132, and an open side that includes a sidewall 136 also extending from an edge of bottom 132. Sidewall 136 is shorter than sidewalls 134 and preferably extends between two opposing sidewalls 134 whereby sidewall 136, sidewalls 134 and bottom 132 create a cradle in which loose objects can be received. The bottom of tail portion 33 is attached to the top edges of sidewalls 132 whereby storage basket 130 functions as a trackable object 19 instead of a key or the like object. Note that short sidewall 136 is on the same side as the saddle portion 29. As a result, when objects such as loose keys are placed inside basket 130, and the electronic storage 17 of the link/tag 21 that is attached to the basket 130 is received inside an opening 39 as illustrated by FIG. 13C, then the short sidewall 136 will face a front wall 24d. Consequently, access to the interior of basket 130 will be blocked until basket 130 is removed. Therefore, the loose objects in basket 130 can be secured. Also, the insertion and retrieval of basket 130 can be tracked by a system according to the present invention. FIG. 13D shows a top perspective view of a basket 130 as received in a storage system according to the present invention alongside two links 21.

Figure 13F:
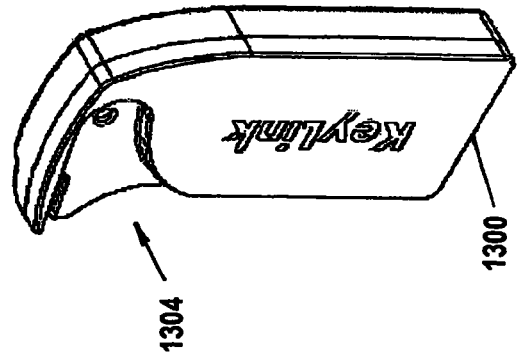
FIGS. 13E-13J show a trackable case (see FIGS. 13E, 13F, 13J) for use with a link (see FIGS. 13G, 13H, 13I) according to another aspect of the present invention.
Figure 13E:
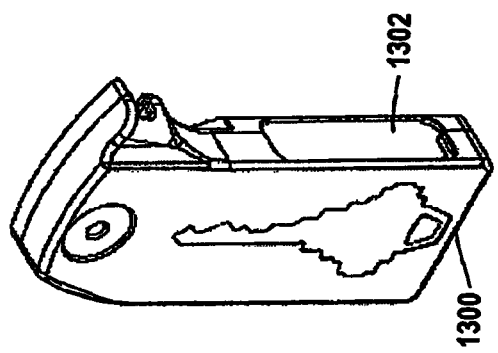

Referring to FIG. 13E, according to another aspect of the present invention, a case 1300 may be configured for attachment to a link 21. In one preferred embodiment, case 1300 is sized narrowly so that it may receive narrow and long objects such as a key as illustrated. Case 1300 includes one opening 1302 at one side thereof whereby a object such as a key can be deposited in the interior thereof. Otherwise, case 1300 is closed on all other sides.

Referring to FIG. 13F, case 1300 includes a depression 1304 on one side thereof for receiving that portion of a link 21 having opening 25 therein, whereby a link 21 can be coupled to case 1300. Specifically, as illustrated by FIGS. 13G-13I, a link 21 can be received inside depression 1304 and mechanically coupled to case 1300 by a rivet arrangement 1306 which passes through opening 25 and opening 1308 in case 1300 at a bottom surface of depression 1304.

Figure 13J:
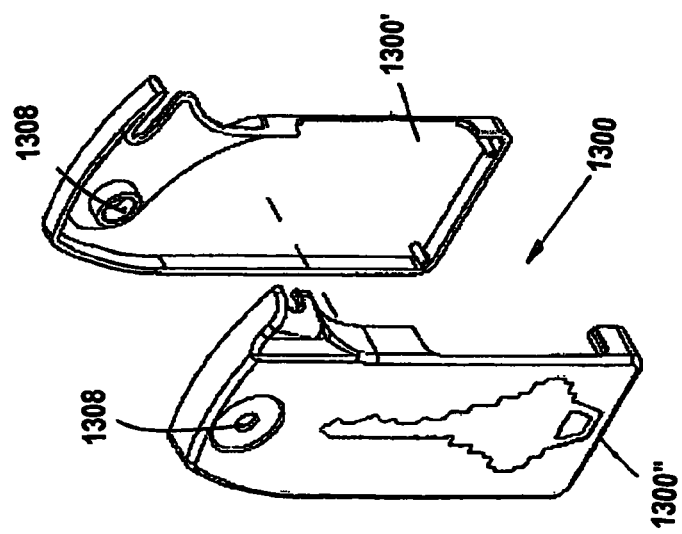
Figure 13I:
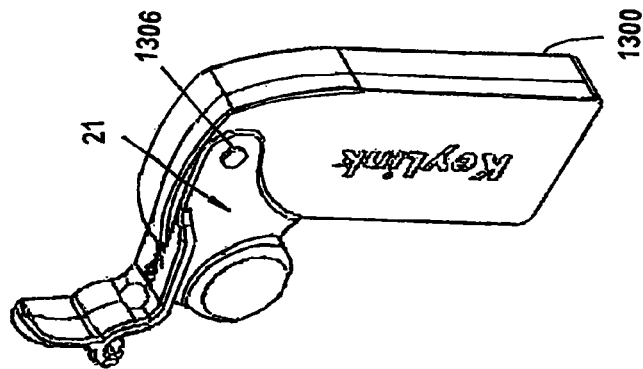
Figure 13H:
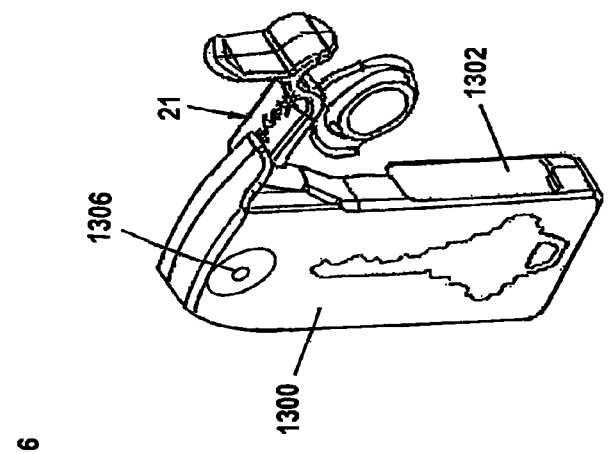
Figure 13G:
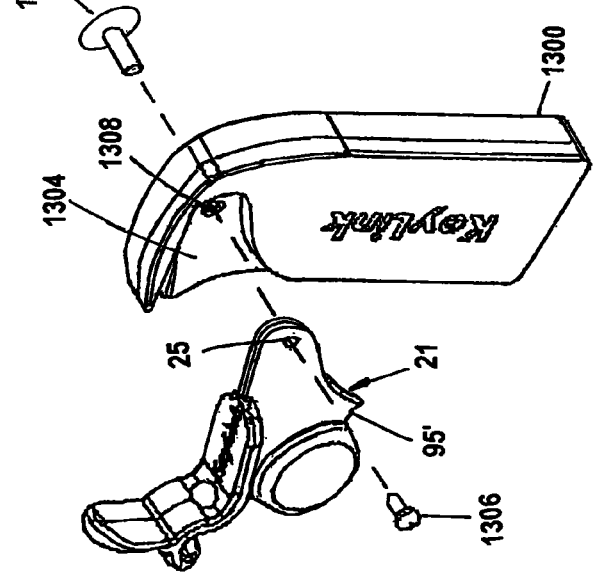

Referring to FIG. 13J, case 1300 may be made of two pieces 1300', 1300" which are coupled to one another by glue or the like.

Note that, similar to storage basket 130, when in use, opening 1302 of case 1300 would face a front wall 24d to prevent access to the interior thereof unless the attached link 21 is removed. Further note that, preferably, case 1300 is configured narrowly such that its use does not prevent the use of openings 39 adjacent to its associated link 21.

In one preferred embodiment, a system according to the present invention: 1) facilitates the processes of tagging, organizing, storing and quickly retrieving the multitude of apartment and facility keys that a front desk staff or management office wishes to keep readily on hand, for the purposes of (a) gaining quick access to residential apartments in an emergency, or of (b) providing authorized visitors with a convenience key; 2) prevents unauthorized access to and removal of residents' keys or important facility keys by anyone except for those previously registered and authorized to have access; 3) provides a complete and incontestable audit custody trail, showing (a) the exact dates and times when each key was removed and returned, (b) the identity of the specific person removing or returning each key, and (c) the identity of the person (housekeeper, dog walker, visitor) to whom the key was given after its removal.

In the preferred embodiment, a system according to the present invention includes between 140 and 228 openings 39 each for receiving an electronic storage 17 associated with a respective link/tag 21 as described above. In the preferred embodiment, controller 12 may be a PC (personal computer) running any version of Windows®. The system may further include other optional peripherals such as a touch screen monitor, a fingerprint biometric reader, an external tag reader for reading individual electronic storage devices 17 outside compartment 55 (e.g. on front wall 70), a web cam for photo capture, and an electronic signature pad. A USB hub can be used to connect all peripherals to one or more compartments 55. L-brackets or the like may be used for connecting multiple storage facilities 10 or mounting the same underneath a desktop. Two-piece rivets and a rivet gun can be used to securely attach keys to the tags. Controller 12 may be programmed with an appropriate software for conducting the operations described herein as well as to operate the compartment(s), the fingerprint pad, the signature pad and the webcam peripherals. Furthermore, controller 12 may be provided with an Internet connection for easy download of software updates, and for access to other websites and remotely located servers. For example, information relating to the stored objects (e.g. keys) can be downloaded from another database (e.g. a database that may indicate which key goes with which residence or which key opens which storage room in a building or the like information). The software for running the operations described herein can be run on a PC with other programs (e.g. video-monitoring or elevator-monitoring software etc.), thereby saving cost and space of having a separate PC. A touch-screen friendly user interface (instead of a keyboard for sending instructions and data to controller 12) would allow even those users who are not keyboard-adapt to quickly and intuitively request and return keys with no learning curve or frustration, and reduces the installation footprint of the system since space for a keyboard and mouse are no longer needed. A touch screen operating panel can even be mounted on a wall if counter space is not available or in tight quarters where access to a counter top PC is not easy.

A system according to the preferred embodiment can be operated in the following manner.

1. Enrolling of Employees: A user can be designated as a system administrator. The system administrator will have plenary access to all facilities of the system. The system administrator enrolls each employee who will be authorized to remove keys by recording their names and fingerprint images. Optionally, each employee may be provided with a personal pin code. The system administrator can then devise access limitations for each employee. For example, some employees may be given access to only one of the compartments and not the others and so on. Thus, the system provides for the flexibility to tightly design the exact security profile that is desired. For example, all employees can be allowed into compartments #1 and #2 from 9 AM to 5 PM, but only the front desk staff after 5 PM, and can also have a compartment #3 which only the resident manager can access. The system affords the system administrator choice of authentication hardware and Methods, which allows the user to select how employees "log in" (e.g., via fingerprint, keyfob, pincode or a combination of methods if two-factor authentication is desired).

2. Registering Keys: First, each new key or set of keys is attached to a link/tag 21 by a single-use rivet. Then, the electronic storage 17 of each tag is inserted into an available opening 39. Controller 12 then receives the information on the electronic storage 17 of the tag preferably while compartment 55 is open. If the electronic storage 17 cannot be identified, controller 12 will prompt the user to type in the associated apartment number and the resident's name. Controller 12 will then store the information entered by the user and will associate the same with the electronic storage 17. The association will be retained in a searchable electronic database which is resident on controller 12. The controller 12 may be programmed to include Pre-map and Re-map batch commands. Pre-map and Re-map batch commands help the user to (1) speed initial setup by pre-assigning a default tag for each apartment prior to receiving keys to be attached, or (2) to easily add or replace the compartments without having to manually input into the system any changes in compartments or tag locations.

3. Initiating a Key Removal Request: Whenever one or more key sets are needed, an authorized user initiates a key removal request by providing the apartment number and/or name of the resident to the controller 12. The information may be provided in any suitable manner. For example, the information may be provided with a conventional keyboard or via the touch screen facility, if available. Once all desired keys have been requested, the employee is then prompted by controller 12 to place his/her thumb on the fingerprint scanner, and optionally to enter his/her pin code. As soon as the employee's authority has been validated, controller 12 processes the key removal request. Specifically, controller 12 will provide information identifying compartment 55 (i.e. drawer) in which the keys are located and the locations of all requested keys in each identified compartment 55. The compartments can be identified by providing a drawer number to the monitor which is operated by controller 12. Controller 12 then unlocks each identified compartment 55 containing a requested key, and turns "on" the bright multicolored front panel light 82 for each identified compartment 55. To identify the location of each requested key, controller 12 turns "on" the appropriate visual indicator 15 (which may be a blue LED) that identifies the requested tag as described above.

4. Removing Keys: Once one or more key removal requests have been accepted, the authorized employee opens the illuminated (and now-unlocked) compartment(s) and removes all of the identified tags. Controller 12 identifies each tag as it is removed, and records in its database which keys were removed, by whom, and when. If the employee removing the key is going to be handing the key over to a different employee or to a resident or authorized agent, the employee at this point may want to identify to whom the key is being given and why by entering a note into the controller's database; or by capturing a webcam photo or the electronic signature of the recipient of the key. When the key removal process is complete and the employee closes the compartment, the compartment is locked, all lights are turned off, and all information, photos and signatures are stored in the controller 12. Support for photo capture and signature capture via webcams or electronic signature pads enables the staff to easily and indisputably document not just the identity of the staff member removing a key, but also the identity of the person to whom the key is being given (i.e. resident, guest, contractor).

5. Returning Keys: To return keys to a compartment 55, an employee can prompt controller 12 that keys are being returned. Controller 12 can be provided with an appropriate soft or hard function key that can be used by an employee to prompt controller 12. The employee's authority to return the keys can be then authenticated using the fingerprint scanner. Controller 12 then automatically unlocks compartment 55 into which the keys should be returned and operates its external visual indicator 82 in order to identify the same for the employee. The selection of the appropriate compartment 55 may be based on one of several selectable return-key algorithms. Thus, controller 12 may be programmed to prompt the user for the best compartment. Such prompting automatically activates one or more front panel visual indicators 82 when returning keys, to direct the user to the most convenient drawer for returning a key(s). A default algorithm can the selected by the user that works best for a given situation from among four algorithm choices: (a) topmost drawer that still has space (b) emptiest drawer (c) drawer with the front-most available slot, or (d) same drawer the specific key was last removed from. After being directed to a specific compartment by the external visual indicator 82 thereof, the user then opens the illuminated and unlocked compartment, returns the keys to any available opening 39 therein, and closes the compartment. Once the drawer is closed, controller 12 records into its database which keys were returned, by whom, to which opening 39 and when. If desired, the system can also be configured so as to allow employees to return keys without requiring an authorized thumbscan, which speeds up the key return process since all employees are then able to return keys, even if only one or two are authorized to remove keys. Controller 12 can be programmed to have an Emergency Key-Removal Mode that allows quick selection and withdrawal of a range of keys in the same line or on the same floor (e.g. if a water leak requires emergency access to multiple apartments).

6. Deleting Keys From The System: When a set of keys no longer requires storing within a compartment 55 (e.g. when a resident moves out), the key can be physically detached from its tag by clipping off the ends of the permanent rivet, thereby allowing the tag to be reused. Controller 12 is provided with a Delete Key function. After physically removing the key, the "Delete Keys" function can be selected to allow the user to deregister the electronic storage 17 that is integrated with the removed tag so that it is no longer associated with the previous key, apartment number and resident. The tag can now be reregistered to, and associated with, a new key, apartment number and resident. The controller is also provided with a "Change Owner" function, which allows the user to preserve the registration of a particular electronic storage 17 with a key set and its associated apartment while changing only the name of the resident of the apartment. The latter function may be useful particularly in rental apartment buildings which may not change the locks of the apartments.

7. Storing and Removing Temporary Keys: A system according to the present invention includes an innovative solution for storing temporary keys that are being left at the front desk on a one-time basis and for a short period of time. In such cases, it is undesirable to require the user to attach the keys with a permanent rivet and to go through the key reregistration process with every use. A system according to the present invention can be provided with storage basket 130 as described above that includes an electronic storage device 17, but does no include rivets or the like for the attachment of the keys. Thus, the keys remain loose within the basket. On a one-time basis, each such storage basket can be associated with a key or keys contained therein in the database of the controller 12. Whenever controller 12 detects that a basket has been received in compartment 55 (i.e. when the electronic storage 17 of the basket is received in a respective opening 39), controller 12 assumes that keys have been placed inside the basket and prompts the user for the apartment number, resident and any other special instructions. The data provided in response to the controller's query is stored in the controller's database as a one-time registration. Once a storage basket containing keys is removed from a compartment and is confirmed to be properly removed, it is automatically deregistered from the previous key set and owner, and is ready to be reregistered. The data regarding the removal and deregistration is stored in the database of controller 12. Optional storage baskets provide a fast and convenient way to securely store the "temporary" keys that are left at the front desk on a short term basis, and which are typically stored in an unsecured manner in a separate box or drawer at the front desk.

8. Staying Informed via Status indicators, Management Reports, and Email Notifications: Controller 12 keeps authorized employees, offsite management and apartment owners/renters informed in a timely fashion about key-activity information that is relevant to them. Controller 12 is programmed to provide a "Dashboard" function. Dashboard function displays on a monitor that is connected to controller 12 various real-time information and status indicators useful to employees actively using the system. For example, controller 12 can display on the monitor a list of outstanding keys and employees who have removed them, a graphic representation of the status of each compartment 55 (e.g. open, closed, lost communication, percent filled, a list of active storage baskets holding temporary key sets) and a prominent "Alarms" display area showing security exceptions and possible hardware malfunction alerts. Controller 12 is also programmed to have a "Reports" function. The "Reports" function can be used to generate and print various activity, error, exception, alarm and summary reports of key-activity and employee-activity for offsite management and supervisory personnel. Reports can be scheduled to run automatically and to be sent by email via the system's Internet connection. Controller 12 is programmed to have a "Notifications" function. The "Notifications" function sends notices, alerts, alarms and scheduled reports to management/system administrator by email, and is configurable through the internet connection of the system.

In order to tighten security, controller 12 is programmed to continuously monitor for unusual alert or alarm events. Examples of such alert/alarm events are when a drawer is left open for key removal beyond a preset reasonable duration, or when a key which has not been specifically requested is removed while the drawer is open. An alarm occurs when controller 12 temporarily loses its connection with a compartment 55, and especially when the loss of connection occurs while the compartment is unlocked and opened. When an "alert" or "alarm" event occurs, the system emits an audible alarm, and in some cases may also log the events in a security database resident on controller 12 and/or send out an e-mail notification to the designated system administrator.

In the preferred embodiment, all the components of the system are installed through a USB based connection. USB-based installation of all system components (key drawers, touchscreen, fingerprint scanner, WebCam and signature capture pad) enables the user to install, modify, move, or expand the system without requiring special connectors or return visits by a technical installer.

In the preferred embodiment, external visual indicator 82 for each compartment 55 is an extra-bright multicolored Status LED to provide easy system status reporting. For example, when solid blue color is being emitted, the user is being signaled to open the compartment/drawer. Other examples are as follows: fast-blinking yellow="drawer-open time limit has been exceeded; remember to close this drawer", slow blinking red=system is resetting and checking itself, solid green=reset is complete and successful.

In the preferred embodiment, uniquely designed and colored links/tags are used. Each such tag is made of virtually indestructible high-impact plastic and provides a compact yet highly recognizable shape and color, whereby the removed keysets are not easily lost. Each tag features an identifying iButton and locking ring, a tapered bottom for easy insertion into an opening 39, and a clear diffuser dome to sharpen the effect of the blue LED locator light (visual indicator 15) that illuminates the tag upon selection. The user can mix and match colors for special purposes. For example, blue for resident keys, red for facility emergency shutoff keys, and yellow for common area keys. Alternatively, blue can be used for east-wing apartment keys, and green for west-wing apartment keys.

A system according to the preferred embodiment can optionally include customizable frontplates for each compartment, and have square edges designed to facilitate the attaching of a custom veneer surface to the front plate of the compartment either to match the local decor or to allow for desired customer branding.

A system according to the present invention may further include an electronic ambient light sensor that can detect the intensity of ambient light. The system, based on the information received from the light sensor, then automatically toggles the status of the system from the day mode to night mode or vice versa. The visual indicators 15 can be then operated based on whether the system is operating in the day mode or the night. For example, the visual indicators can be operated to be on steadily and continuously, to blink fast, or to emit light in a runway-pattern (i.e. light up sequentially to direct the user's eye toward the position of the selected key in the compartment) to maximize visibility and ease eye strain for each ambient lighting condition. Choice of LED-signaling style (the lighting pattern used to highlight the selected key(s) to be removed—i.e. blinking, steady, runway-landing pattern) is software-selectable, and allows the user to choose the style that best increases detection while also adjusting for sustained-use eye comfort, very bright or dark ambient conditions, or staff members with limited vision or colorblindness.

In the preferred embodiment, compartment 55 can be provided with a loudspeaker. The loudspeaker provides auditory feedback/confirmation of actions (i.e. key return, drawer close), and sounds alerts for conditions needing attention.

A controller 12 according to the preferred embodiment may be programmed for "Automated Version" checking and updating functions to keep the system current with all the latest features, tweaks and fixes. For example, controller 12 is programmed so that each time the system is started, the program residing on controller 12 checks a designated server over the Internet to install any available updates.

A system according to the present invention can be in operative communication with a web server that includes a web database that is in synch with the system's local apartment and residents database, and registration data. The web server allows authorized users to remotely update their resident and apartment information remotely without needing to be physically present at the site of the system and more specifically the physical site of controller 12 for easy handling of move-ins and move-outs. The web server also automatically maintains an online (offsite) back-up of the registration data including all apartment numbers and associated tags to speed up system recovery in the event of a PC crash. The web server can also be configured to send an email to the system administrator automatically when any alert conditions occur, or to email nightly or weekly activity reports to the system administrator. The web server can also 1) send out automatic email notifications either to residents when their keys are withdrawn or returned, or to management in the event any security violation or alert occurs on the local system, 2) allow "split" authorizations, (i.e. Employee "A" can initiate a remote key-withdrawal request from a PC not near the physical location of the system box, and employee "B" completes the key-withdrawal request by scanning his/her fingerprint into the PC attached to the KeyLink system box), 3) print a real-time tag location report, identifying in exactly which slot/row/drawer each apartment's key is currently found which can be helpful in the event of a PC crash requiring management to open the drawer with the manual override key.

A system according to the preferred embodiment thus includes the following convenient features:

| Features: |
|---|
| Apartments and residents table - View, update and provide backup |
| Apartments and residents table - One-click "push" (internet) or upload (local) of entire apartments and residents table to local system database |
| Tag Registrations table - View, update and provide backup for the Tag Registrations table (showing which tags are associated with which apt. #s) |
| Tag Registrations table - One-click "push" (internet) or upload (local) of entire Tag Registrations table to local system database |
| Activity records - View activity records for all key-in/key-out and slot change activities |
| Tag-Locations Report - Print a listing of all currently registered Tags that are identified by the database as being in the drawer currently. |
| Email Notifications to Residents - Provides email notification to residents when their keys are removed or returned |
| Email Notifications to Management - Provides email notification to management when a local alert or security violation has occurred |
| Emailed Reports to Management - Provides scheduled email reports to management |
| Split Authorizations - Allows initiating a key removal request remotely |
| Employee/User Permissions - Allows viewing and changing of employee access permissions |
| Recipient Photo/Signature capture - Allows capture of phot or signature of person receiving a removed key. |

Communication Protocol

In the preferred embodiment, controller 12 communicates with each compartment 55 via a USB serial link. Expanding the system is possible by adding more USB ports to controller 12 or an external USB hub. The communication protocol is ASCII text based and can be exercised by any terminal program, e.g., Windows HyperTerminal software. Each compartment 55 is operated by a microcontroller (subcontroller 32) running all the functions requested by controller 12.

The microcontroller acts as a slave device, listening to the controller, performing the requested commands or returning data. Each compartment has its own programmable non-volatile ID which is embedded into every message header received by controller 12. The messaging system is one-on-one style. Although the microcontroller is capable of buffering several incoming messages, for more reliable operation controller 12 should wait for the response before initiating a new message. Any unrecognized message will be returned with <drwID>,<CR> response (drwID=drawer ID, CR=Carriage Return). Inter character delay is maximum 2 seconds, after this timeout period the message string is reinitialized with the next character received.

The Virtual Communication port is automatically established by Windows® after power up. The USB slave device (microcontroller) is programmable with custom properties (e.g., serial number) using "MProg" utility software. Appendix 1 of U.S. Provisional Application No. 61/293,976 (incorporated by reference) discloses one protocol effecting communication between controller 12 and compartment 55. Appendix 2 of U.S. Provisional Application No. 61/293,976 (incorporated by reference) discloses another protocol effecting communication between controller 12 and compartment 55.

The microcontroller (subcontroller 32) is preferably AT89C51ID2 and can be programmed three ways:

1) Using dedicated parallel programmer. This time the chip is programmed before being placed in the circuit. Parallel programmers are available from various vendors.

2) Using "FLIP" serial downloader. FLIP (Flexible In-system Programmer) is a software that runs Windows. FLIP supports in-system programming of Flash devices through RS232.

3) Running the boot loader utility from boot mode. For this the chip must have at least the boot alone or the boot+runtime combo firmware already programmed using either the first or second method.

The following steps may be taken to perform flash upgrade:

If the chip has the boot+run combo loaded run the "bot" command to enter to boot mode from run mode then run "fla" command to upload the new executable file the way it is described in the Detailed description of commands section of Appendix 1 or Appendix 2 of U.S. Provisional Application No. 61/293,976 (incorporated by reference).

If the chip only has the boot portion loaded run the "fla" command the way it is described in the Detailed description of commands section of Appendix 1 or Appendix 2 of U.S. Provisional Application No. 61/293,976 (incorporated by reference).

Figure 14A:
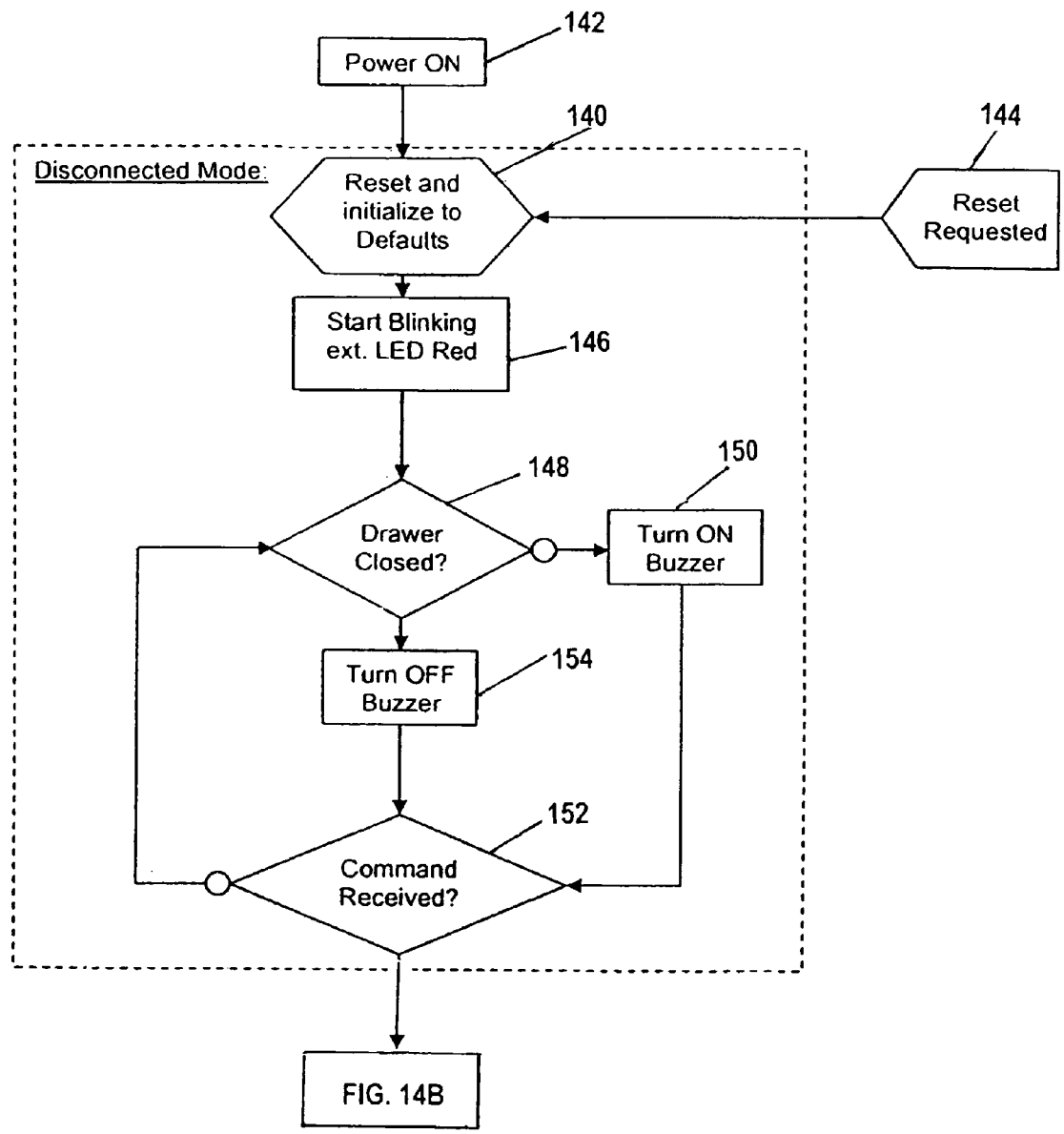
FIG. 14A illustrates the system's operation when controller 12 and compartment 55 are in a disconnected mode.

Referring to FIG. 14A, controller 12 resets and initializes to its default settings 140 when power is turned on 142. Note that reset may be requested by a user 144 as well. Thereafter, the external visual indicator 82 of each component 55 is instructed to blink in one color, for example, red 146. Controller 12 then checks to see if compartment 55 is closed 148. If not, buzzer is turned on 150, 152. The buzzer remains on until the answer to the drawer closed query is yes. Then, controller 12 turns the buzzer off at 154.

Figure 14B:
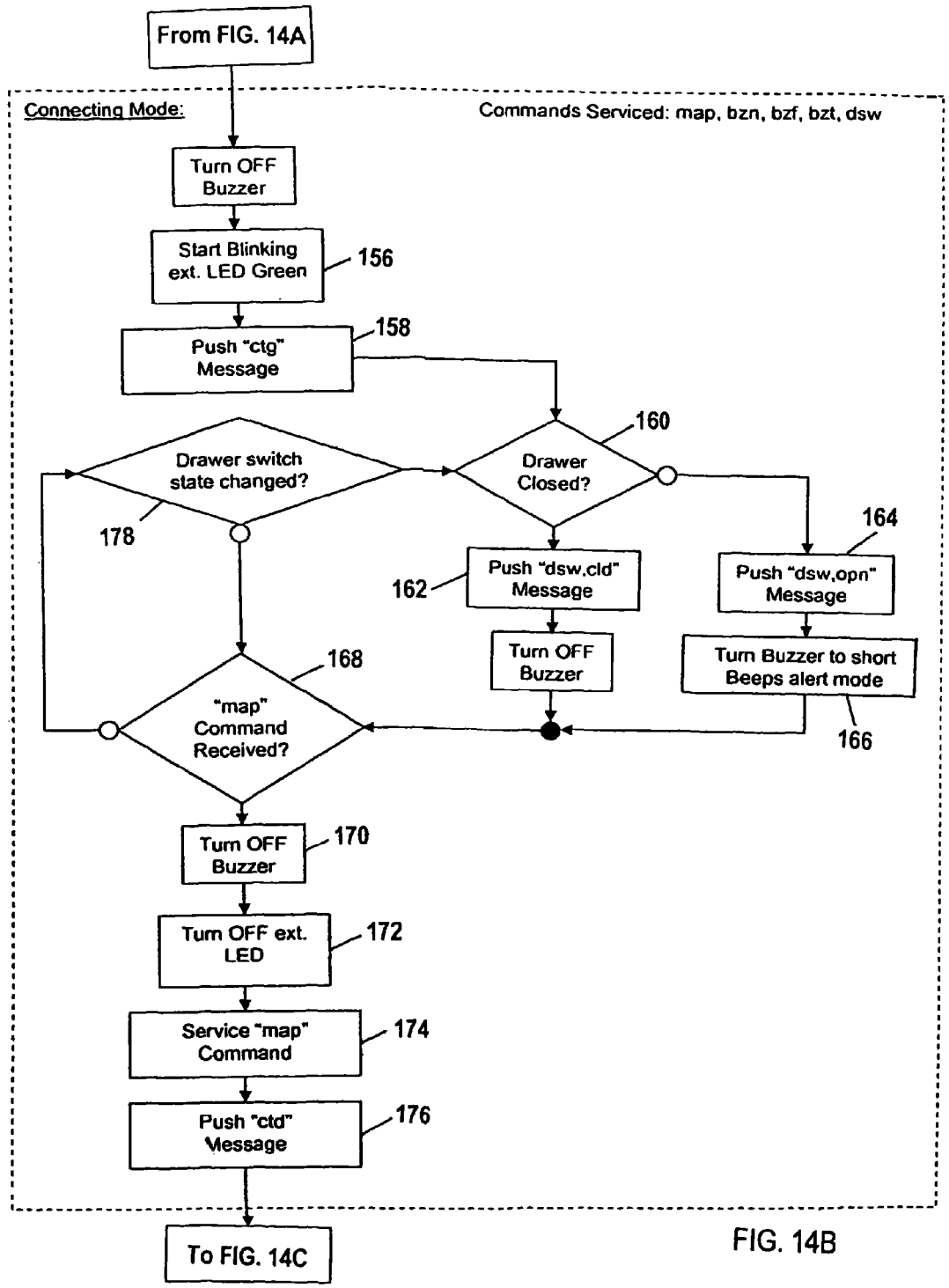
FIG. 14B illustrates the system's operation when controller 12 and compartment 55 are in the connecting mode.

Referring now to FIG. 14B, if it is determined that the compartment 55 is closed, controller 12 instructs visual indicator 82 on the compartment to turn green 156. Then, a connecting message is generated by controller 12 and displayed on a monitor. Again, controller 12 checks to determine whether the compartment 55 is closed 160. If yes, controller 12 generates a message indicating that the compartment is closed 162. If not, controller 12 generates a message indicating that the compartment is open 164 and then turns the buzzer on. Thereafter, controller 12 checks to see if a map command has been received. If map command has been received, controller 12 turns the buzzer off 170, turns the external visual indicator 82 off, calls for a service map command 174, and generates a connected message 176 indicating that the controller 12 and the compartment 55 are connected and in communication. If map command has not been received, controller 12 first checks to see if the state of the compartment's switch is changed 178. If not, controller proceeds to step 168. If so, controller 12 proceeds to step 160.

Figure 14C:
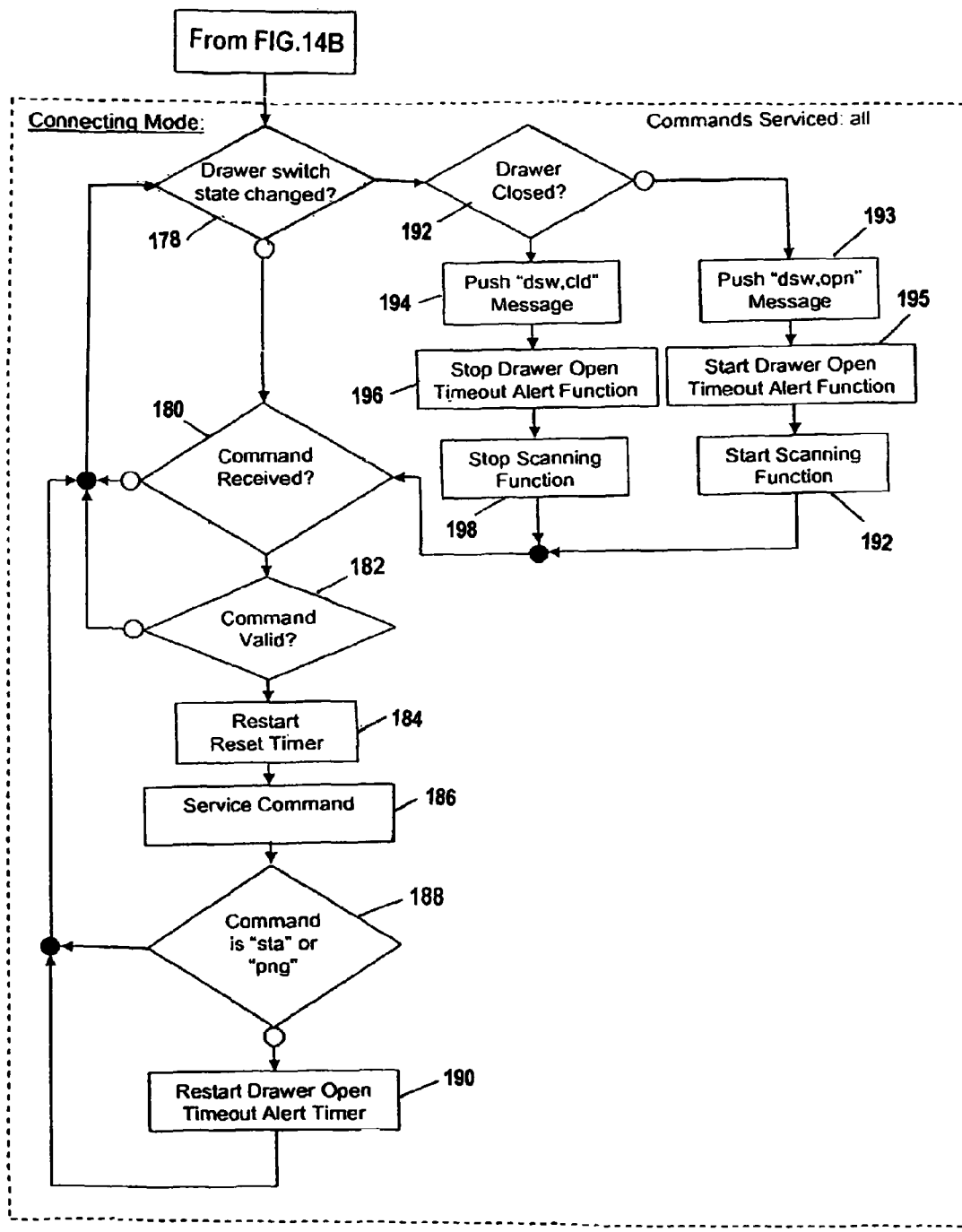
FIG. 14C illustrates the system's operation when controller 12 and compartment 55 are in the connected mode.

Referring to FIG. 14C, after controller 12 and a compartment 55 are connected, controller 12 will check to see if the state of the compartment's switch has changed. If not, controller 12 checks to see if a command has been received 180. If not, controller 12 returns to step 178. If a command has been received 180, controller 12 checks to see if the command is valid 182. If the command is not valid, process returns to step 178. If the command is valid, then controller 12 restarts the reset timer 184, determines if it is a service command 186, and then determines if it is an "sta" command "png" command 188 (see Appendix 1 or Appendix 2 of U.S. Provisional Application No. 61/293,976 (incorporated by reference)). If it is either "sta" command or "png" command, then the controller returns to step 178. If not, controller 12 restarts the open compartment time out alert 190, and returns to step 178.

If it is determined at step 178 that the state of the compartment's switch has changed, controller 12 determines whether compartment 55 is open or closed 192. If open, controller 12 generates a message indicating that the compartment is open 193, starts to determine how long the compartment has remained open in order to generate an alert signal if it has remained open beyond a preset time 195, starts the scanning function in order to determine whether any tags have been removed or placed inside the compartment 197. If closed, controller 12 generates a message indicating that the compartment is closed, stops the time out alert function, and stops the scanning function 198.

Note that, when connecting (FIG. 14B) and when connected (FIG. 14C), controller 12 can monitor the state of connection of the USB cable. If disconnected 200, controller 12 can reset the system (see step 144 in FIG. 14A).

Furthermore, controller 12 is programmed to check connectivity through pinging. If, after a predetermined time that is measured by a reset timer, pinging fails (i.e., reset time is zero 202), then controller 12 requests a reset 144.

Figure 15A:
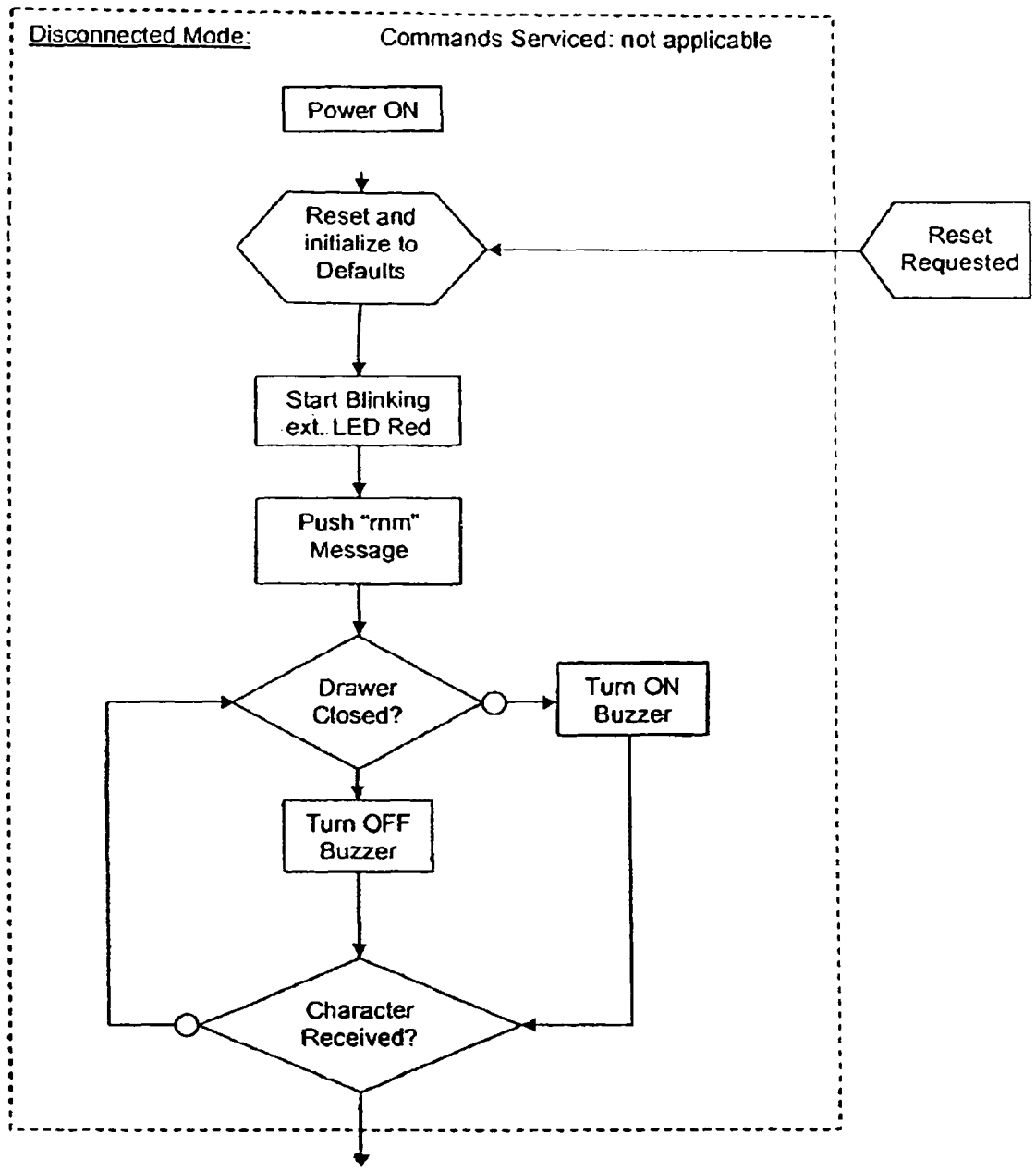
FIG. 15A illustrates the system's operation when controller 12 and compartment 55 are in a disconnected mode according to an alternative method.
Figure 15B:
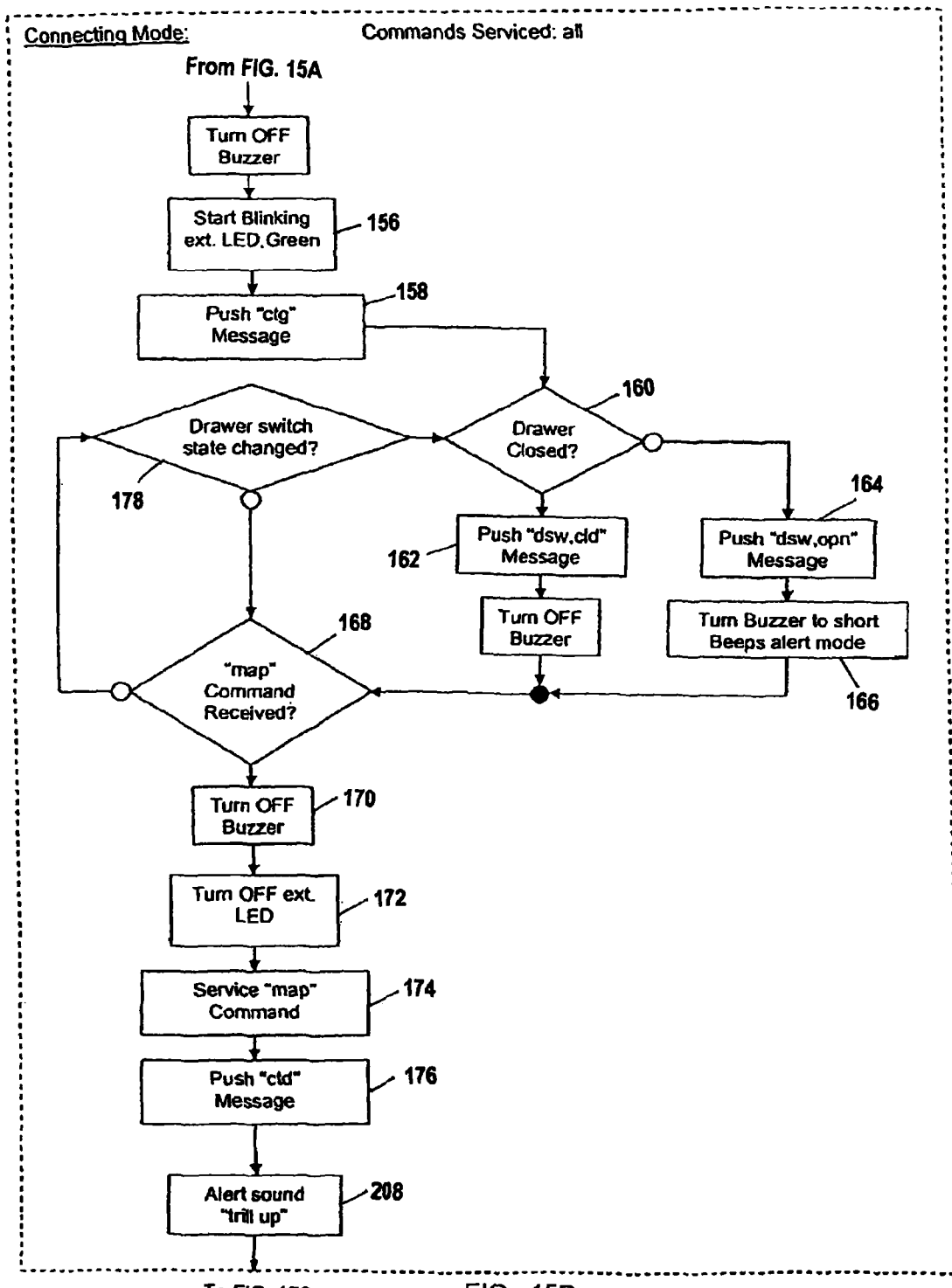
FIG. 15B illustrates the system's operation when controller 12 and compartment 55 are in the connecting mode according to an alternative method.
Figure 15C:
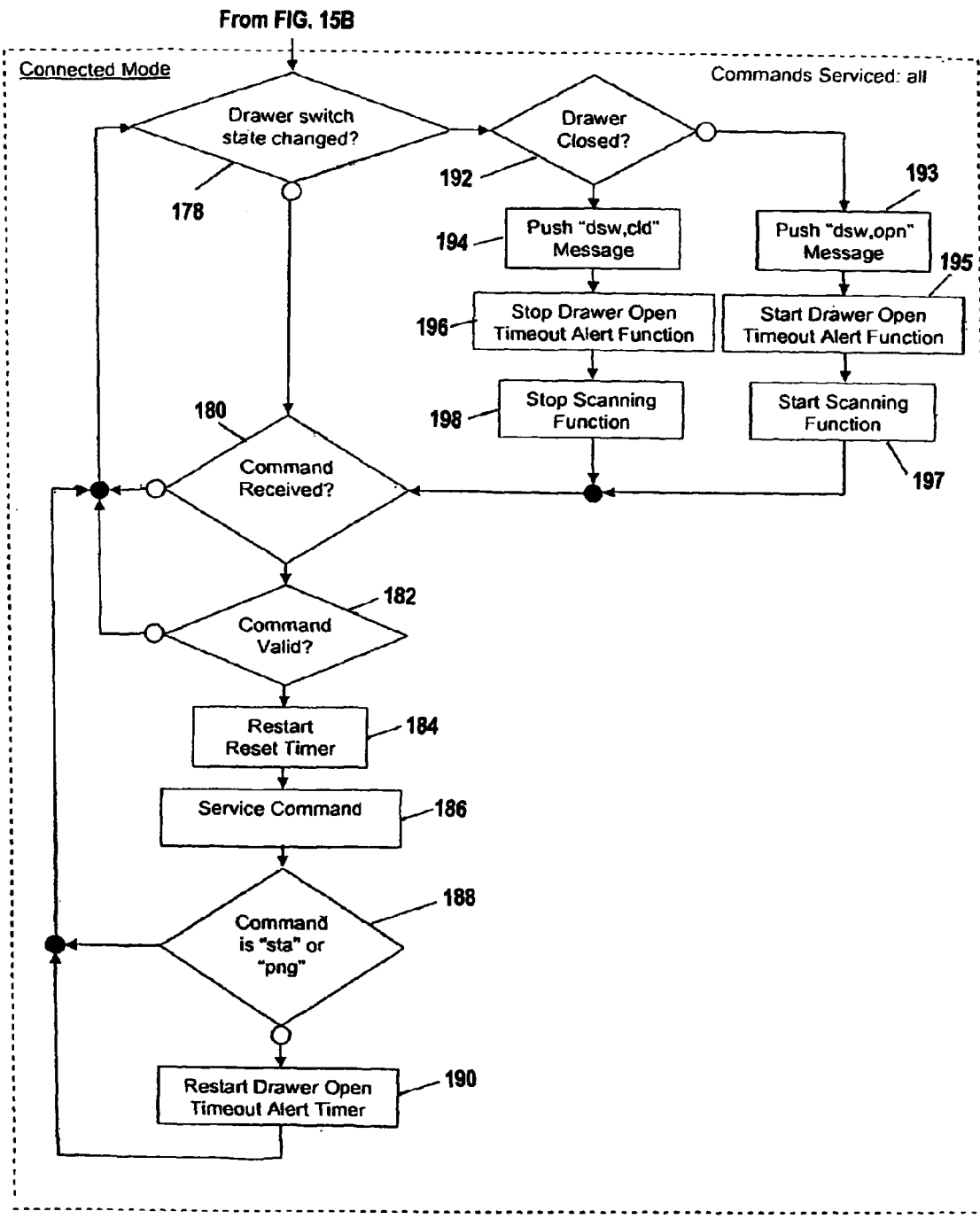
FIG. 15C illustrates the system's operation when controller 12 and compartment 55 are in the connected mode according to an alternative method.

Referring to FIGS. 15A-15C, in which like numerals identify like features, in the disconnected mode (FIG. 15A) a message may be generated 147 by controller 12 indicating a run mode message (rnm) indicating that the system is in the run mode after step 146 but before step 148. In the connecting and the connected mode (FIGS. 15B, 15C), when pinging, after reset timer reaches zero, an alarm is sounded 204 before requesting a reset 144. Furthermore, an alarm is sounded 206, if it is determined that the USB has been disconnected.

Figure 16A:
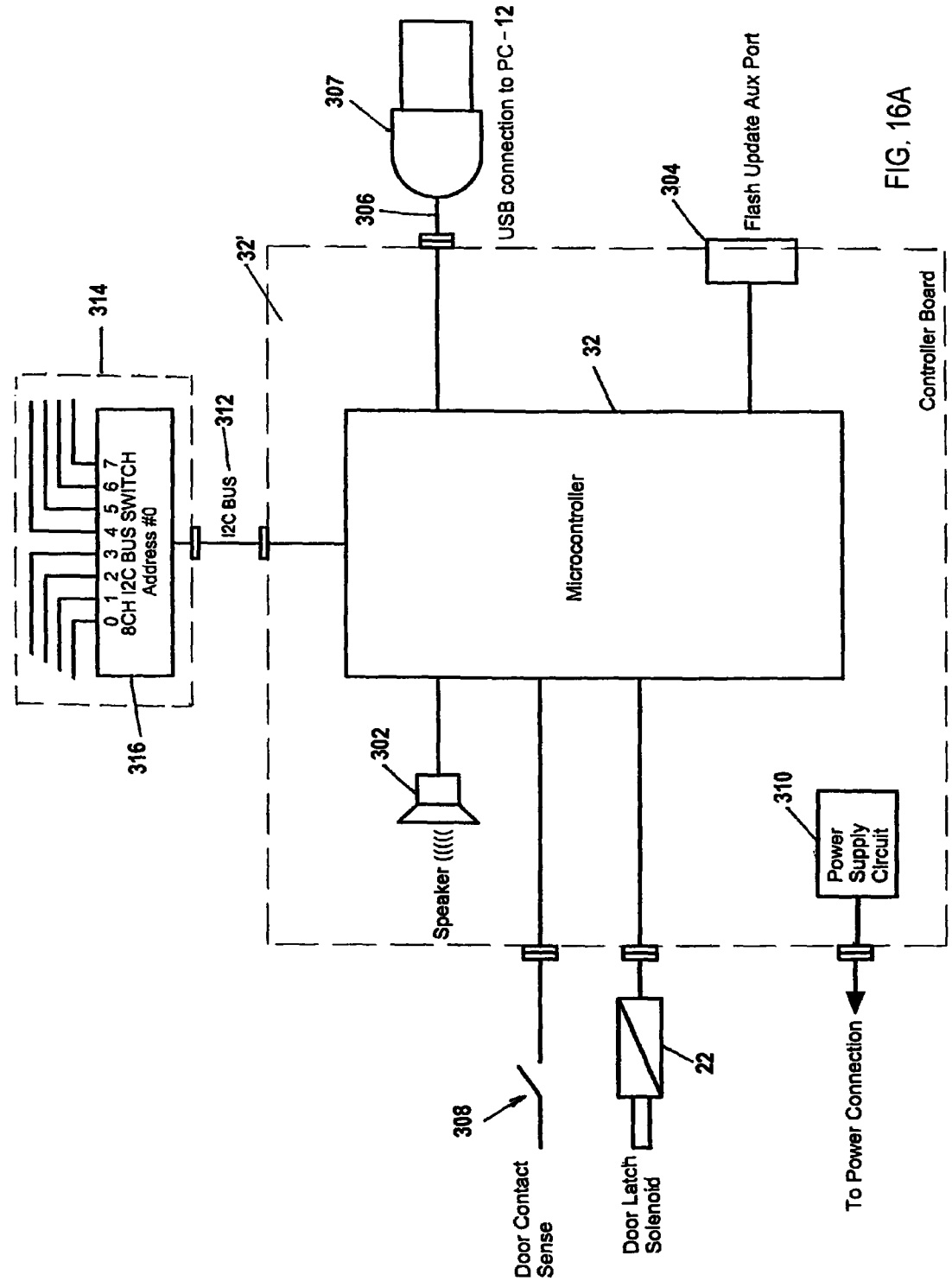
FIG. 16A schematically illustrates a tracking and identification system according to the present invention.

Referring to FIG. 16A, the tracking and identification facility according to one embodiment includes a controller board 32', an interconnect board 300 and a plurality of circuit boards 24a all supported in and/or by a storage facility 10. Subcontroller 32 resides on controller board 32' and is operatively connected to a loudspeaker 302, flash update auxiliary port 304, a USB cable 306 that includes a USB connector 307 which is coupled to controller/PC 12, electronic lock 22 and a sensor 308 which provides information regarding the open/close state of the storage (e.g. whether the drawer is open or closed). Also, a power supply circuit 310 resides on controller board 32'. Power supply circuit 310 is connectable to a power source (e.g. an AC power line, 110 v, 60 Hz) and functions to convert the power signal from the power source to a signal suitable for use by subcontroller 32. Thus, power supply circuit 310 supplies power to subcontroller 32.

Figure 16B:
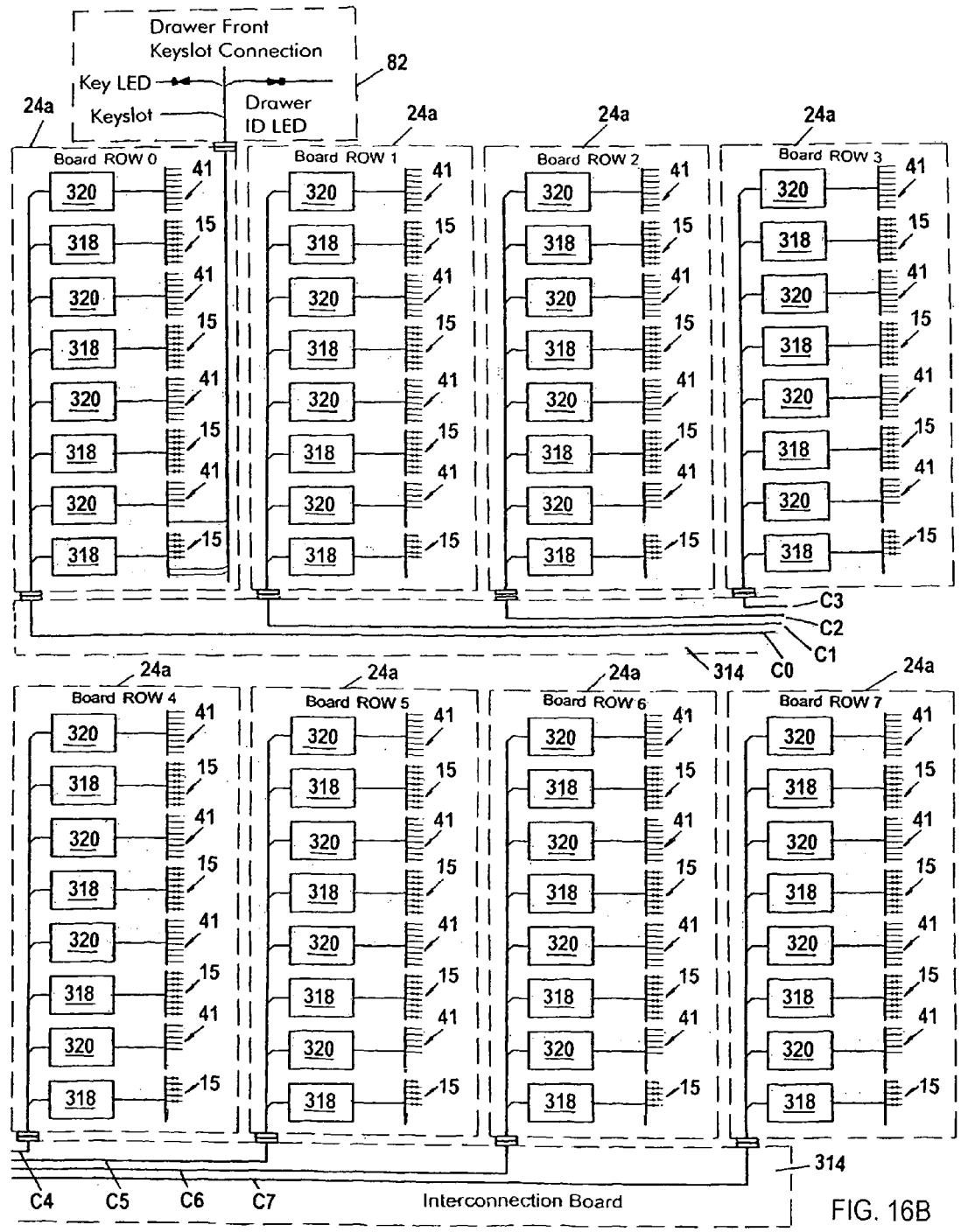
FIG. 16B schematically illustrates circuit boards that serve to receive and identify trackable links in a system according to the present invention.
Figure 16B:
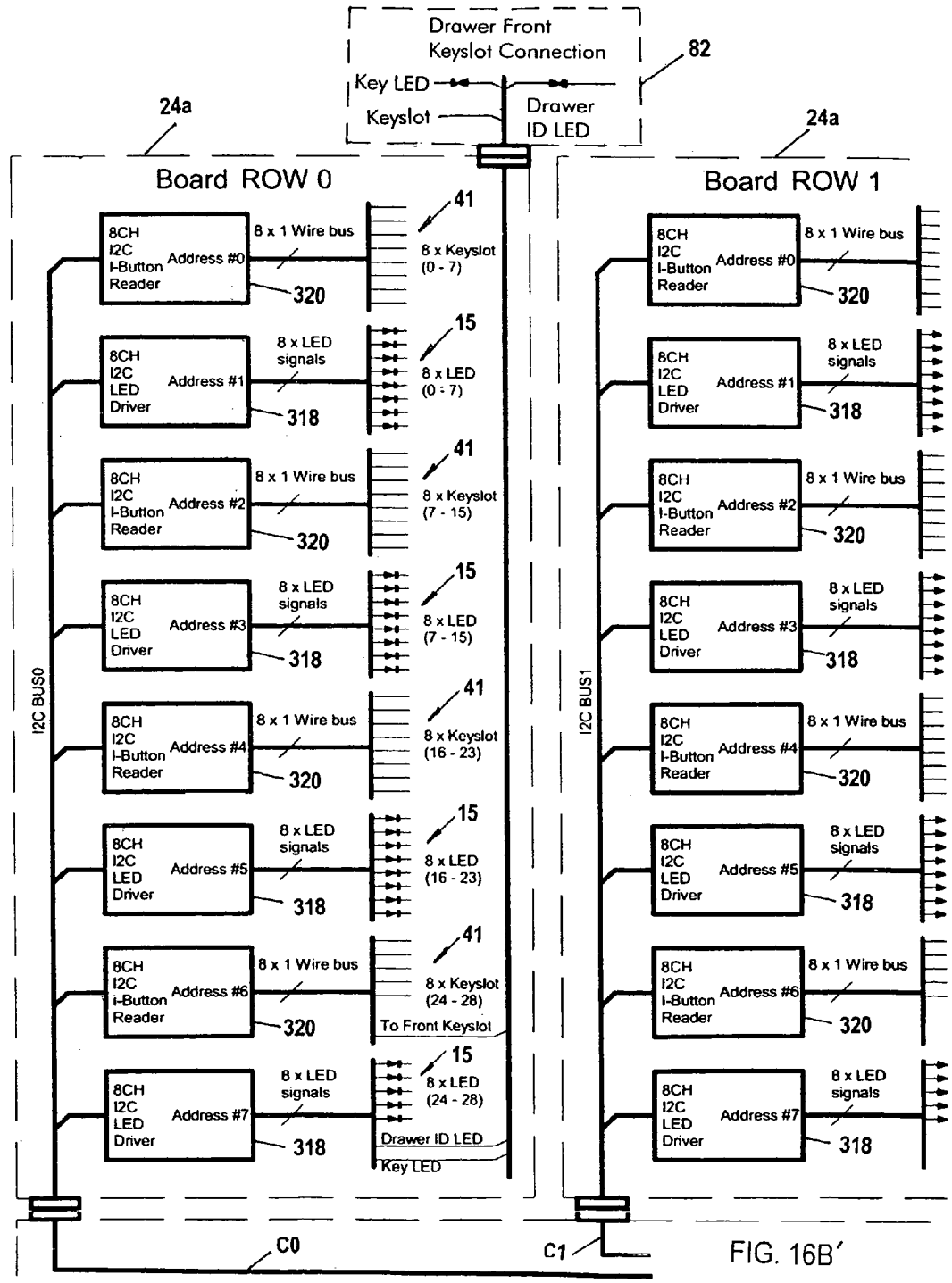

Subcontroller 32 is operatively coupled to an interconnection board 314 via a bus line 312. Bus line 312 supplies power to interconnection board 314. A multi-channel bus switch 316 resides on interconnection board 314. In the embodiment shown, multi-channel bus switch 312 includes eight channels C0, C1, C2, C3, C4, C5, C6, C7. Multi-channel bus switch 316 distributes power and other signals to eight different circuit boards 24a (FIG. 16B). Furthermore, multi-channel bus switch can collect signals from each circuit board 24a for subcontroller 32. Note that in the embodiment shown each circuit board 24a is connected to multi-channel bus switch 314 over a single bus line. Residing on each circuit board 24a are a plurality of LED devices 318 and a plurality of iButton readers 320. Each LED driver 318 can operate eight LEDs 15, and each iButton reader 320 is coupled to eight pairs of connectors 41 for reading a respective iButton in contact therewith. Note that in the embodiment shown by FIGS. 16A and 16B, one of the circuit boards 24a (see Board Row ) may be operatively coupled to LED 82 and other associated features (e.g. a front key slot and a key LED). Thus, an LED driver 318 can operate the LEDs (other than LEDs 15) and an iButton reader 320 can be in communication with the keyslot.

Figure 16C:
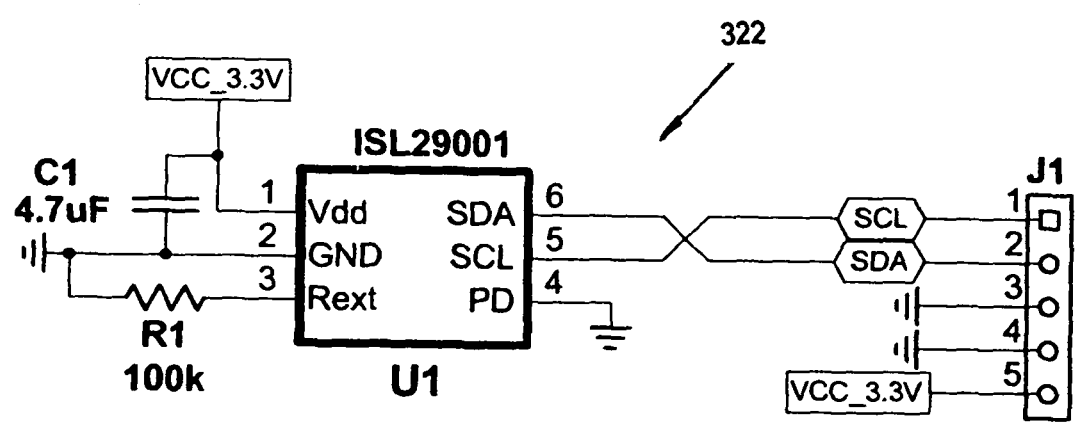
FIG. 16C shows a light sensor circuit in use with a system according to the present invention.

FIG. 16C shows a light sensor circuit 322 that can be used in one preferred embodiment of the present invention. Light sensor circuit 322 is used to measure the intensity of the ambient light. The measurements so obtained can be used to adjust the intensity of light emitted by the LEDs 15 and other visual indicators.

Figure 16D:
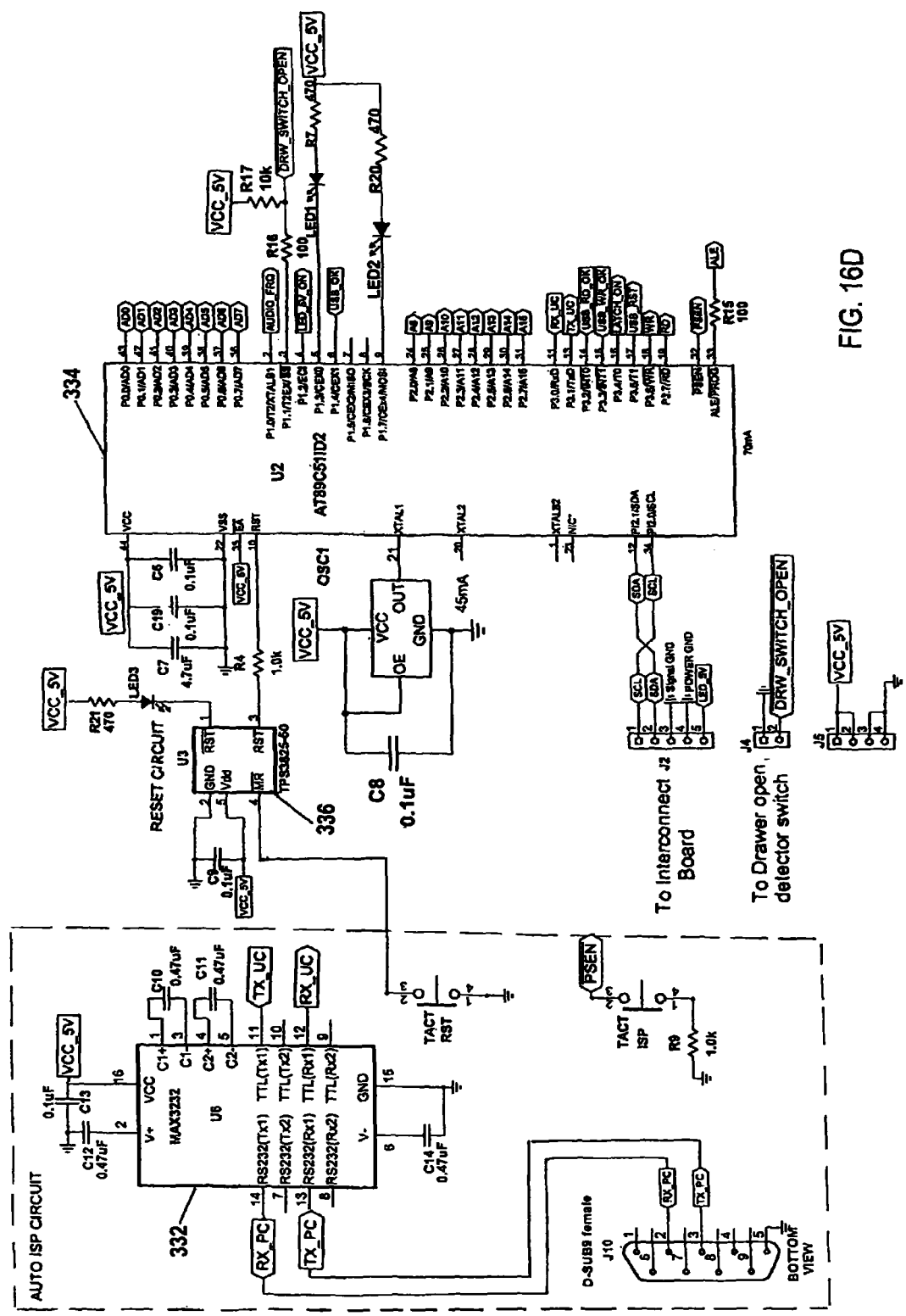
FIG. 16D shows the various circuits and components residing on a controller board that may be used in a system according to the present invention.

FIG. 16D shows the various circuits that may reside on controller board 32' in one preferred embodiment. Thus, resident circuits on controller board 32' may be a buzzer driver circuit 324 for driving loudspeaker 302, a solenoid driver circuit 326 to operate electronic lock 22, first DC power supply circuit 328 to supply a DC voltage to the LEDs (e.g. a +5 v power supply), and a second power supply circuit 330 that supplies power to digital components of the circuit (e.g. a +5 v power supply). Further residing on board 32' are a transceiver IC 332 (e.g. MAX 3232 available from Maxium Integrated Products), an 8-bit flash controller IC 334 (e.g. AT89C51ID2 available from Atmel Corporation), a processor supervisory IC 336 (e.g. TPS3825-50 available from Texas Instruments Inc.) which is operatively coupled to transceiver IC 332 and flash microcontroller 334, a USB to parallel FIFO Interface IC 338 (e.g. FT245RL from Future Technology Devices International Ltd.), a state RAM IC 340 (e.g. C462256 available from Cypress Semiconductor Corporation), an octal D-type latch IC with a 3-state output non-inverting 342 (e.g. 74ACT573 available from ST Microelectronics) and a low capacitance ESD IC 344 (e.g. TVSI USBLC6-2SC6 available from ST Microelectronics).

Figure 16E:
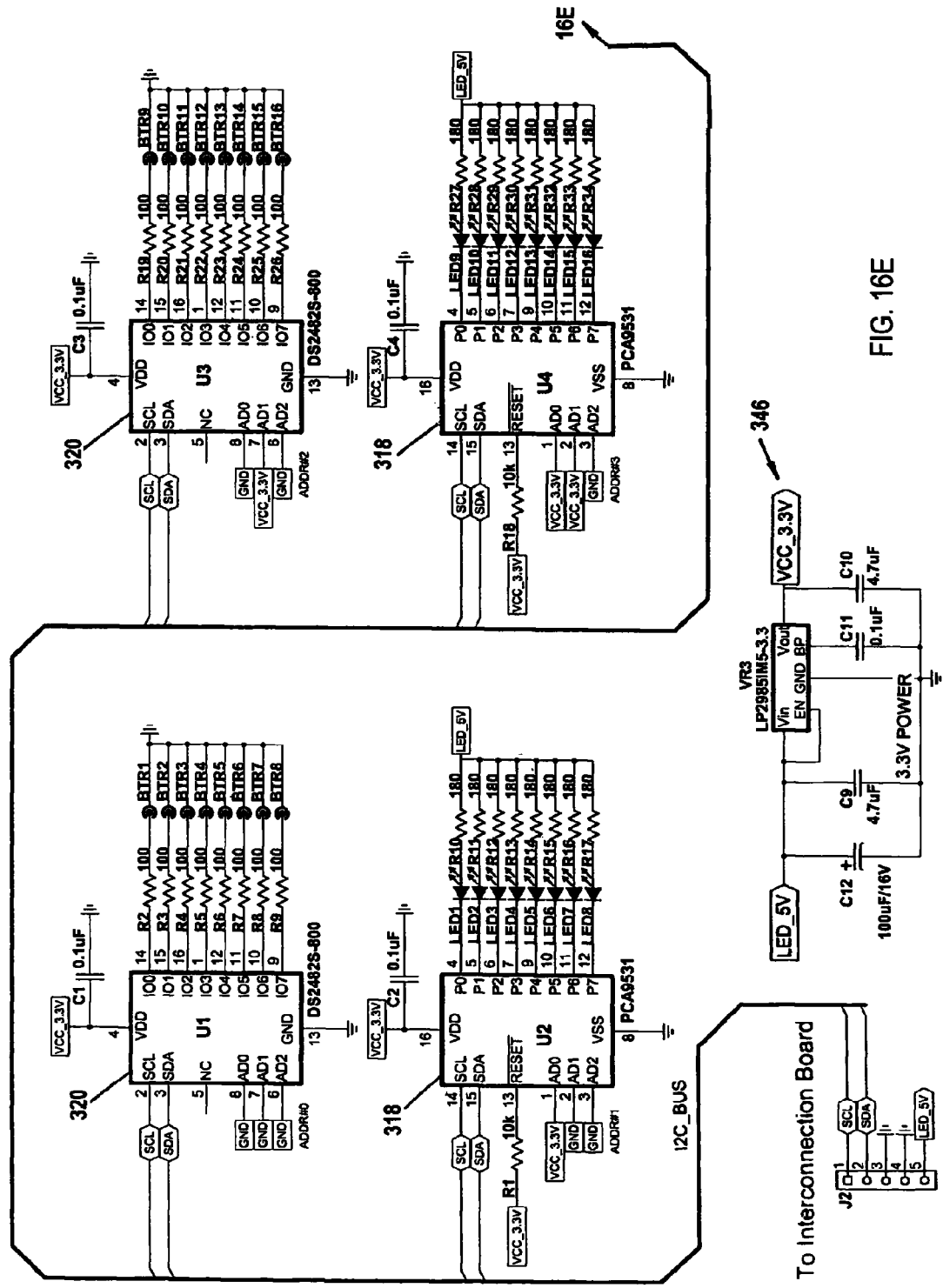
FIG. 16E shows with further detail, the circuits and circuit components that may reside on the circuit boards that are schematically illustrated by FIG. 16B.

FIG. 16E discloses further details regarding a circuit board 24a. Specifically, FIG. 16E discloses a preferred embodiment of a board 24a (e.g. Board Row in FIG. 16B). Note that each board 24a may be supplied with a low voltage (e.g. 3.3 volts) from a step down voltage converter 346 which converts a higher voltage (e.g. 5 volts) to a lower voltage suitable for use by LED drivers 318 and iButton readers 320.

Figure 16F:
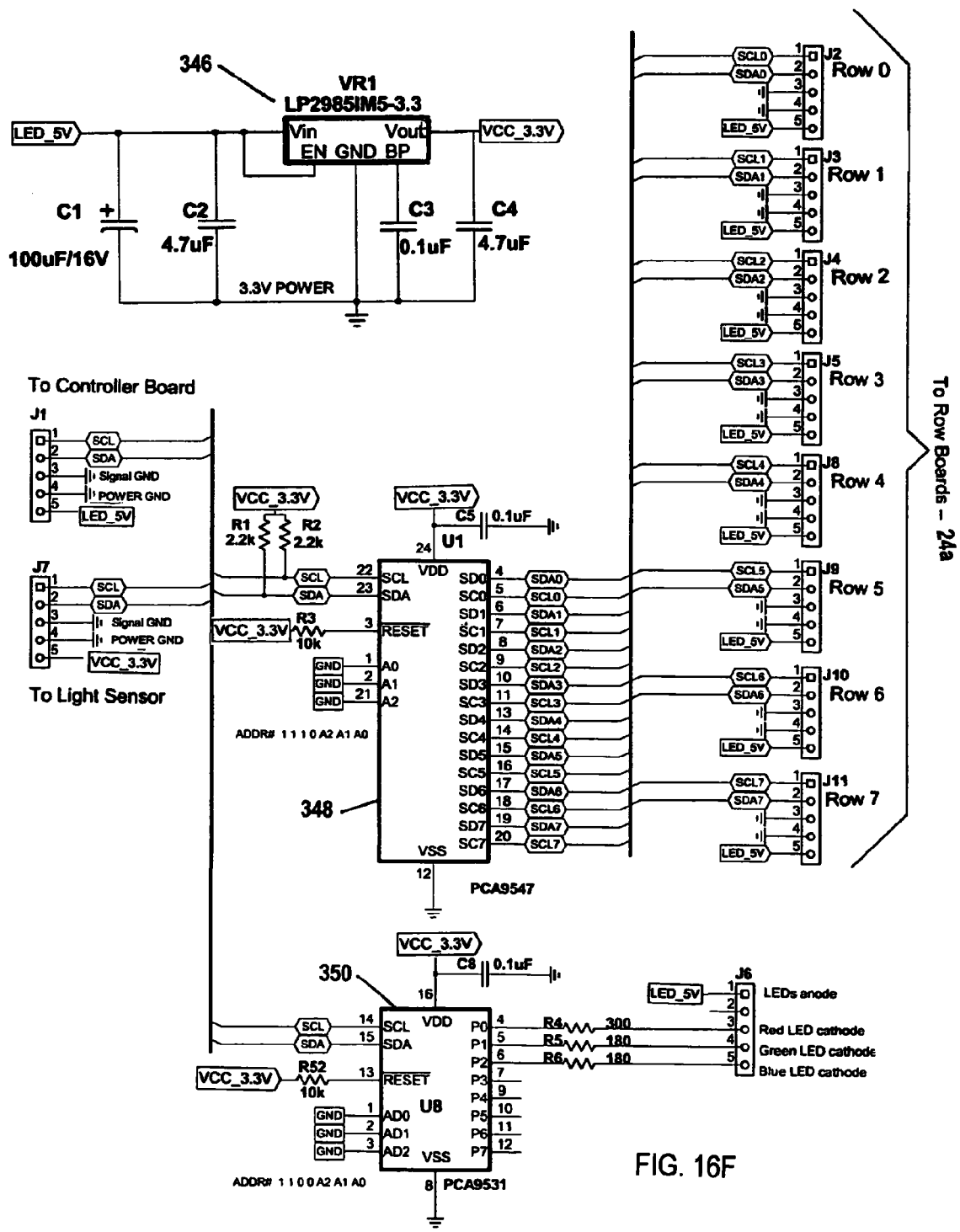
FIG. 16F shows, with further detail, the circuits and circuit components residing on an interconnect board, which connects a controller board (FIGS. 16A and 16D) to circuit boards shown by FIG. 16B.

FIG. 16F shows the various components residing on interconnect board 314. Specifically, residing on interconnect board 314 are an 8 channel I²C-bus multiplexer with reset IC 348 (e.g. PCA9547 available from NXP semiconductors) and 8-bit I²C-bus LED dimmer IC 350 (e.g. PCA9531 available from NXP semiconductors). A step down voltage converter 346 may also reside on interconnect board 314 for supplying operating voltage to ICS 348, 350.

Appendix 3 of U.S. Provisional Application No. 61/293, 976 (incorporated by reference) further discloses details about the operation of a system according to the present invention.

Figure 17C:
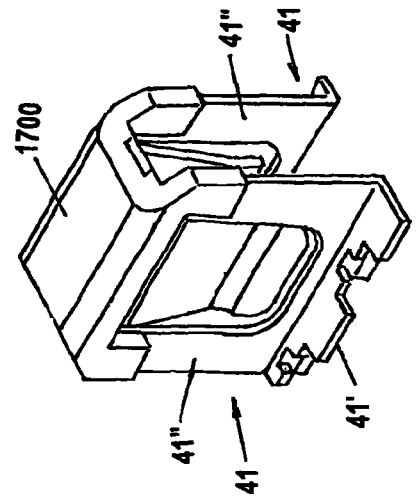
FIG. 17C shows an arrangement of two connectors with a retainer according to another aspect of the present invention.
Figure 17D:
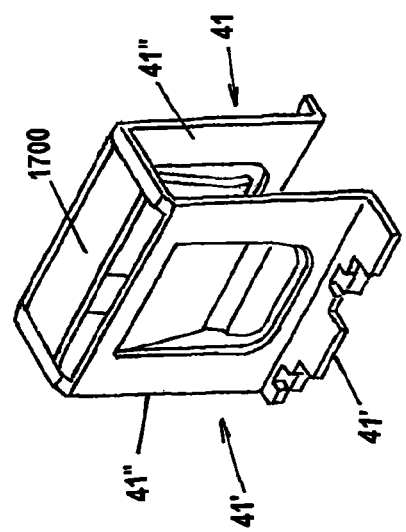
FIG. 17D shows an alternative arrangement of two connectors with another, alternative retainer according to another embodiment of the present invention.
Figure 17B:
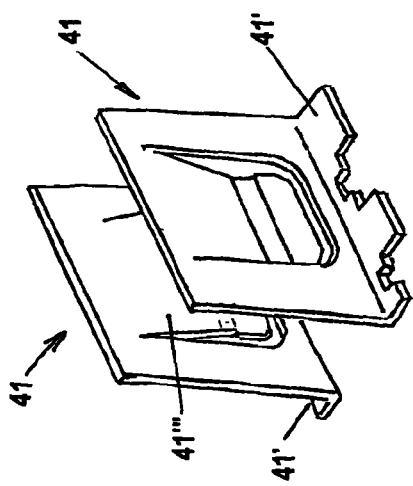
FIG. 17B shows two connectors as shown by FIG. 17A arranged opposite one another illustrating the assembly thereof on a circuit board.
Figure 17A:
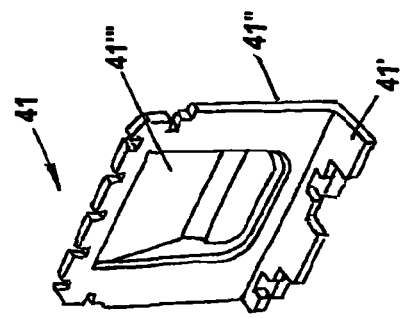
FIG. 17A shows a single connector that is suitable for use in a system according to the present invention.

FIG. 17A shows a connector 41 suitable for use in a system according to the present invention. Connector 41 is preferably a unitary metallic body having a foot portion 41' which is configured for coupling by solder or the like adhesive to a corresponding conductive land on a circuit board 24a along one of the long sides of an opening 39 as shown in the figures and described earlier. Connector 41 further includes a frame portion 41" which extends away from an edge of foot portion 41'. A cantilevered spring portion 41''' is connected at an edge thereof to an interior edge of frame portion 41" and extends toward foot portion 41'. Spring portion 41''' serves to make contact to a respective electrode of an i-button 17 as shown in the figures and described earlier.

FIG. 17B shows two connectors 41 arranged opposite one another as they would be arranged on either side of an opening 39 in a circuit board 24a. Note that in the arrangement shown by FIG. 17B and the arrangement shown above connectors 41 are left with free ends.

Referring to FIG. 17C, according to an aspect of the present invention a retainer 1700 may be coupled to both free ends of connectors 41 in order to restrict the free motion thereof. Retainer 1700 may be made of plastic or like and may snap onto the free ends of connectors 41.

Referring to FIG. 17D, in an alternative embodiment, retainer 1700 may be molded over the free ends of connectors 1700.

In both embodiments shown by FIGS. 17C and 17D, retainer 1700 serves to restrict the free ends of connectors 41 from spreading away from one another over time. As a result, retainer 1700 will ensure good electrical contact by connectors.

Figure 18C:
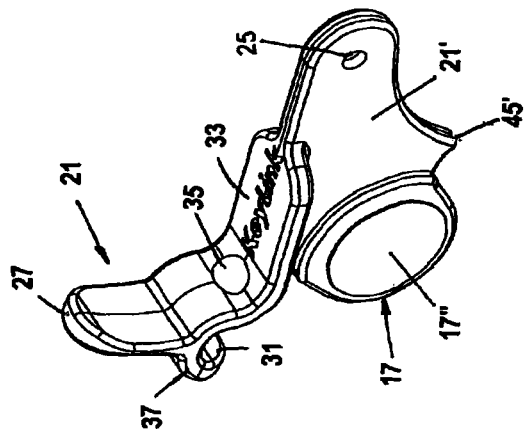
FIGS. 18B and 18C show the two sides of the link of FIG. 18A with the electronic memory device being assembled therewith.
Figure 18B:
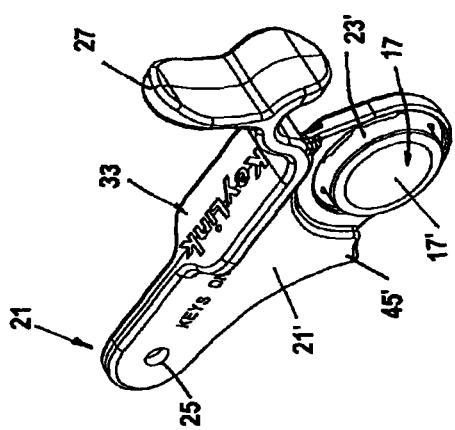
Figure 18A:
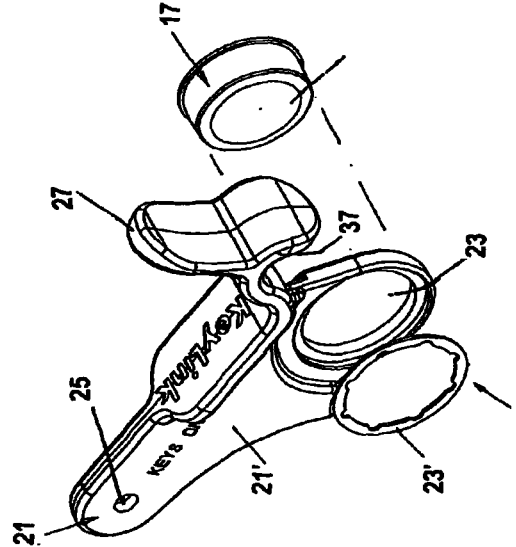
FIG. 18A shows a perspective view of a link according to an alternative embodiment of the present invention with the electronic memory device thereof being in a disassembled state.

Referring to FIGS. 18A-18C, in which like numerals identify like features, a link according to another embodiment of the present invention does not include stops 45 on opposite sides of blade 21' portion of link 21. Rather, a portion 45' of the bottom edge of blade portion 21' is extended outwardly to serve the same function as stops 45. Note that electronic storage 17, which is received in opening 23, can be secured to link 21 by using a press-fitted ring 23'. This mechanical arrangement is equally applicable to other embodiments disclosed above.

According to another aspect of the present invention, controller 12 (i.e. PC) can be optional or omitted from the system and subcontroller 32 may be loaded with the proper program to at least perform the functions related to tracking and identification as described above and other functionalities. Thus, a storage facility according to the present invention may be deployed without a controller 12. A storage facility that includes a programmed subcontroller 32 may be deployed with a controller 12, it may be a stand alone system that can be operated along with peripherals such as a monitor and/or a keyboard, or it may become the intelligent part of a system that includes a plurality of storage facilities without subcontrollers 32 (i.e. dumb storage facilities) that are operated by the programmed controller 32 as directed by a user via a physical peripheral such as a keyboard. In the latter example, the storage facility that includes a resident programmed controller 32 may also send output signals to another peripheral such as a monitor and/or a handheld wireless device. Furthermore, the intelligent storage facility (i.e. the facility having the resident programmed subcontroller 32) may be daisychained with the circuit board 24a in each "dumb" box, whereby a system is realized that includes a plurality of circuit boards 24a in communication with a single programmed subcontroller 32 but residing in a plurality of different compartments. Note that in the daisychained arrangement as described herein, the programmed subcontroller 32 may be still operated by an outside controller 12.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An item storage system for storage of items, comprising:
at least one item storage for secure storage of said items, said storage having a resident programmable subcontroller, at least one stand residing in the interior of said storage and including two spaced walls, and a circuit board supported by said walls of said stand inside said storage, said circuit board including a plurality of spaced elongated openings extending from a front surface thereof to a back surface thereof and a plurality of connectors each arranged on said back surface of said circuit board adjacent a respective side of an opening opposite another connector, and said connectors being in communication with said programmable subcontroller,
wherein one of said walls of said stand is shorter than the other one of said walls whereby said circuit board is oriented in a downwardly direction.

2. The item storage system of claim 1, further comprising a plurality of links, each link including a coupling for mechanical coupling to one of said items and an electronic storage device uniquely identifying said link.

3. The item storage system of claim 2, further comprising a visual indicator residing on said circuit board associated with each one of said elongated openings.

4. The item storage system of claim 3, further comprising a controller operatively connected to said subcontroller and programmed to operate the visual indicator associated with each said opening in order to identify a link received in said opening in response to a user request for said item that is mechanically coupled to said link received in said opening.

5. The item storage system of claim 4, wherein said controller is programmed to operate a plurality of visual indicators in response to a user request for identification of location of a plurality of items in said storage.

6. The item storage system of claim 4, wherein said controller is programmed to operate each visual indicator continuously or intermittently.

7. The item storage system of claim 4, wherein said visual indicator is a single color or a multi-color LED.

8. The item storage system of claim 7, wherein said controller is programmed to operate said multi-color LED, and wherein each color is indicative of a respective condition.

9. The item storage system of claim 4, wherein said controller is programmed to operate a plurality of said visual indicators in a sequence to indicate a position of the link inside said storage.

10. The item storage system of claim 1, further comprising another stand that includes two spaced walls, and another circuit board supported by said another wall, said stand being disposed inside said storage opposite and spaced from said at least one stand, wherein said space between said stands receives said items.

11. The item storage system of claim 1, wherein said storage includes a visual indicator on the exterior thereof that indicates a status of said storage.

12. The item storage system of claim 11, wherein said visual indicator is a multi-color LED, each color thereof being indicative of the respective status of said storage.

13. The item storage system of claim 2, further comprising an electronic reader residing outside said storage for reading said electronic storage device.

14. The item storage system of claim 1, further comprising another storage facility that does not include a programmable subprocessor, and includes at least one stand residing in the interior of said another storage and including two spaced walls, and another circuit board supported by said walls of said another stand inside said another storage, said another circuit board including a plurality of spaced elongated openings extending from a front surface thereof to a back surface thereof and a plurality of connectors each arranged on said back surface of said circuit board adjacent a respective side of an opening opposite another connector, and said connectors of said another circuit board being in communication with said programmable subcontroller.

15. The item storage system of claim 4, wherein said controller is in communication with another controller via a publicly accessible communication network.

16. The item storage system of claim 1, further comprising a plurality of links, each link including a coupling for mechanical coupling to one of said items and an electronic storage device uniquely identifying said link, and a visual indicator residing on said circuit board associated with each one of said elongated openings, wherein each link includes an opening that aligns with the visual indicator when said link is received in a respective opening.

17. The item storage system of claim 16, further comprising a diffuser integrated with said link and aligned with said opening in said link.

18. An item storage system for storage of items, comprising:
   at least one item storage for secure storage of said items, said storage having a resident programmable subcontroller, at least one stand residing in the interior of said storage and including two spaced walls, and a circuit board supported by said walls of said stand inside said storage, said circuit board including a plurality of spaced elongated openings extending from a front surface thereof to a back surface thereof and a plurality of connectors each arranged on said back surface of said circuit board adjacent a respective side of an opening opposite another connector, and said connectors being in communication with said programmable subcontroller;
   a plurality of links, each link including a coupling for mechanical coupling to one of said items and an electronic storage device uniquely identifying said link;
   a visual indicator residing on said circuit board associated with each one of said elongated openings;
   a controller operatively connected to said subcontroller and programmed to operate the visual indicator associated with each said opening in order to identify a link received in said opening in response to a user request for said item that is mechanically coupled to said link received in said opening, and
   a light sensor for measuring the intensity of ambient light, wherein the intensity of the light emitted by said visual indicators is adjusted according to the measurement of the intensity of the ambient light by said light sensor.

19. An item storage system for storage of items, comprising:
   at least one item storage for secure storage of said items, said storage having a resident programmable subcontroller, at least one stand residing in the interior of said storage and including two spaced walls, and a circuit board supported by said walls of said stand inside said storage, said circuit board including a plurality of spaced elongated openings extending from a front surface thereof to a back surface thereof and a plurality of connectors each arranged on said back surface of said circuit board adjacent a respective side of an opening opposite another connector, and said connectors being in communication with said programmable subcontroller, and
   a basket having an interior accessible through an opening in a side wall thereof, and an electronic storage device integrated with said basket and including information identifying said basket, wherein said opening in said side wall of said basket is rendered inaccessible by one of said walls of said stand when said electronic storage device of said basket is received in the respective opening of said circuit board.

* * * * *